US006231253B1

(12) United States Patent
Henderson et al.

(10) Patent No.: US 6,231,253 B1
(45) Date of Patent: May 15, 2001

(54) LABEL PRINTER WITH A PEEL BAR, A SEPARATOR BAR AND ANTI-BUCKLE MEANS

(75) Inventors: David L. Henderson, Mundelein; Ronald Russell Liedtke, Fox Lake, both of IL (US)

(73) Assignee: ZIH Corporation, Wilmington, DE (US)

( * ) Notice: Subject to any disclaimer, the term of this patent is extended or adjusted under 35 U.S.C. 154(b) by 0 days.

(21) Appl. No.: 09/183,818

(22) Filed: Oct. 30, 1998

Related U.S. Application Data

(60) Provisional application No. 60/063,787, filed on Oct. 31, 1997.

(51) Int. Cl.[7] .......... B32B 35/00
(52) U.S. Cl. .......... 400/618; 400/611; 101/288
(58) Field of Search .......... 101/288; 156/384; 400/611, 618

(56) References Cited

U.S. PATENT DOCUMENTS

| | | | | |
|---|---|---|---|---|
| 2,602,719 | | 7/1952 | Thiene et al. | 221/73 |
| 3,330,207 | * | 7/1967 | De Man | 101/92 |
| 3,415,706 | | 12/1968 | Ettre | 156/540 |
| 3,468,739 | * | 9/1969 | Schrotz | 156/361 |
| 3,530,028 | | 9/1970 | Messmer | 156/584 |
| 3,586,878 | | 6/1971 | Dickerson | 156/361 |
| 3,941,278 | | 3/1976 | Oglander et al. | 221/73 |
| 4,435,243 | * | 3/1984 | Azeez et al. | 156/384 |
| 4,560,087 | * | 12/1985 | Sato et al. | 156/384 |
| 4,626,313 | | 12/1986 | Karp | 156/362 |
| 4,826,558 | * | 5/1989 | Wada et al. | 101/288 |
| 5,009,739 | | 4/1991 | Goodwin et al. | 156/384 |
| 5,040,461 | | 8/1991 | Van-Ocker | 101/288 |
| 5,108,534 | | 4/1992 | Tveit et al. | 156/344 |
| 5,169,474 | | 12/1992 | Binder | 156/344 |
| 5,209,374 | | 5/1993 | Seidl-Lichthardt | 221/73 |
| 5,395,174 | * | 3/1995 | Koch et al. | 400/611 |
| 5,427,460 | | 6/1995 | Kajiya | 400/118.1 |
| 5,478,428 | | 12/1995 | Carpenter | 156/344 |
| 5,520,776 | | 5/1996 | Van Allen et al. | 156/584 |
| 5,658,416 | | 8/1997 | MacCollum et al. | 156/344 |
| 5,713,679 | | 2/1998 | Taylor | 400/621 |
| 5,716,492 | | 2/1998 | Li | 156/219 |
| 5,718,525 | | 2/1998 | Bruhnke et al. | 400/586 |
| 5,730,816 | | 3/1998 | Murphy | 156/64 |
| 5,800,669 | * | 9/1998 | Goodwin et al. | 101/288 |

* cited by examiner

*Primary Examiner*—Daniel J. Colilla
(74) *Attorney, Agent, or Firm*—Trexler, Bushnell, Giangiorgi & Blackstone, Ltd.

(57) ABSTRACT

A novel passive peel system for a printer is provided for peeling labels off of a backing. Labels secured to a backing is defined as media. The printer has a printhead for printing indicia on the labels and a platen roller. A first embodiment of the passive peel system includes a peel tear bar proximate to the platen roller for bending the backing therearound and a separator bar proximate to the peel tear bar for separating the backing from the labels after the labels have been printed on by the printhead. The media passes over the peel tear bar, the backing passes between the peel tear bar and the separator bar, and the labels pass over the separator bar. The labels can be peeled with low tension or with zero tension on the backing. A second embodiment of the passive peel system includes a peel tear bar and an anti-buckle bar mounted proximate to the peel tear bar for preventing buckling of the media as the media passes over the peel tear bar. The media passes between the peel tear bar and said anti-buckle bar. The labels can be peeled with low tension on the backing. The third embodiment of the passive peel system is the same as the first embodiment with the addition of the anti-buckle bar of the second embodiment. The labels can be peeled with low tension or with zero tension on the backing.

19 Claims, 28 Drawing Sheets

LABEL PRINTER WITH A PEEL BAR, A SEPARATOR BAR AND ANTI-BUCKLE MEANS

This appln claims the benefit of Provisional No. 60/063,787 filed Oct. 31, 1997.

BACKGROUND OF THE INVENTION

In a printer, if a media having labels on a backing is provided for carrying the indicia, the labels may be separated or peeled off of the backing by the printer instead of dispensing the label on the backing and requiring that the user hand strip the label. Prior art methods of separating a label from a backing pulls the media with high tension which performed well for separating the labels from the backing, but causes printing registration problems and rewind control of the backing was difficult. Another prior art method scrapes the label off the backing by squeezing a sharp edge or pick against the backing which was pressed tightly against the platen roller without high tension on the backing.

The present invention provides a novel passive peel system which is used to separate or peel the labels easily from the backing with zero or low tension on the backing. In the present invention, this simplifies peeling, makes label printing registration easier to control, reduces the tension required on the backing which makes rewinding of the backing easier, and reduces cost.

Other features and advantages of the present invention will become apparent upon a reading of the attached specification, in combination with a study of the drawings.

OBJECTS AND SUMMARY OF THE INVENTION

An object of the present invention is to provide a printer which includes a novel passive peel system that is used to separate or to peel the labels easily from the backing with zero or low tension on the backing.

Briefly, and in accordance with the foregoing, the present invention provides a novel passive peel system for a printer, such as a thermal printer or a thermal demand printer, for peeling labels off of a backing after indicia has been printed on the labels. When the labels are secured to the backing, this is defined as media.

The printer has a housing, printhead means associated with the housing for printing the indicia on the labels and a platen roller associated with the housing.

A first embodiment of the passive peel system includes a peel tear bar proximate to the platen roller for bending the backing therearound and a separator bar proximate to the peel tear bar for separating the backing from the labels after the labels have been printed on by the printhead means. The media passes over the peel tear bar, the backing passes between the peel tear bar and the separator bar, and the labels pass over the separator bar. In this embodiment, the labels can be peeled with low tension or with zero tension on the backing.

A second embodiment of the passive peel system includes a peel tear bar and an anti-buckle bar mounted proximate to the peel tear bar for preventing buckling of the media as the media passes over the peel tear bar. In this embodiment, the media passes between the peel tear bar and said anti-buckle bar. When this second embodiment is used, the labels can be peeled from the media with low tension on the backing.

The third embodiment of the passive peel system is the same as the first embodiment with the addition of the anti-buckle bar of the second embodiment. When this third embodiment is used, the labels can be peeled from the backing with low tension or with zero tension on the backing.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

Figure 1:
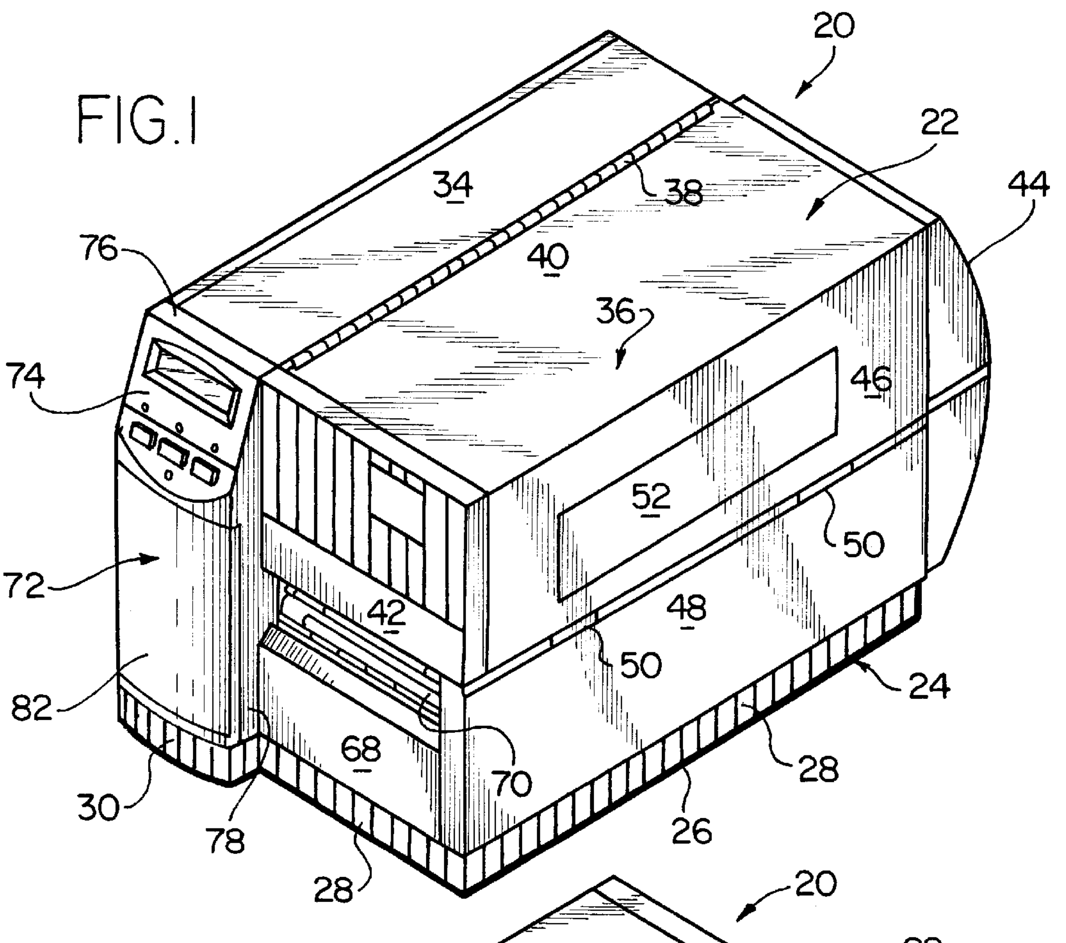
FIG. 1 is a perspective view of a printer which incorporates the features of the invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
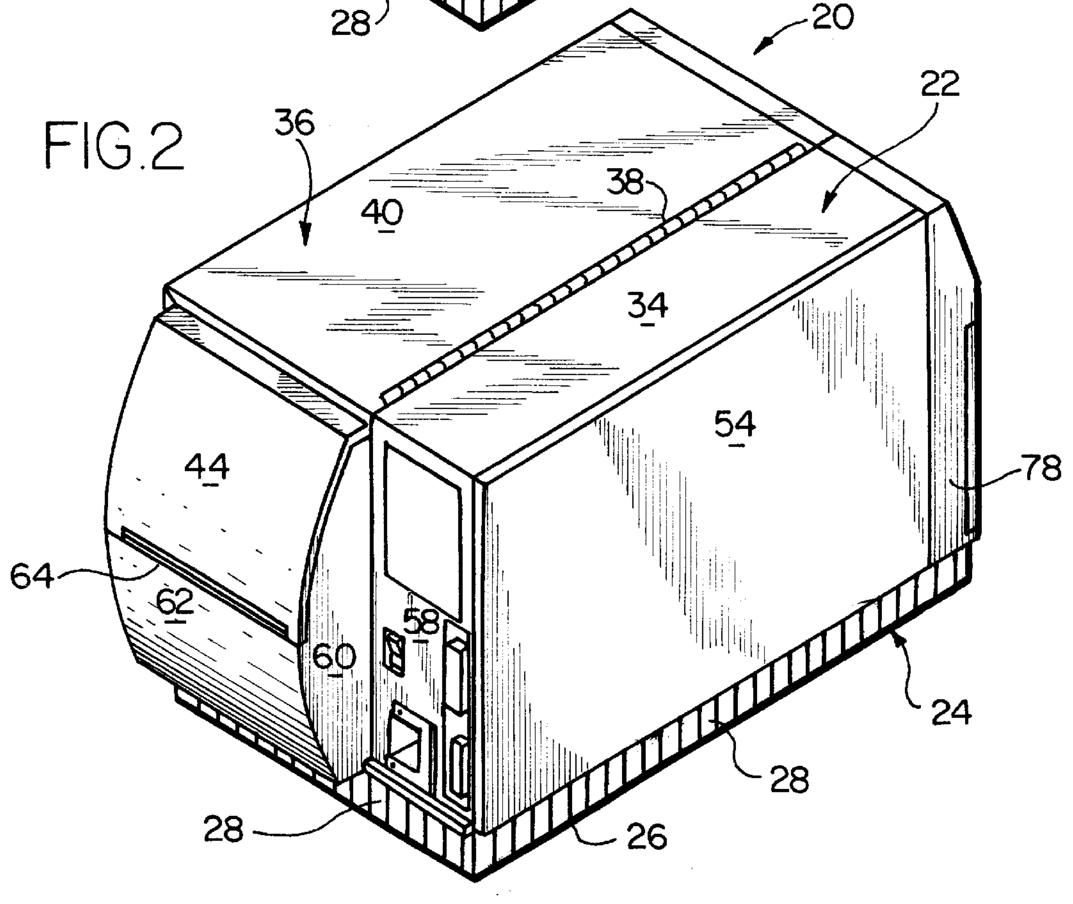
FIG. 2 is another perspective view of the printer shown in FIG. 1 which incorporates the features of the invention.

Perspective views of a printer 20 in accordance with the present invention is shown in FIGS. 1 and 2. The printer 20 has a plastic housing 22 which houses various operating components of the printer 20. The housing 22 is formed from a base member 24 which includes a bottom wall 26 and front, rear and side upstanding walls 28 which extend perpendicularly upwardly therefrom along the edges thereof. A plurality of feet are provided on the bottom wall 28 of the printer 20.

The front upstanding wall 28 has a receptacle portion 30 formed therewith along the length thereof. The receptacle portion 30 includes a pair of opposed walls which are spaced from each other and are integrally formed with and extend perpendicularly from the remainder of the front upstanding wall 28 along first edges of the opposed walls, a curved front wall which is integrally formed with second, opposite edges of the opposed walls, and a bottom wall which is integrally formed with and connected with the bottom edges of the opposed walls and the curved front wall.

A central support wall 32 extends perpendicularly from the bottom wall 26 of the base 24 and is secured thereto. The central support wall 32 extends between the front and rear upstanding walls 28 and is spaced from the side upstanding walls 28. The inner side wall of receptacle portion 30 is generally aligned with the central support wall 32.

A top wall 34 is fixed to and extends outwardly and perpendicularly from the opposite end of the central support wall 32. A hinged cover portion 36 is connected to the central support wall 32 by a hinge 38 and extends outwardly and perpendicularly from the end of the central support wall 32 in a direction opposite to the top wall 34. The hinged cover portion 36 includes a top wall 40 which extends from the hinge 38, a front wall 42 which depends from a front edge of the top wall 40 and is perpendicular thereto, a curved rear wall 44 which depends from a rear edge of the top wall 40 and is perpendicular thereto, an upper side wall 46 which depends from a side edge of the top wall 40 and is perpendicular thereto, and a lower side wall 48 which is hingedly connected to the upper side wall by hinges 50. The upper side wall 46 may have a clear window 52 provided therethrough so that an operator can view the internal components of the printer 20. The upper and lower side walls 46, 48 of the hinged cover portion 36 form the right side of the printer 20.

A side wall 54 forms the left side of the printer 20 and is removably mounted thereto. The side wall 54 has an upper portion which extends between the top wall 34 and the side upstanding wall 28 of the base 24 and a lower portion which is slightly offset from the upper portion and seats behind the side upstanding wall 28. Screws (not shown) which extend through respective apertures (not shown) provided in the central support wall 32 and into threaded sockets 56 provided in the side wall 54 removably mount the side wall 54 to the central support wall 32 and thus, the remainder of the housing 22. The side wall 54 is removed for access to the internal components between the side wall 54 and the central support wall 32 as described herein.

The rear of the housing 22 includes a first wall 58 which is fixed to and extends between the rear upstanding wall 28 and the top wall 34, a second wall 60 which is fixed to and extends between the rear upstanding wall 28 and the top wall 34 and is perpendicular to the first wall 58, and a third curved wall 62 which is fixed to the rear upstanding wall 28 and extends upwardly therefrom. The second wall 60 is aligned with the central support wall 32 and is fixed thereto by suitable means, such as by screws. The third curved wall 62 extends partially between the rear upstanding wall 28 and the top wall 34. When the hinged cover portion 36 is closed as described herein, the curved rear wall 44 of the hinged cover portion 36 sits above the third curved wall 62 and is spaced therefrom to provide a slot 64 therebetween. The rear wall 58 has a plurality of ports, serial and/or parallel, thereon for connection to external devices, such as a CPU and a monitor. A plug for connection of a power source thereto is also supplied in the rear wall 58, as well as an on/off switch for turning the printer on or off. Ventilation apertures are also provided in rear wall 58.

Figure 3:
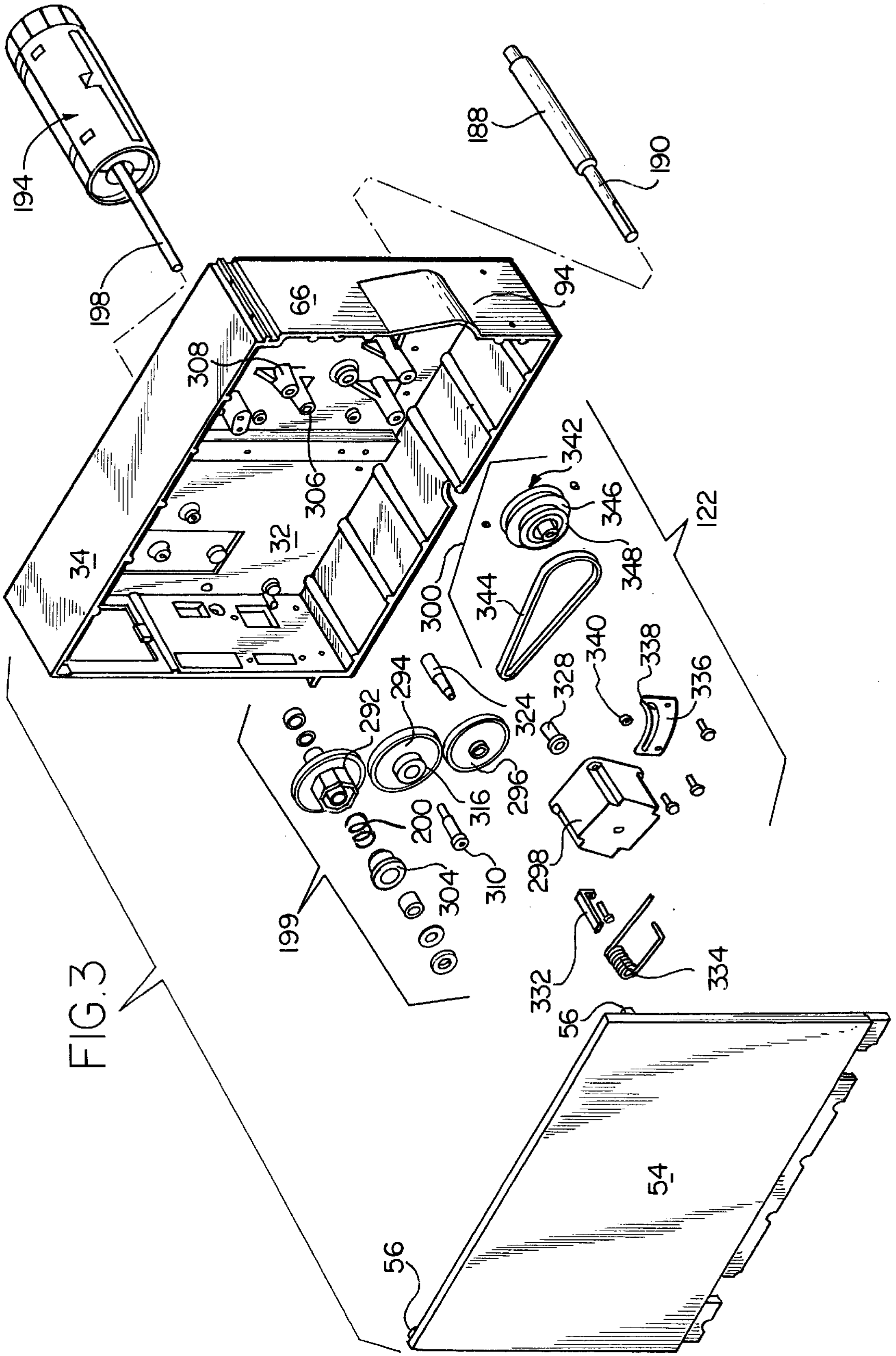
FIG. 3 is an exploded perspective of a portion of the printer shown in FIG. 1.

The front of the housing 22 includes a first wall 66, see FIG. 3, which extends between the bottom wall 26 of the base 24 and the top wall 40 and is integrally formed with the central support wall 32. The first wall 66 is seated behind the receptacle portion 30 of the upstanding front wall 28. A second wall 68 is attached to the front upstanding wall 28 and extends upwardly therefrom and is not connected to the first wall 66. The second wall 68 extends partially between the front upstanding wall 28 and the top wall 40. When the hinged cover portion 36 is closed as described herein, the front wall 42 of the hinged cover portion 36 sits above the second wall 68 and is spaced therefrom to provide a slot 70 therebetween.

As shown in FIGS. 1 and 2, when the hinged cover portion 36 is closed, the front wall 42 sits above the front first wall 68 and the curved rear wall 44 sits above the rear, curved third wall 62. The slots 64, 70 are then formed. To open the hinged cover portion 36, the front and rear walls 42, 44 are grasped and pivoted upwardly so as to move the hinged cover portion 36 away from the base 24 by pivoting along the hinge 38. As the hinged cover portion 36 is pivoted upwardly, the lower side wall 48 pivots relative to the upper side wall 46 along the hinges 50 therebetween. The hinged cover portion 36 is shown in its upwardly pivoted position in FIG. 4.

Figure 5:
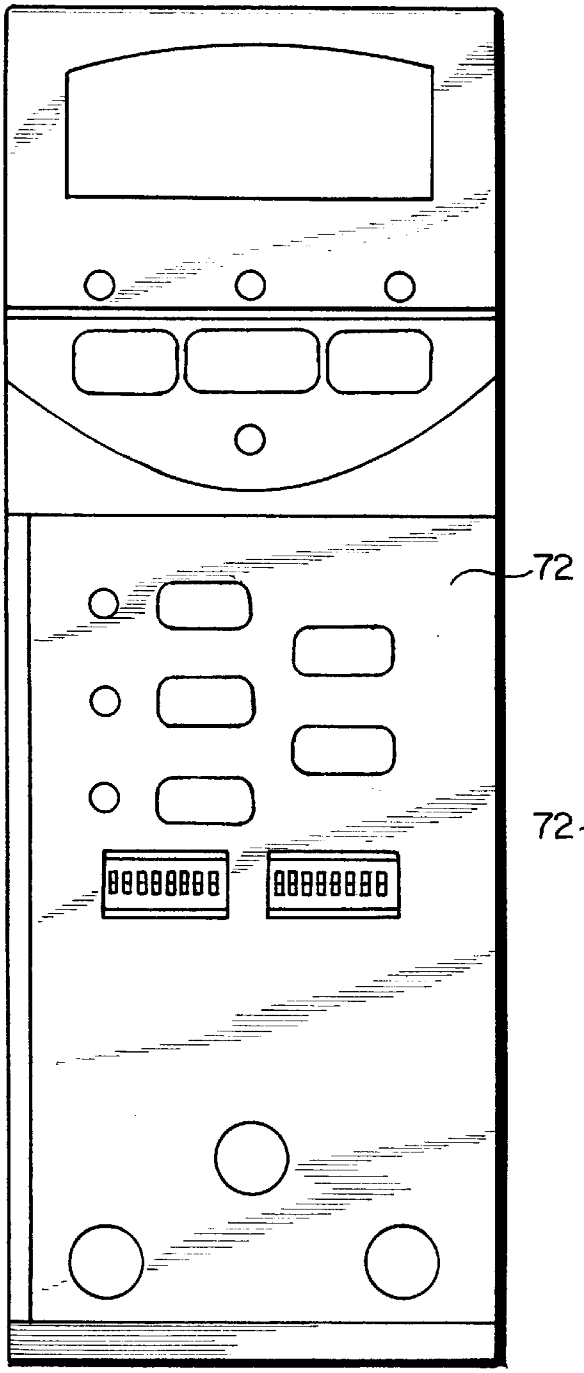
FIG. 5 is a front elevational view of a control panel which can be attached to the printer.
Figure 6:
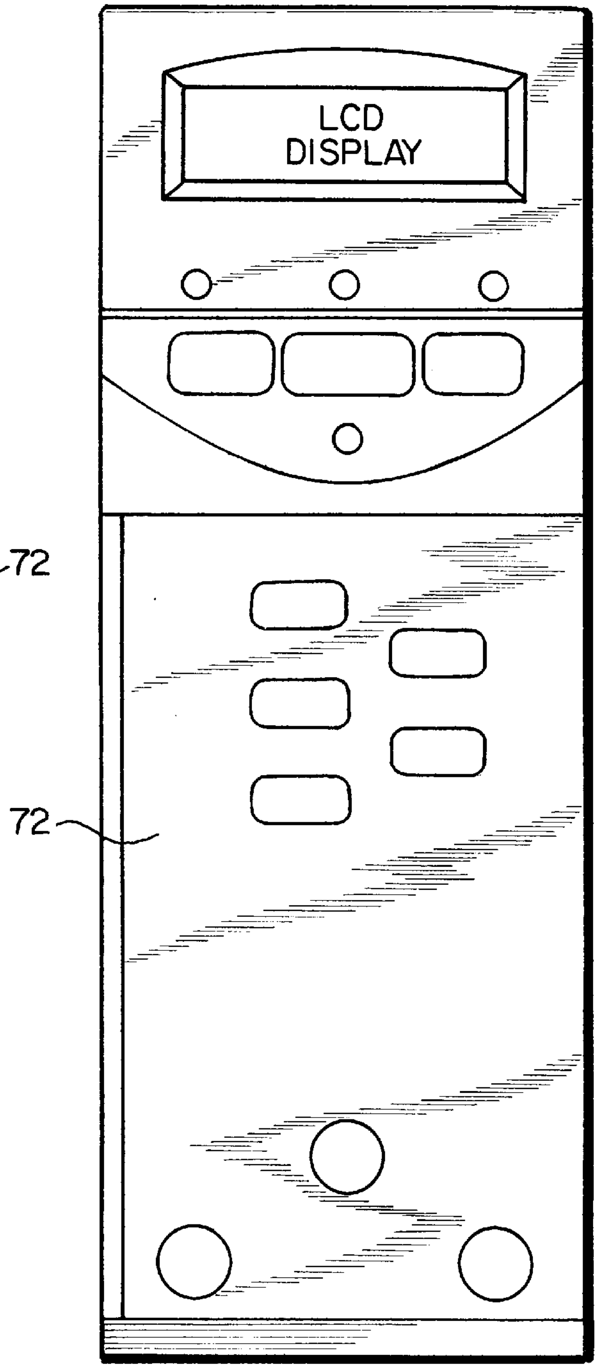
FIG. 6 is a front elevational view of a second control panel which can be attached to the printer.

A modular control panel 72 is removably mounted to the receptacle portion 30 of the housing 22 and proximate to the lower front wall 68. The modular control panel 72 can be removed and replaced by another like modular control panel or a different modular control panel. This provides for field interchangeability such that a standard control panel, shown in FIG. 5, or a deluxe control panel having an LCD display, shown in FIG. 6, can be easily installed or changed in the field after manufacture of the printer 20. It is to be noted that the interchangeable control panels can be applied to any electro-mechanical devices which require different user interface or control panel requirements.

Figure 7:
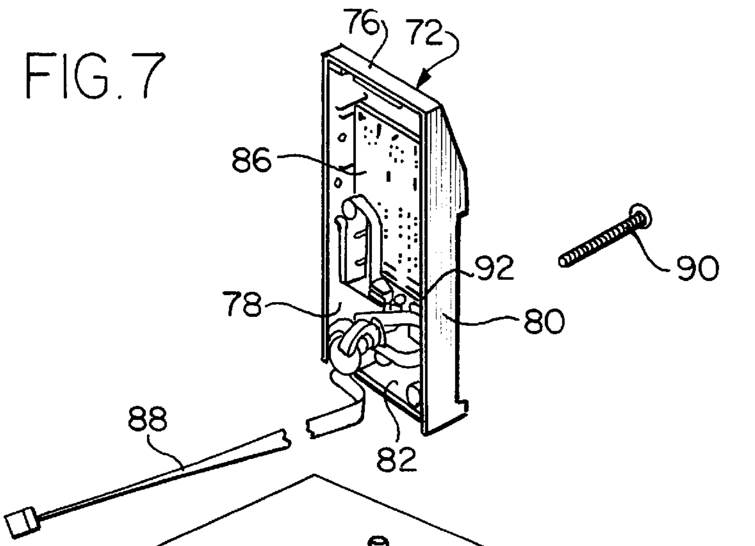
FIG. 7 is a rear perspective view of one of the control panels shown in FIGS. 5 and 6.

The modular control panel 72, see FIGS. 1 and 7, is formed from a front wall 74, a top wall 76 which depends therefrom along a top edge, a pair of opposed side walls 78, 80 which depend therefrom along opposite side edges, and a bottom wall 82 which depends therefrom along a bottom edge. The walls 74, 76, 78, 80, 82 of the control panel 72 are preferably formed from plastic. The bottom end of the modular control panel 72 has a shape that conforms to the shape of the receptacle portion 30 of the front upstanding wall 78. Depending on the type of the control panel 72, the front wall 74 may have a door 82 which opens and closes along a hinge for housing control buttons therein. More buttons, an LCD, LEDs and the like may be provided therein or elsewhere on the front wall 74 depending on the type of control panel used.

A printed circuit board 86 is mounted to the inside of the control panel 72 on the front wall 74 by suitable means. The printed circuit board 86 has a port provided thereon for releasible connection to the internal components of the printer 20 by a cable 88 and suitable means for electrical and mechanical connection to the buttons, LCD and LEDs.

The control panel 72 is mounted to the receptacle portion 30 by seating the bottom end of the control panel 72 on the upper end of the receptacle portion 30. The control panel 72 then fits snugly against the front wall 66 of the printer 20. A standard screw 90, which extends through an aperture 92 of the control panel front wall 74 and through a threaded aperture 94 in the front wall 66, secures the control panel 72 to the housing 22.

To remove the control panel 72, for example the standard panel, so as to interchange it with another control panel, for example the deluxe panel, the screw 90 is removed and the cable 88 is detached from the port on the printed circuit board 86. The new control panel is modular and has a wall structure that is identical to that of the previous control panel, except that additional operational components may or may not be provided thereon. Thereafter, the cable 88 is attached to the port on the new control panel and the new control panel is mounted on the receptacle portion 30 in an identical manner. The screw 90 is passed through an aperture of the front wall of the new control panel and through the threaded aperture 94 in the front wall 66 to secure the new control panel to the housing 22. Because the control panels have the same modular layout, interchangeability is possible.

During the printer's power-up sequence, software within the printer 20 identifies which control panel is installed, i.e., whether the standard or deluxe control panel is being used. Because the software can detect the control panel connected to the printer 20, the installation of either control panel is made easy for the user as no setup is required. This novel interchangeability is quick and easy for the user and providing the choice of control panels makes the printer 20 more appealing to users with different needs.

Figure 4:
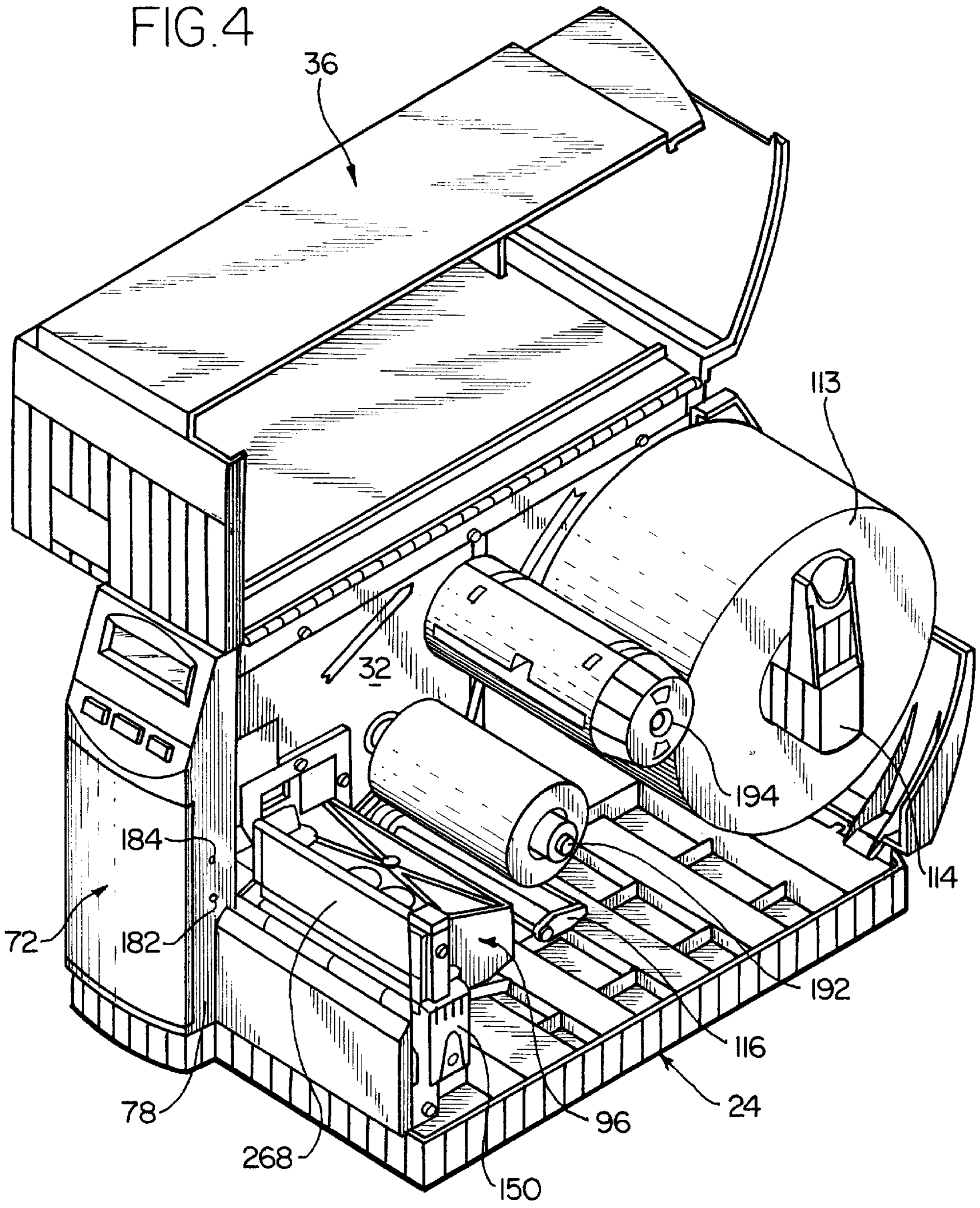
FIG. 4 is a perspective view of the printer, with a hinged portion of printer opened.
Figure 8:
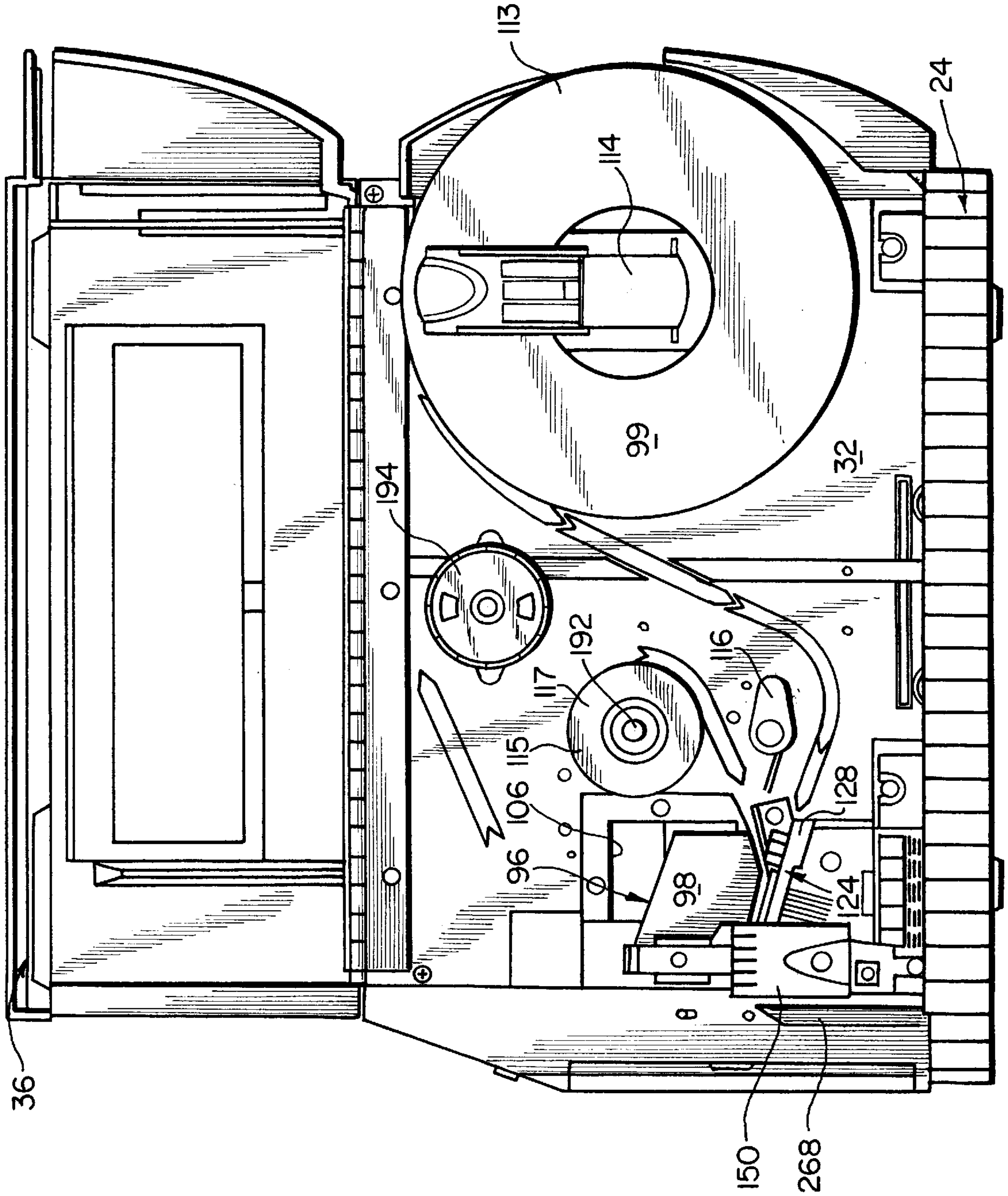
FIG. 8 is a side elevational view of the printer, with the hinged portion of printer opened.

Turning now to FIGS. 4 and 8, the printer 20 of the present invention is viewed with the hinged cover portion 36 pivoted upwardly so as to expose the internal components of the printer 20 on one side of the central support wall 32.

A printhead assembly 96 is shown and includes a printhead support 98 and printhead means 100 fixedly attached thereto. The printhead assembly 96 is shown better in FIGS. 9–11. A central axis is defined along the length of the printhead support 98. The printhead means 100 is conventional and is comprised of an array of heating elements which are selectively energized. Energizing selected heating elements of the array produces a single line of a printed image by heating a thermally sensitive paper, ribbon, or some other media. Complete images are printed by repeatedly energizing varying patterns of the heating elements while moving the media 113 past the printhead means 100. Power to the printhead means 100 is supplied by a power source which is wired thereto by a cable which passes from the power supply through the central support wall 32.

Figure 9:
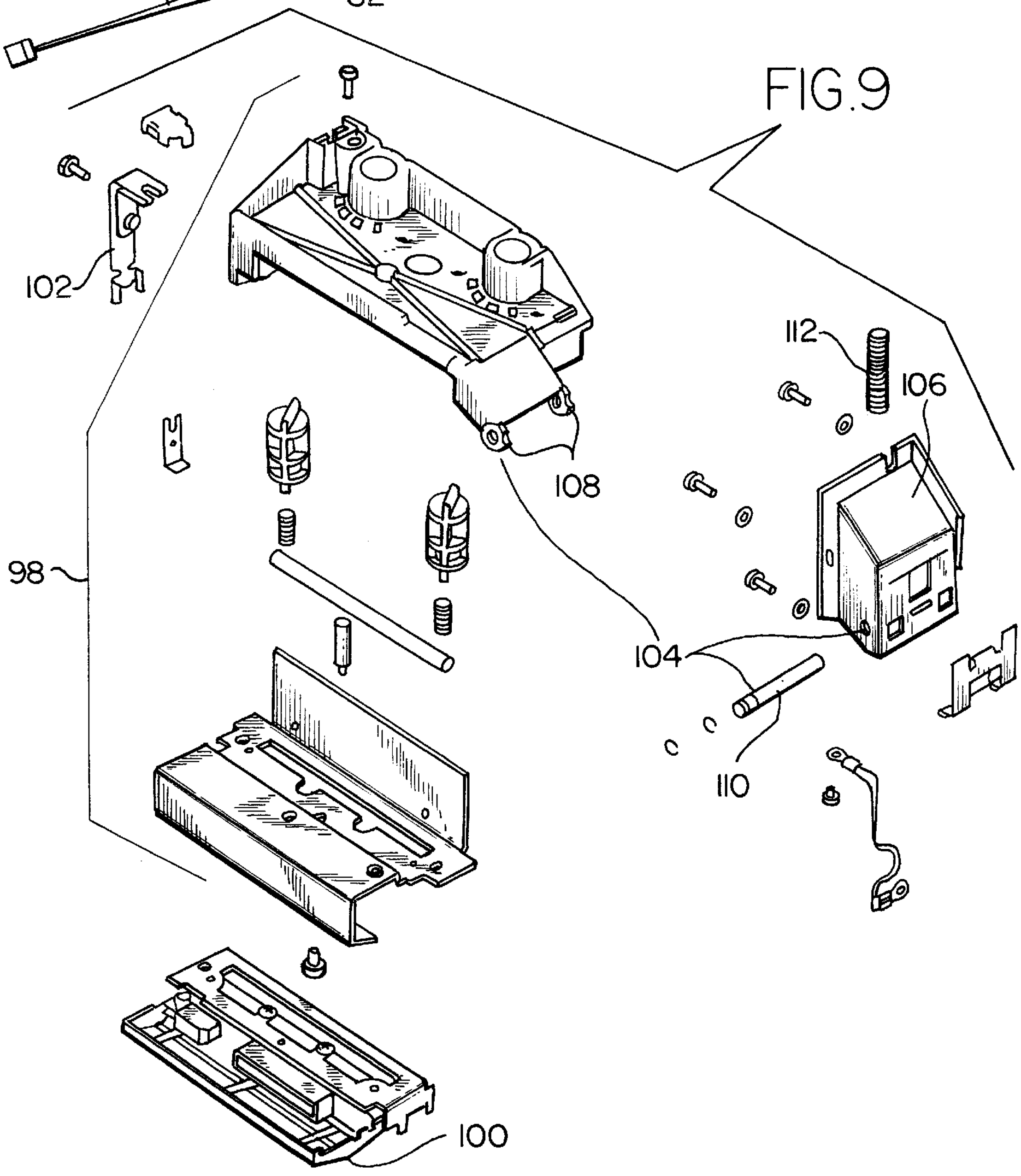
FIG. 9 is an exploded, perspective view of a printhead assembly of the printer.

An end of the printhead support 98 has a catch member 102 mounted thereon which protrudes outwardly therefrom for reasons described herein. The opposite end of the printhead support 98 includes a hinge 104 thereon which pivotally attaches the printhead support 98, and thus the printhead means 100, to the central support wall 32. The central support wall 32 is provided with a recess 106 therein, defined by side walls, top wall and bottom wall which protrude from the central support wall 32, to accept the end of the printhead support 98 when the printhead support 98 is pivoted. As shown in FIG. 9 (in which a portion of the recess 106 is shown), the hinge 104 is formed from a pair of spaced apart arms 108 provided on the end of the printhead support 98 which have aligned apertures provided therethrough. A pin 110 extends through the aligned apertures, is fixed to the arms 108 and is rotatably mounted to the side walls of the recess 106. A coiled spring 112 is mounted between the prinhead support 98 and the bottom wall of the recess 106 for biasing the printhead support 98 into a pivoted position. Further description of the pivoting of the printhead support 98, and thus the printhead means 100, and the reasons therefor are provided herein.

Directing attention back to FIGS. 4 and 8, media delivery means is provided for delivering media 113 to the printhead means 100 includes a media supply hangar 114, a dancer assembly 116 and a platen roller 118. The media 113 may be comprised of a backing (also known as a liner or web) having a plurality of labels releasably secured thereto. The labels are releasably secured to the backing by a releasable adhesive. The labels are spaced apart from each other on the backing. Linerless media can also be run through the printer 20 of the present invention.

The media supply hangar 114 extends outwardly from and perpendicularly to the central support wall 32. The media supply hangar 114 is fixedly mounted to the central support wall 32 by suitable means. A roll 99 of media 113 may be mounted thereon for feeding to and through the printhead means 100.

The dancer assembly 116 is mounted between the media supply hangar 114 and the platen roller 116. The dancer assembly 116 is formed from a shaft which extends outwardly from the central support wall 32 and fixedly mounted thereto and a wedge-shaped dancer which is rotatably attached to the shaft. The wedge-shaped dancer is spring biased by a torsion spring to a generally horizontal position.

The platen roller 118 is cylindrical and extends outwardly from the central support wall 32 and is rotatably mounted thereto. The platen roller 118 has a central axis which is perpendicular to the central support wall 32 and defines a vertical plane which is aligned with the platen roller central axis. When the printhead support 98 is in its pivoted downward position, as described herein, the printhead means 100 sits on the platen roller 118. The platen roller 118 has a shaft portion 120 that extends through the central support wall 32 and connects with a driving system 122 that is more fully described herein.

Figure 11:
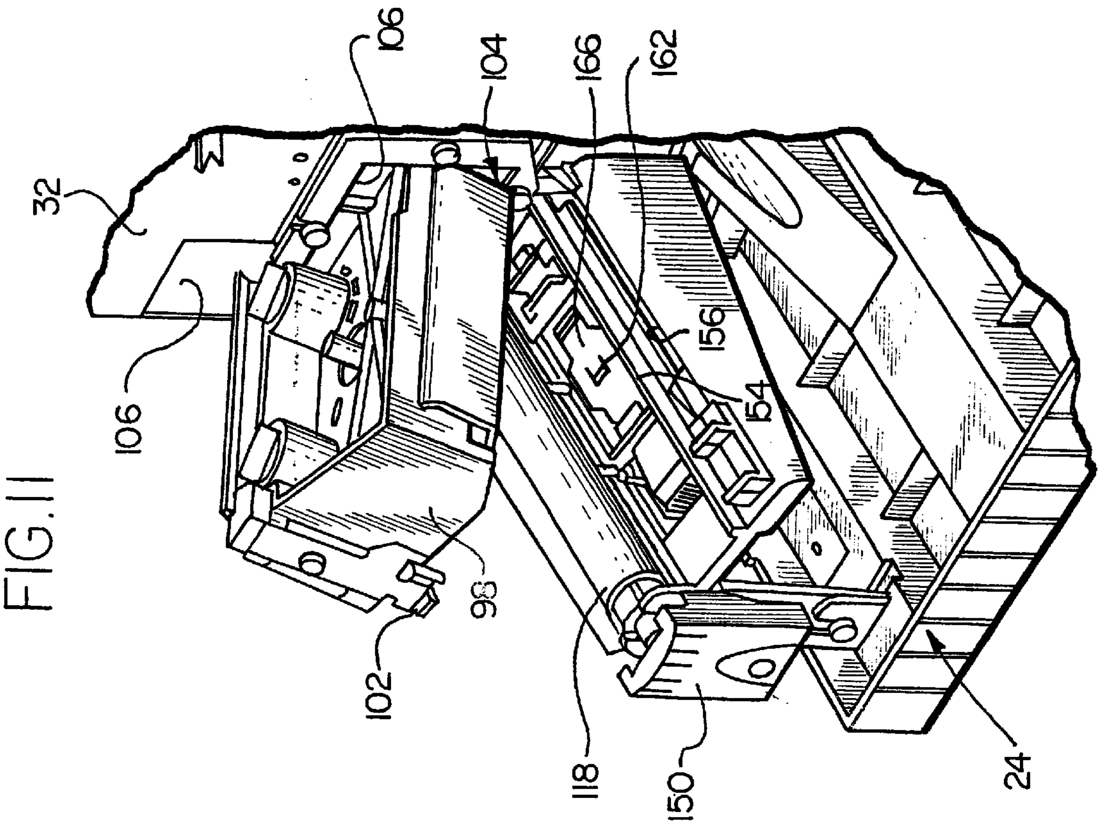
FIG. 11 is a perspective view of the printhead assembly of FIG. 9 mounted on the central support wall of the printer, with the printhead assembly in an open position for accepting media.
Figure 12:
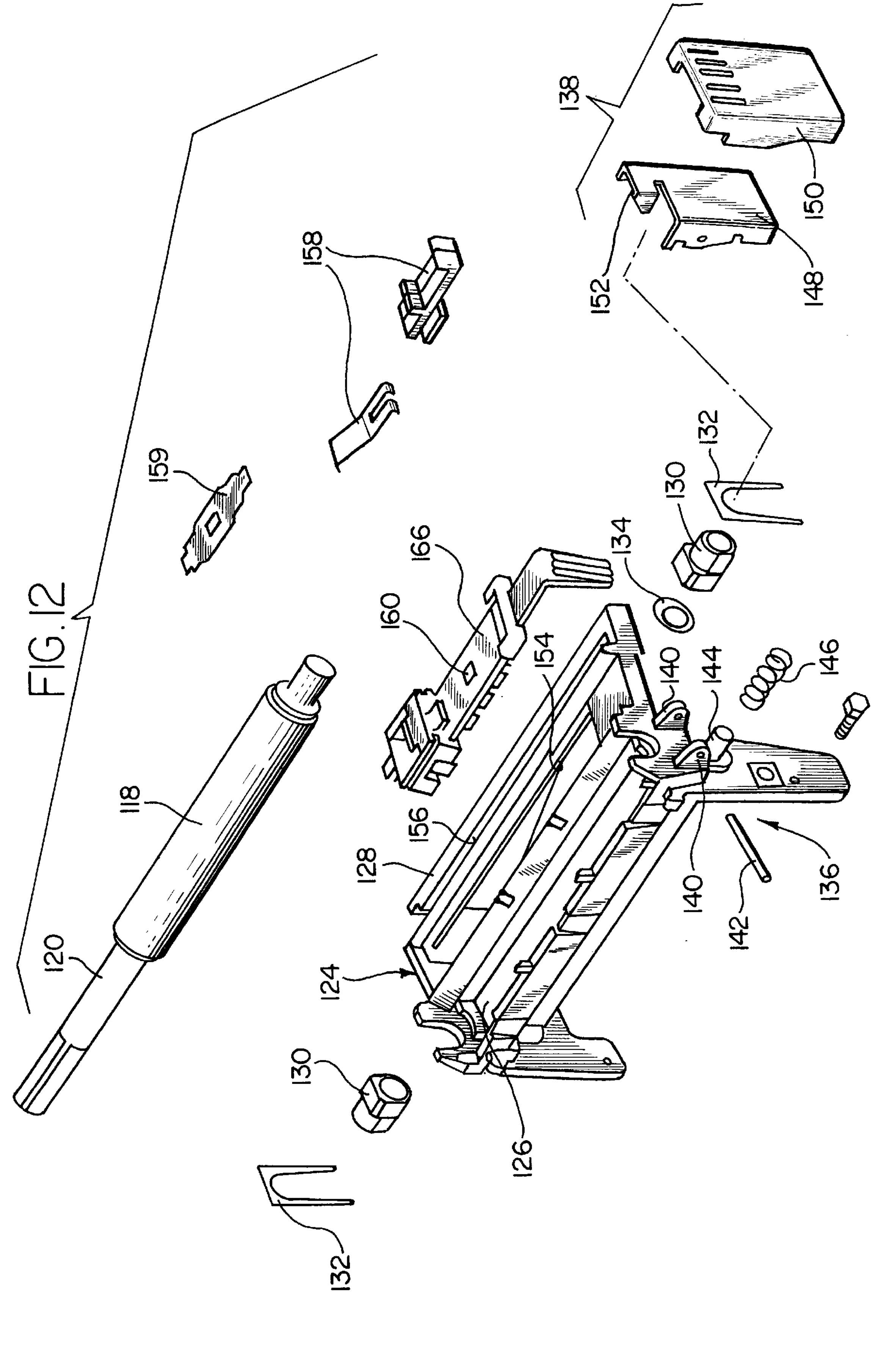
FIG. 12 is an exploded perspective view of a platen and platen support structure of the printer of FIG. 1.

The platen roller 118 is mounted to a platen support structure 124, see FIGS. 11 and 12, which is fixedly mounted to and extends outwardly from the central support wall 32. The platen support structure 124 has a U-shaped portion 126 in which the platen roller 118 is seated and rotatable relative thereto, and a rail portion 128 which extends outwardly from the U-shaped portion 126. Flanges extend downwardly from the U-shaped portion 126 on opposite sides thereof and are mounted on the bottom wall 26 of the base 24 as shown in FIG. 11.

The U-shaped portion 126 has U-shaped end surfaces in which bearings 130 connected to the platen roller 118 are mounted. A pair of clip springs 132 secure the bearings 130 to the U-shaped portion 126 of the platen support structure 124. A curved washer 134 is seated between one end of the platen roller 118 and the outboard bearing 130.

One end surface of the U-shaped portion 126 is seated against and is mounted to the central support wall 32. The opposite end surface has a hinge 136 provided therein for mounting a latch structure 138 thereto. The hinge 136 includes a pair of spaced apart protrusions 140 thereon which are parallel to the central axis of the platen roller 118. Aligned apertures are provided through the protrusions 140 in which a pin 142 is mounted. A cylindrical pin 144 extends outwardly from the end surface and is mounted between the protrusions 140 at a predetermined distance therebelow. A coiled spring 146 surrounds the cylindrical pin 144.

The latch structure 138 includes a latch 148 and a plastic latch cover 150 connected to the hinge 136 by means of the pin 142 extending through apertures provided in the sides of the latch 148. The latch 148 has a latch member 152 which protrudes inwardly therefrom to engage the catch member 102 on the printhead support 98 when the printhead support 98 is in its downwardly position as described herein. The latch cover 150 is mounted on the latch 148 by suitable means. The coiled spring 146 extends between the end surface and the inner surface of the latch cover 150. The latch 148 and latch cover 150 can be pivoted outwardly from the platen roller 118 to release the latch member's 152 engagement with the catch member 102 on the printhead support 98 to allow the printhead support 98, and thus printhead means 100, to be pivoted upwardly from the platen roller 118 as described herein.

The rail portion 128 of the platen support structure 124 has an elongated aperture 154 therein and an elongated slot 156 which is spaced from the elongated aperture 154. The elongated aperture 154 and elongated slot 156 are parallel to the platen roller 118.

A guide media member 158 is mounted in and rides along rails provided along the length of the elongated slot 156. The guide media member 158 has a base portion which rides along the rails in the slot and a portion which extends perpendicular to the base portion. When media 113 is loaded in the printer 20, the guide media member 158 is slid along the slot until the edge of the media 113 abuts against the guide media member 158. Thereafter, the guide media member 158 guides the media 113 to the printhead means 100.

The printer 20 of the present invention has a plurality of sensors for determining the position of the media 113 as it passes through the printhead assembly 96.

Figure 13:
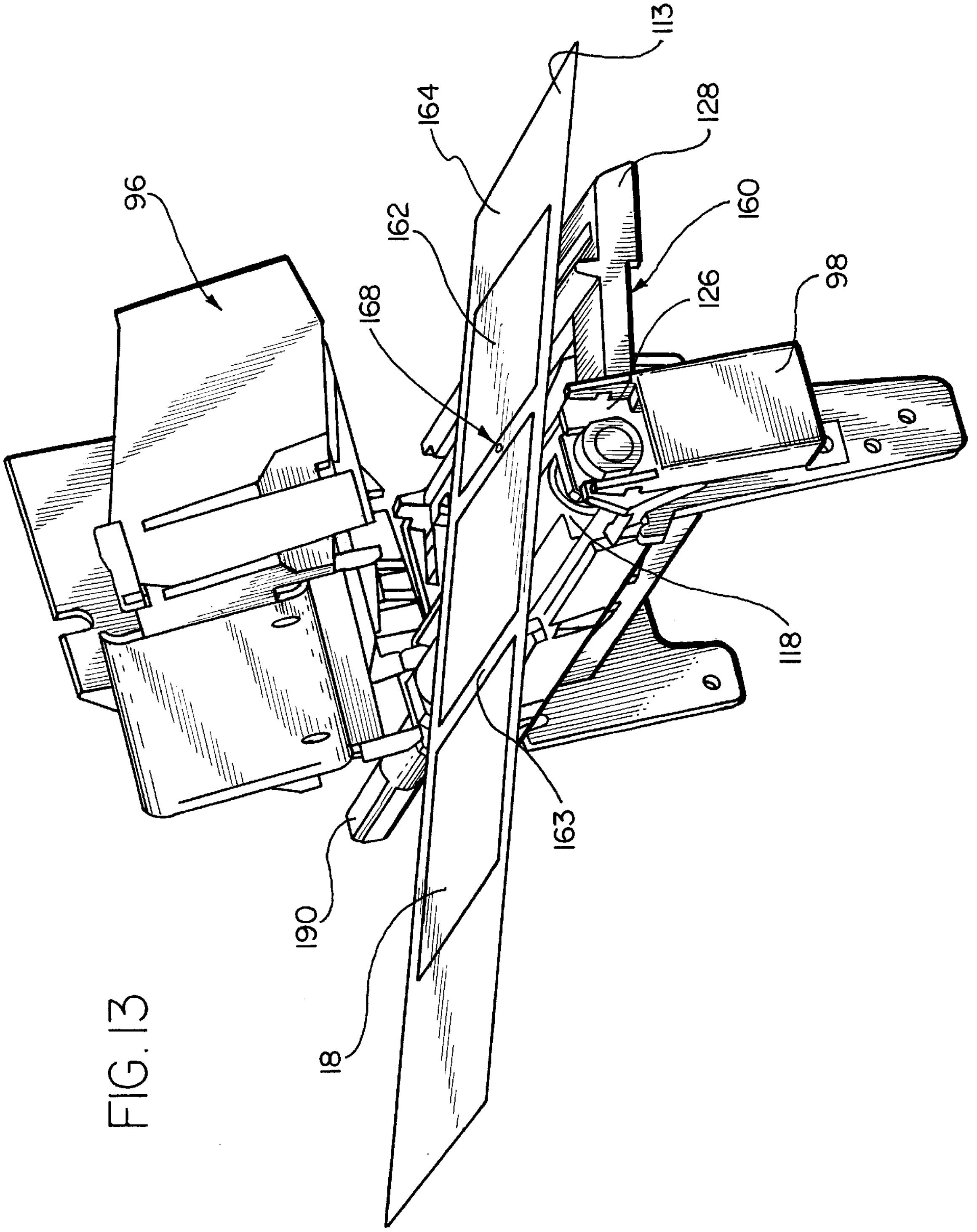
FIG. 13 is a perspective view of the printhead assembly in an open position with media threaded therethrough and showing a media sensor which utilizes a visible red light for sensing the position of the media.
Figure 14:
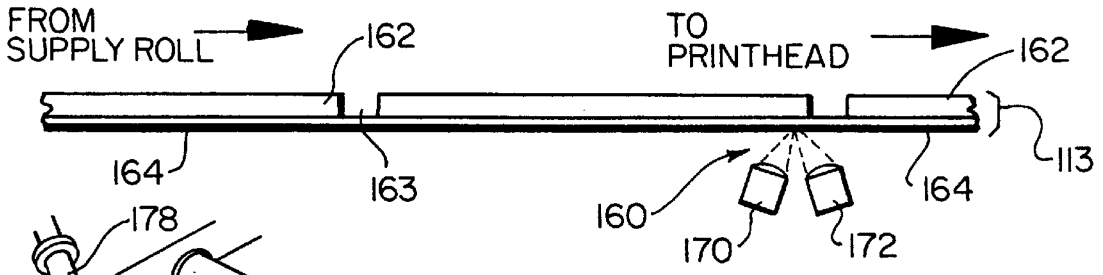
FIG. 14 is a schematic view of the media and the media sensor of FIG. 13.

FIGS. 12–14 illustrate a preferred embodiment of a movable media sensor 160 which utilizes a visible red light for sensing the position of the media 113. In FIG. 14, the thickness of the media 113 has been exaggerated for clarity in illustration of the invention. The media 113 as shown in the drawings has a plurality of labels 162 provided spaced apart on a backing 164 such that a gap 163 is provided between adjacent labels 162. The movable media sensor 160 is mounted on a media sensor carrier 166 which is mounted in and can be slid along rails provided in the elongated aperture 154 in the platen support structure 124. The visible light of the media sensor 160 shines through the bottom of the media 113 indicating to the user the exact sensing position, with a visible red dot 168 easily viewable on the top side of the media 113. Positioning the media sensor 160 to the media "mark" is then as easy as overlaying the visible dot 168 over the "mark" position which, in the illustrated embodiment, is the inter-label gap 163 separating the individual labels 162 on the backing 164.

The indicating dot 168 is totally unobstructed by other printer mechanics and easily viewable from the operator's natural position during media sensor 160 position adjustment. The system exploits the fact that the media 113 will lay over the media sensor 160 by using the visible light of the media sensor 160 as an alignment indicator.

The illustrated media sensor 160 is unique in that it uses the visible sensor beam itself as the alignment aid. The visible dot 168 on the media 113 indicates the exact media sensor 160 position. It thus provides the easiest method for media sensor 160 alignment by just requiring the operator to overlay the visible dot 162 on the media "mark" (163, for example) location.

The media sensor 160 is a "free" indicator in that it does not require any additional mechanics, electronics, or markings elsewhere on the printer 20 for alignment. The dot 168 is unobstructed by any other printer 20 parts and is easily viewable from virtually any position the operator may be in during media sensor 10 alignment.

The media sensor 160 will work with virtually any media type that the printer 20 is capable of printing on and, preferably, is a "reflective" type of media sensor. As best shown in FIG. 14, the "reflective" media sensor 160 consists of a light emitter 170 and an optical detector 172 mounted on the same side of the media 113. The emitter 170 may be a light emitting diode, and the detector 172 may be a photo transistor, just as in the case of a "transmissive" type of media sensor.

As best shown again in FIG. 14, the sensor 160 is located under the media 113. The light from the emitter 170 is reflected off the backing 164 and into the detector 172. Pre-aligned emitter/detector pairs, with fixed focal points, are readily available from several manufacturers. The media sensor 160 detects the difference in reflectance of the label/backing combination versus that of the backing 164 alone. The vast majority of label media currently used in thermal and thermal transfer printers have sufficient contrasts between these reflectance values to provide reliable sensing.

The drive circuit for the light emitting diode 170 and the signal conditioning circuitry for the photo diode 172 (such circuitry not being shown) are similar in design to those of the conventional transmissive type sensor, and are well known in the art.

The reflectance of the label/backing combination 162/164 is generally higher than that of the backing 164 alone. Therefore, the inter-labeled gaps 163 appear dark to the optical detector 172. If media 113 with black marks for alignment is used, these black marks would also appear dark to the optical detector 172. Accordingly, the media sensor 160 will also work on that type of media 113 without alteration.

It should also be noted that the depth of field of the reflective sensor 160 is limited (typically 4 mm). This provides for easy sensing of the absence of media 113. The absence of a reflective surface will indicate as if dark. This also allows the sensor 160 to track media 113 that uses notches or holes for alignment.

The fact that both the emitter 170 and the detector 172 are mounted as one assembly on only one side of the media 113 simplifies the mechanical mounting and thereby lowers the complexity and cost of the system with which the media sensor 160 is used. Also, there are no concerns regarding the alignment of the emitter 170 and the detector 172 with one another.

Moreover, since there is no part of the sensor 160 located above the media 113 and because of the provision of the novel pivoting printhead assembly 96 of the present invention, complex media 113 threading and loading is eliminated. The media 113 is simply be laid into position.

As best shown in FIG. 11, the media carrier 166, which has the media sensor 160 thereon, is mounted on the rails in the elongated aperture 154 so that the media carrier 166 can be slid across the media path in order to optimize the sensing position. Again, because there is no upper assembly to mount or align, this reflective type of system is a considerable improvement over the prior art transmissive type of sensor.

Another important aspect of the reflective media sensor 160 design is that it can be placed much closer to the print line than the prior art sensors. As discussed above, printers operating in a thermal transfer mode require a ribbon 115 to be brought into contact with the label as it passes under the printhead means. Because ribbons are generally opaque, it is important that the prior art sensors be placed far enough back in the media path to sense the labels before the ribbon interferes with the sensing operation. However, placing the media sensor far enough back in the media path makes the system susceptible to drive roller slippage and the like that can occur between the point of sensing and the print line. Therefore, mounting the reflective sensor 160 in a position close to the printhead means 100, where the labels 162 and ribbon 115 are already together as described herein, can improve the overall tracking and print alignment.

It should also be noted that since the media sensor 160 is looking at the back side of the media 113, pre-printed areas on the face of the labels 162 have little or no effect on the sensing capabilities. As noted earlier, the media sensor 160 will also work with notched or black marked media, eliminating the need for a second sensor to be installed on the printer 20 when this type of media is used.

Figure 12A:
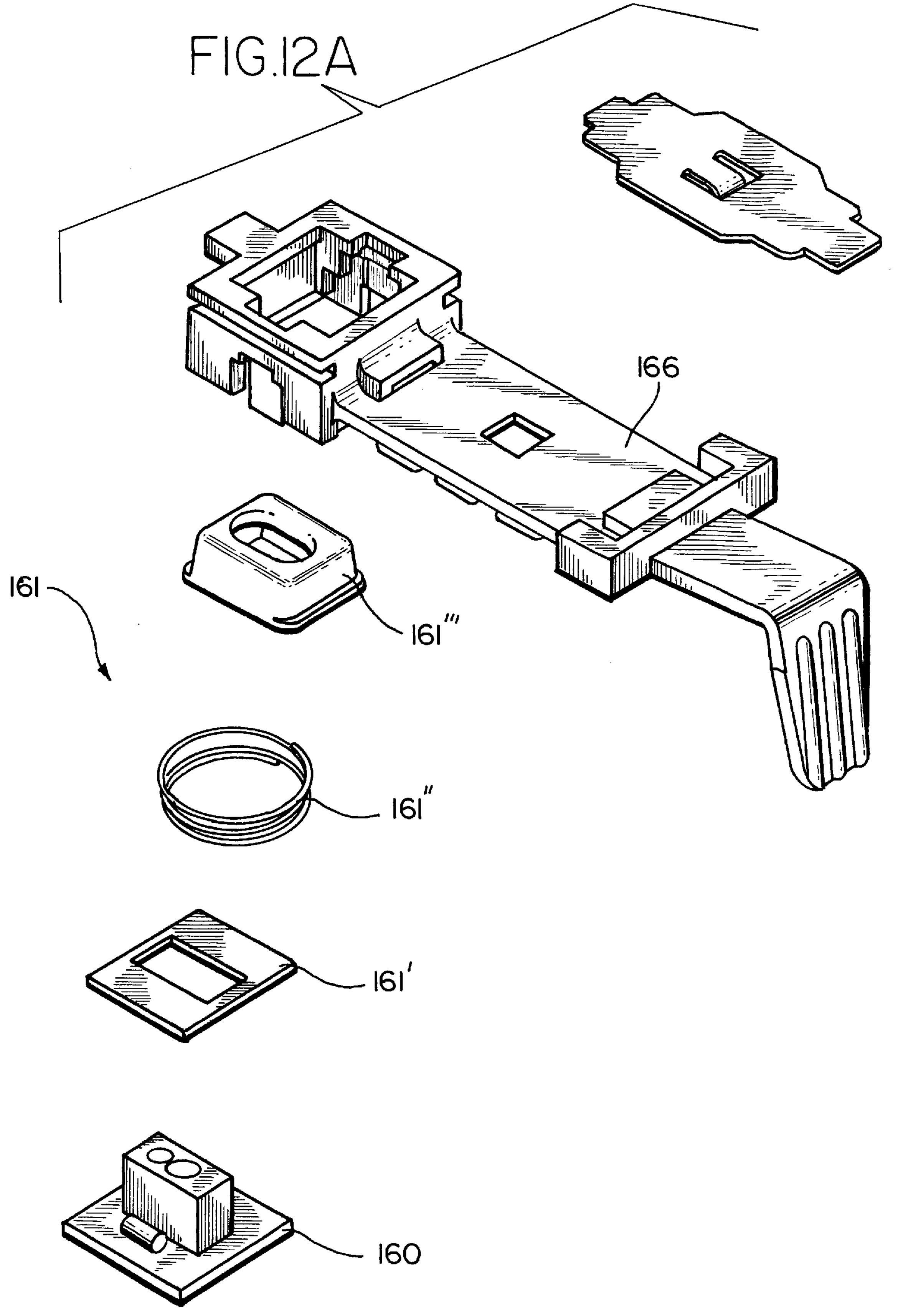
FIG. 12A is an exploded perspective view of a mounting assembly for the media sensor.

FIG. 12A illustrates an alternate embodiment of the mounting structure for the media sensor 160 wherein a spring mounted plastic shoe mechanism 161 is provided. The mechanism 161 comprises a back plate 161', a spring 161", 161'" which pins-down the media 113 positioned adjacent to the media sensor 160 thereby minimizing any vertical play associated with movement of the media 113 through the printer 20. Reliability and performance of the media sensor 160 is thereby enhanced.

Figure 15:
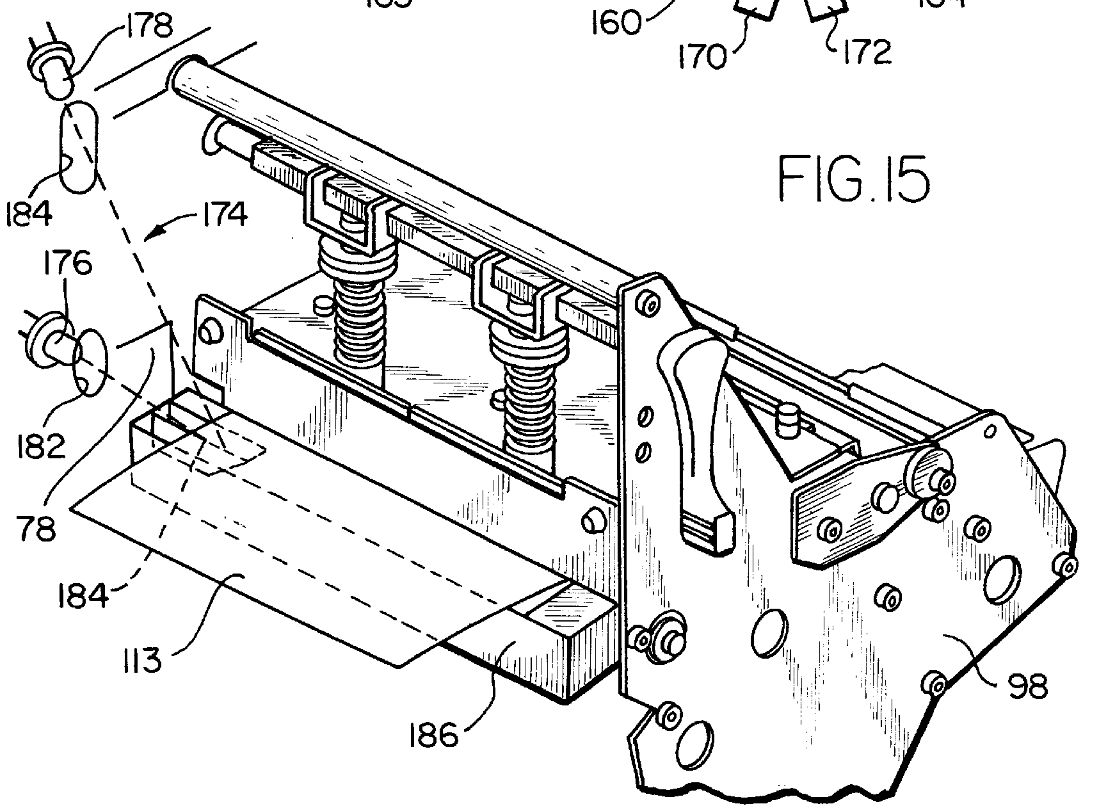
FIG. 15 is a partial perspective view of printhead assembly showing the media sensor of FIG. 13.
Figure 16:
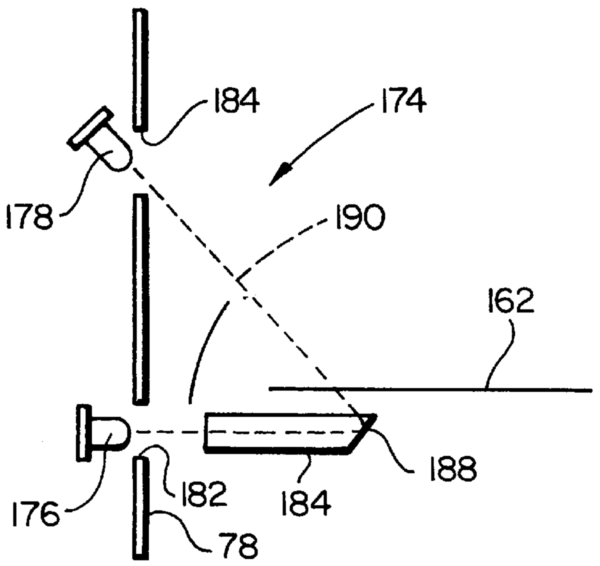
FIG. 16 is a schematic view of the media and the media sensor of FIG. 15.

A printed or "take" label sensor 174 of the present invention includes a coplanar emitter 176 and detector 178 mounted as shown in FIGS. 15 and 16. The emitter 176 and the detector 178 are mounted in the control panel 72 and are wired to the printed circuit board 86 therein. A pair of spaced apertures 182, 184, see FIG. 4, are provided through the side wall 78 of the control panel 72 with which the emitter 176 and the detector 178 are respectively aligned. The relative upper/lower position of the emitter 176 and the detector 178 is irrelevant because the sensor 174 will work with either configuration. Only susceptibility to ambient light will be affected. That is, the performance of the sensor 174 will be more likely to be affected by ambient light if the detector 178 is below the emitter 176. A light pipe 184 is mounted within a peel tear bar 186, such peel tear bar 186 being described in further detail herein, and not externally mounted to anything by itself, as in the prior art. The peel tear bar 186 is a bar that extends perpendicularly from the central support wall 32. Working alignment of the system is therefore guaranteed by the known mechanical mounting points of the peel tear bar 186 and the control panel 72 of the printer 20 which contains the emitter/detector 176/178 pair. With this configuration, a wide detection area will be present at the detector 178.

The emitter 176 is positioned at 0 degrees to the horizontal. Infrared light from the emitter 176 enters the light pipe 184 as shown by the dashed line in FIGS. 15 and 16. The infrared light traverses through the light pipe 184 until it reaches a mirrored end 188 which, in the illustrated embodiment, is 59.1 degrees to the horizontal. The infrared beam 190 is reflected by the mirrored surface 188 and directed towards the detector 178. The reflected beam angle is now 135 degrees to horizontal. The detector 178 is mounted parallel to the reflected beam 190 and detects the beam 190. When a label 162 is presented, the label 162 breaks the beam 190 as described in connection with the prior art.

Unlike the prior art system, however, the present invention is unique in that it only uses one light pipe 184 to achieve the more advantageous method of transmissive sensing while being totally unobtrusive to the media 113 and the ribbon 115 path. Thus it does not interfere with media 113 and ribbon 115 loading. All electronics are inside the control panel 72 of the printer 20. No additional parts are required. Manual sensor alignment is not required. Beam 190 alignment is guaranteed by having fixed positions for the printed label sensor 174 components and light pipe 184 and by providing a generous working area for the beam 190, i.e., almost one inch in diameter at the detector 178.

The printed label sensor 174 configuration can also be easily modified by adjusting angles and distances between the emitter/detector 176/178 and the light pipe 184, and by adjusting the light pipe mirrored surface 188 angle to accommodate virtually any kind of mounting arrangement.

The present invention also provides for a customer/user installable upgrade for printers originally not equipped with peel capability. The user is required only to install the peel mechanics to the printer 20. Once installed, the label sensor 174 system is complete. No electrical modifications are necessary. When peel mode is required, the user sets the mode through software or from the printer control panel 72.

The same ease of installation occurs when installing the power rewind/peel option, described herein. No additional steps are required to allow the sensor 174 to function.

Prior art required either factory installation or qualified technician installation for peel mode operation because of the complex mechanical and electrical modifications required to obtain peel mode sensing capabilities.

Attention is now directed back to FIGS. 4 and 8. The printer 20 of the present invention includes ribbon delivery means for delivering thermal transfer ribbon 115 to the printhead means 100. The ribbon delivery means includes a ribbon supply spindle 192 and a ribbon take-up spindle 194. The ribbon 115 is a thermally activated ribbon which transfers ink onto the media 113 when the printhead means 100 is thermally activated by suitable electronics.

The ribbon supply spindle 192 extends outwardly and perpendicularly from the central support wall 32 and is rotatably mounted thereto. The ribbon supply spindle 192 can be freely rotated relative to the central support wall 32.

The ribbon take-up spindle 194 extends outwardly and perpendicularly from the central support wall 32 and is rotatably mounted thereto. The ribbon take-up spindle 194 has a novel ribbon release system provided thereon which is used to release the compressive force of the spent ribbon 115 wound around the ribbon take-up spindle 194. The ribbon take-up spindle 194 winds up the spent ribbon 115 while holding the spent ribbon permanently under tension. Depending on the size of the ribbon supply roll and the size of the ribbon take-up roll, on a fully taken-up ribbon roll, many thousands of windings of tightly and under tension wound ribbon form a tough sleeve of ribbon which exerts a very high radial force onto the ribbon take-up spindle 194.

Figure 17:
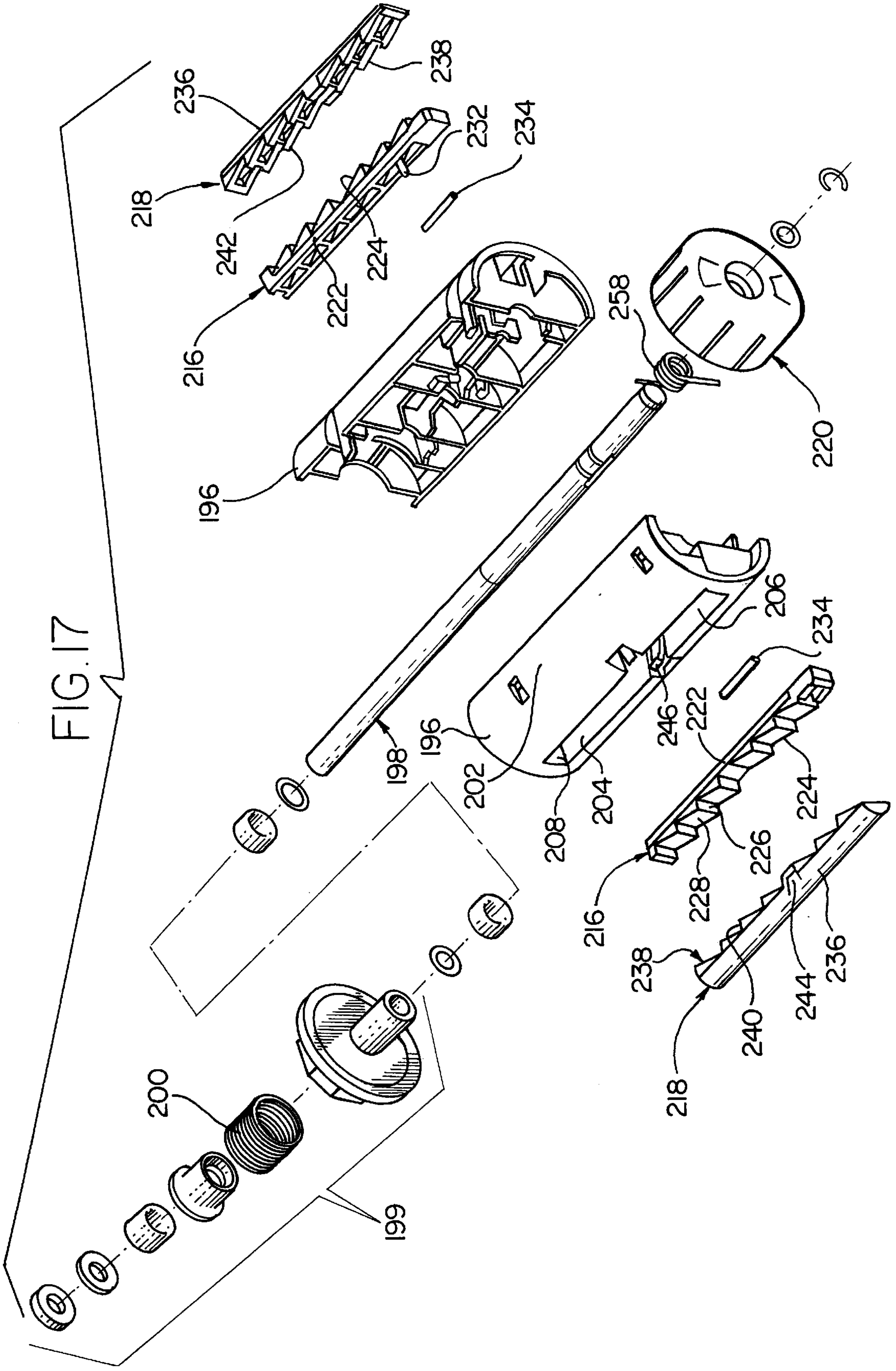
FIG. 17 is an exploded, perspective view of a ribbon take-up spindle of the printer of FIG. 1.
Figure 18:
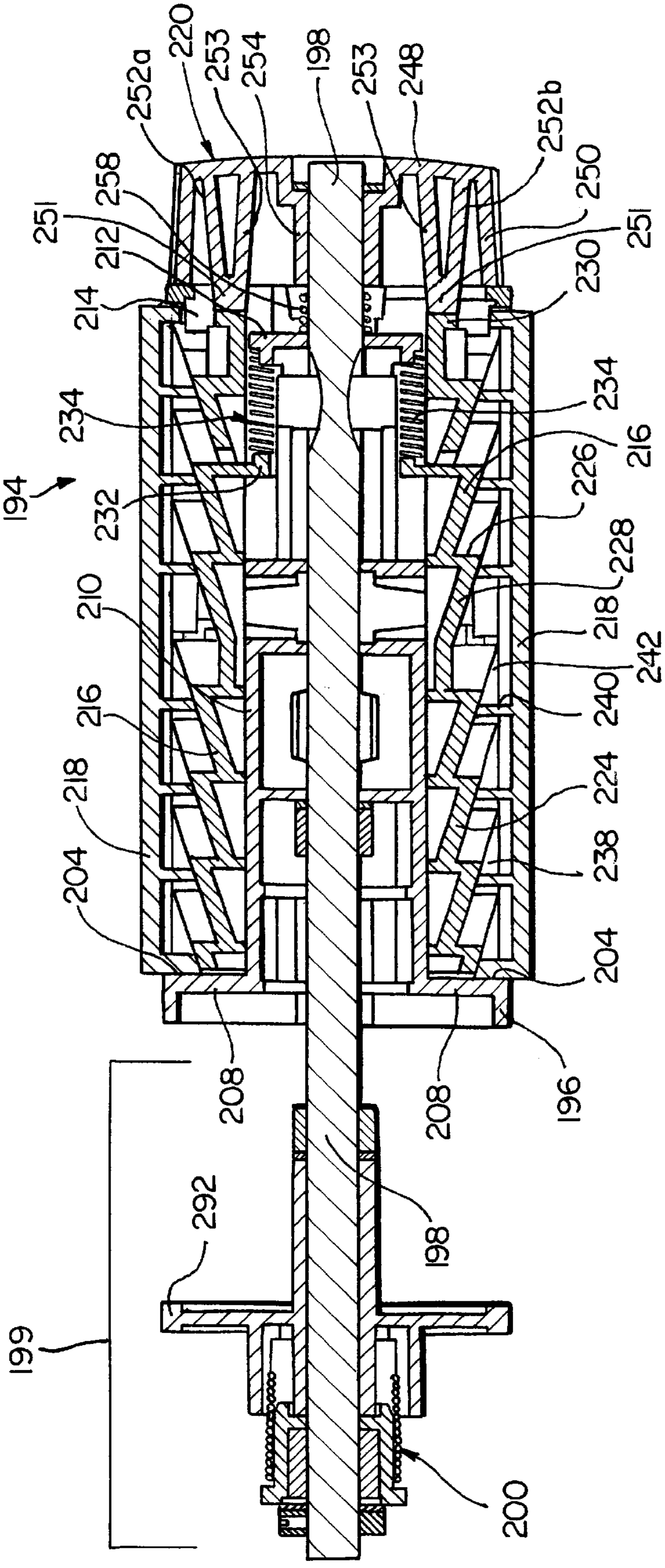
FIG. 18 is an assembled, cross-sectional view of the ribbon take-up spindle with a pair of blade members extended therefrom.
Figure 19:
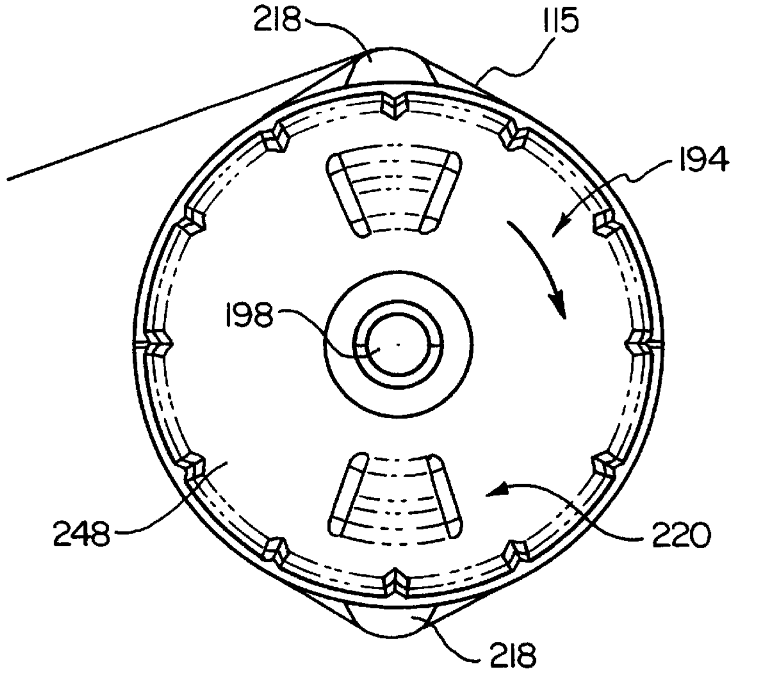
FIG. 19 is an end elevational view of the ribbon take-up spindle showing the pair of blade members extended therefrom and showing ribbon wound thereon.

As illustrated in FIGS. 17–19, the ribbon take-up spindle 194 is formed from a housing 196 which has a shaft 198 fixed mounted to and provided through the center thereof. The shaft 198 extends through the central support wall 32 and is connected to the driving system 122 by suitable means 199 and has a spring clutch 200 thereon. The ribbon take-up spindle 194 can be freely rotated in the clockwise direction to wind the spent ribbon 115 thereon, but is spring loaded by the spring clutch 200 to prevent easy counterclockwise rotation of the housing 196. The housing 196 has an outer, cylindrical wall 202 and a pair of opposed elongated recesses 204 formed therein so as to define elongated opposed slots in the outer wall. Each recess 204 is formed by opposite side walls 206, a rear wall 208 and a bottom wall 210 which extends only a portion of the length of the side walls 206. A front wall 212 of the recess 204 extends partially outwardly from the shaft 198, but does not close the front end of the recess 204 so as to define a space 214 between the front wall 214 and the outer cylindrical wall 202 for reasons described herein.

The ribbon release system provided on the ribbon take-up spindle 194 includes a pair of wedge members 216, a pair of blade members 218 and a rotatable knob 220. The wedge members 216 and the blade members 218 are mounted in the respective recesses 204.

Each wedge member 216 has a base 222 on which are plurality of wedges 224 are provided. Each wedge 224 is formed from a first, vertical face 226 and a face 228 which is angled relative to the vertical face 226 at a predetermined angle. A flat is provided between the centermost wedges 224. A forwardmost portion 230 of each wedge member 216 abuts against the radially outermost surface of the front wall 212 and extends into the space 214 between the front wall 212 and the outer cylindrical wall 202 of the housing 196. A protrusion 232 is integrally formed and extends from the base 222 of each wedge member 216. A coiled spring 234 is mounted between each protrusion 232 and the front wall 212 of the recess 204 for reasons described herein.

Each blade member 218 is mounted in the respective recess 204 and is engaged against the respective wedge member 218 as described herein. Each blade member 216 has an arcuate base 236 on which are plurality of blades 238 are provided. Each blade 238 is formed from a first, vertical face 240 and a face 242 which is angled relative to the vertical face 240 at a predetermined angle. A flat is provided on a center blade and a clip 244 extends from the base 236 of each blade member 218 at that point for acceptance of a clip 246 provided on the housing 196 within the recess 204. The mating of the clips 244, 246 secures the blade member 218 to the housing 196 and thus, the wedge member 216 to the housing 196 as it is sandwiched between the blade member 218 and the housing 196.

The knob 220 is rotatably mounted on the end of the shaft 198 and thus, rotatably mounted relative to the housing 196. The knob 220 has a circular end wall 248 with an outer cylindrical skirt or wall 250, a pair of opposed intermediate walls **252*a*, 252*b* and an inner cylindrical wall 254 depending therefrom. The outer wall 250 and the inner wall 254 are spaced from each other so as to define a cavity 256 therebetween. The opposed pair of intermediate walls 252*a*, 252*b* are mounted therebetween and within the cavity 256 so as to occupy space therewithin. Each intermediate wall 252*a*, 252*b* has an end surface 251 upon which the end 230 of the respective wedge member 216 bears as described herein and ramped side walls 253 which extend from the end surface 251 to the end wall 248. The shaft 198 is mounted through the inner cylindrical wall 254. The outer wall 250 has a plurality of grooves thereon to enable a user to easily grasp the knob 220. A torsion spring 258 is mounted around the shaft 198 and is connected to the knob 220 to constantly bias the knob 220 into a clockwise position. When the knob 220 is rotated into a counter-clockwise position, the blade members 218 can be substantially retracted into the respective recesses 204 to form a generally cylindrical exterior surface on the ribbon take-up spindle 194**.

As shown in FIGS. 18 and 19, in order to wind spent ribbon 115 onto the ribbon take-up spindle 194, the blade members 218 are in a locked position such that they extend outwardly from the cylindrical surface of the housing outer wall 202. Each angled face 242 of each blade 238 on each blade member 218 is engaged against the respective angled face 228 of the respective wedge 224 on the respective wedge member 216. The coiled springs 234 are in their naturally expanded state and act to bias the wedge members 216 toward the rear wall 208 of the recess 204 and the end 230 of each wedge member 216 abuts against the end surface 251 of the intermediate wall 252*a*, 252*b*.

Figure 21:
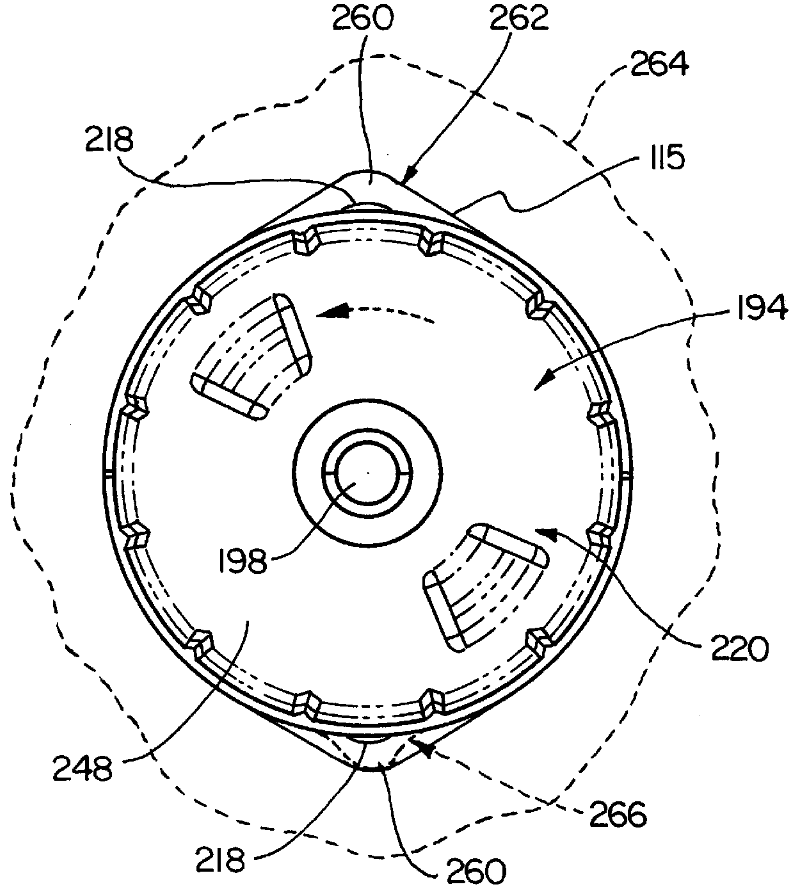
FIG. 21 is an end elevational view of the ribbon take-up spindle showing the pair of blade members retracted therein and showing ribbon wound thereon in phantom lines.
Figure 20:
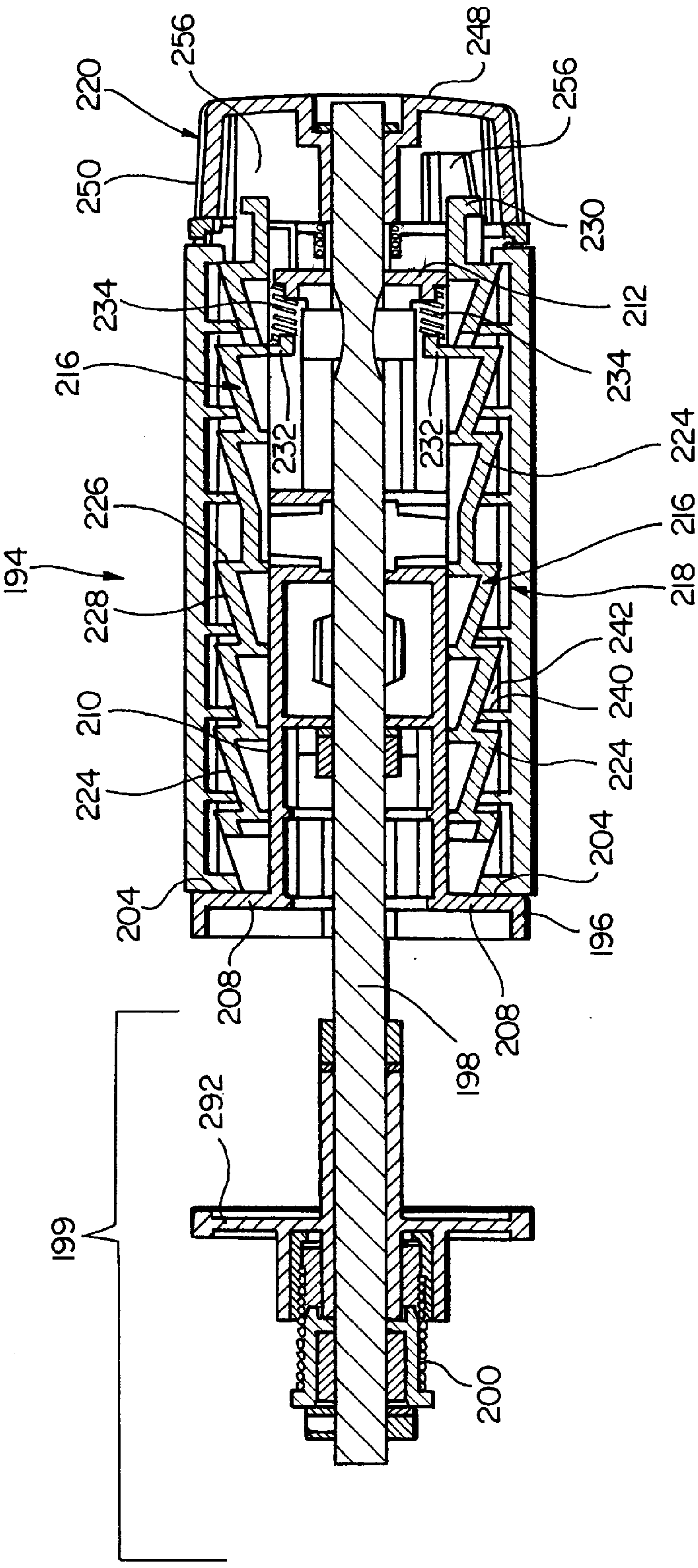
FIG. 20 is an assembled, cross-sectional view of the ribbon take-up spindle with the pair of blade members retracted therein.

As shown in FIGS. 20 and 21, to remove the wound spent ribbon 115 from the ribbon take-up spindle 194, the blade members 218 are retracted radially into the recesses 204 to form a generally cylindrical outer surface of the housing 196. When the blade members 218 are retracted, a space 260 is provided between the wound ribbon 115 and the housing 196 so that the wound ribbon 115 can be easily slid off of the housing 196. To retract the blade members 218, the knob 220 is rotated counter-clockwise by applying a counter-clockwise force on the knob 220 and to thereby rotate the ends 251 of the intermediate walls 252*a*, 252*b* out of alignment with the ends 230 of the wedge members 216. Once the ends 251 of the intermediate walls 252*a*, 252*b* no longer abut against the respective wedge members 216, the wedge members 216 can be moved axially along the recess 204 by sliding along the ramped wall 253 of the respective intermediate wall 252*a*, 252*b*. To do so, the radial inward force being applied by the wound ribbon on the blade members 218 causes the respective angled faces 242 of the blade members 218 to slide along the respective angled faces 228 of the wedge members 216, thereby causing axial movement of the wedge members 216 relative to the housing 196. When the wedge members 216 move axially, the respective ends 230 of the wedge members 216 move into the cavity 256 provided between the intermediate walls 248 within the knob 220 and the coiled springs 234 are compressed between the respective protrusions 232 and the front wall 212. The coiled springs 234 provide a slight "upward" force. The blade members 216 displace the wedge members 216 so long as the occurring coefficients of friction between the angled faces 242, 228 of the blade members 218 and wedge members 216 are sufficiently small and as long as the angle on each angled face 228 of each wedge 224 is sufficiently large.

Once the wound spent ribbon 115 is removed, the radially inward force on the blade members 218 is removed. This allows the coiled springs 234 to return to their naturally expanded state and automatically move the respective wedge members 216 toward the rear wall 208 of the recess 204. The respective angled faces 242 of the blade members 218 slide along the respective angled faces 228 of the wedge members 216 to move the blade members 218 radially outwardly so as to extend from the outer wall 202 of the housing 196. Once the counter-clockwise force is removed from the knob 220, the torsion spring 258 automatically returns the knob 220 to its clockwise position such that the respective ends 251 of the intermediate walls 252*a*, 252*b* abut against the ends 230 of the wedge members 216. In FIG. 21 which shows the ribbon 115 wound onto the spindle 194, a possible outline of innermost layer of wound up ribbon 115 is denoted by reference numeral 262; the phantom lines denoted by reference numeral 264 shows an alternate possible outline of the innermost layer of ribbon 115 when a "tunnel-effect" occurs; and the phantom lines denoted by reference numeral 266 shows the outline of the outermost layer of ribbon 115.

Figure 22:
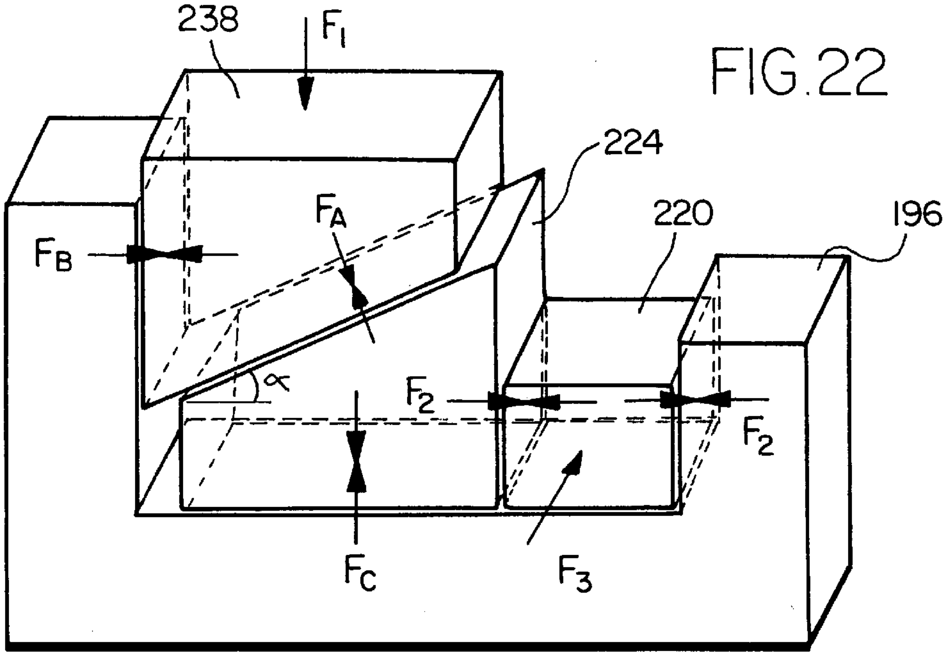
FIGS. 22–24 are schematic views of the components of the ribbon take-up spindle.
Figure 23:
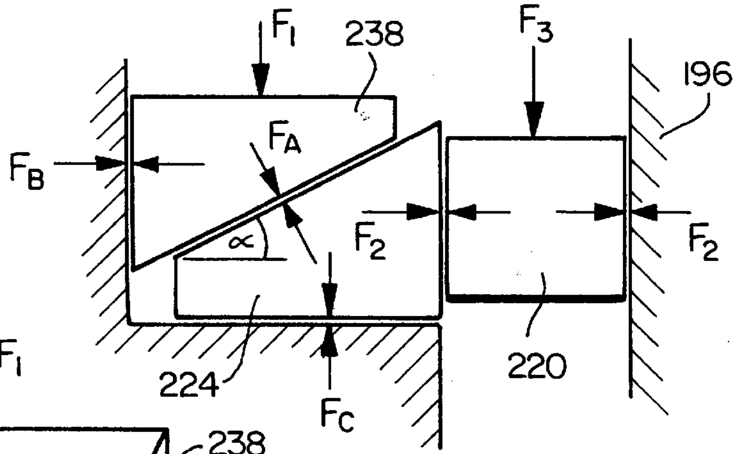
Figure 26:
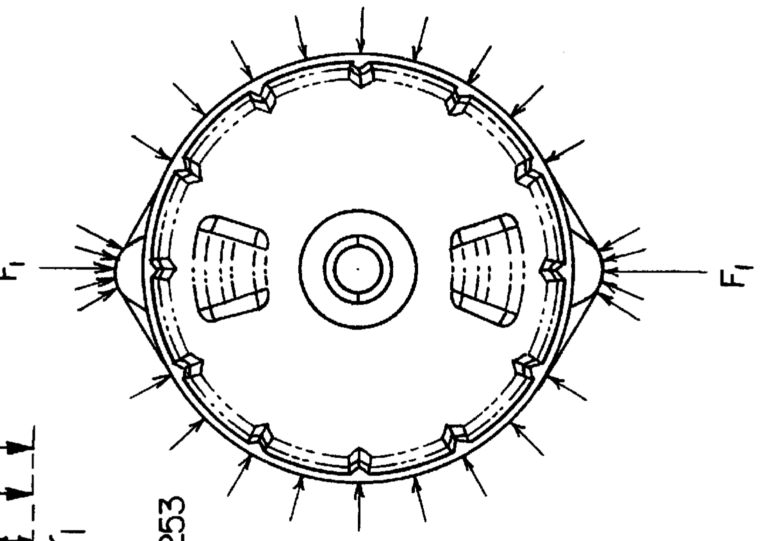
FIG. 26 is an end elevational view of the ribbon take-up spindle similar to FIG. 19 and showing the forces acting on the ribbon take-up spindle when the ribbon is wound thereon.

Attention is now directed to FIGS. 22–29 which schematically illustrate the mechanics of the ribbon take-up spindle 194. In FIG. 26, all of the wound layers of ribbon 115 are shown as a single layer for convenience in the drawing. In the following description and as shown in the drawings, the nomenclature is:

$\alpha$: the wedge 224 angle alpha;

$F_1$: any external force or load introduced into the system (in this instance, it is the force introduced by the wound up ribbon 115, in short: ribbon force);

$F_2$: the forces acting between the wedge member 216 and the knob 220 (in FIGS. 22 and 23 it also describes the forces acting between the knob 220 and the housing 196 since they are of equal magnitude and direction);

$F_3$: the force required to move the knob 220 in constant linear motion in the direction indicated by the force arrow (in this instance, it is also the actuation force which the user has to apply);

$F_A$: the forces acting between the blade member 218 and the wedge member 216;

$F_B$: the forces acting between the blade member 218 and the housing 196;

$F_C$: the forces acting between the wedge member 216 and the housing 196; and $\mu$: coefficient of friction.

Figure 24:
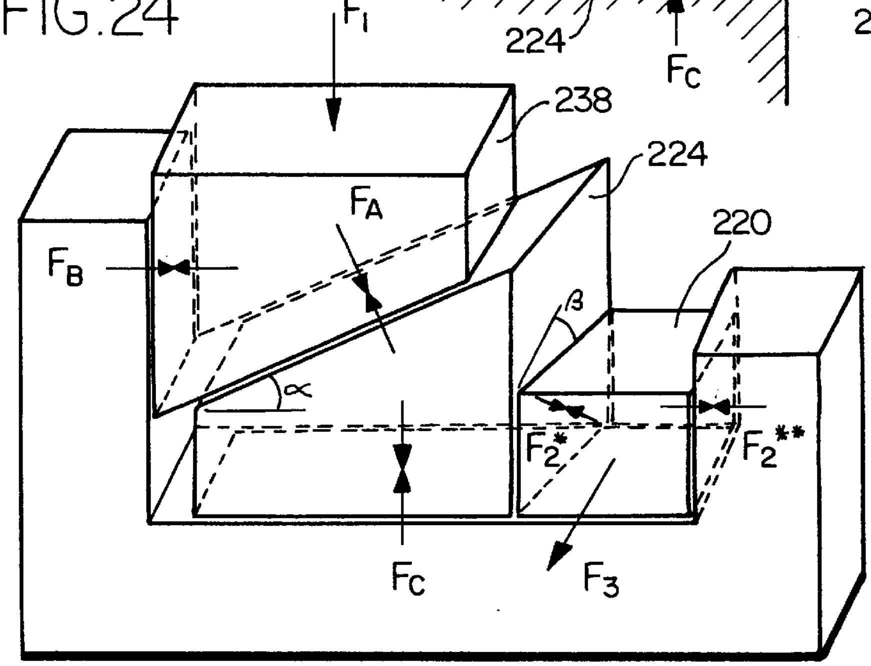
Figure 25:
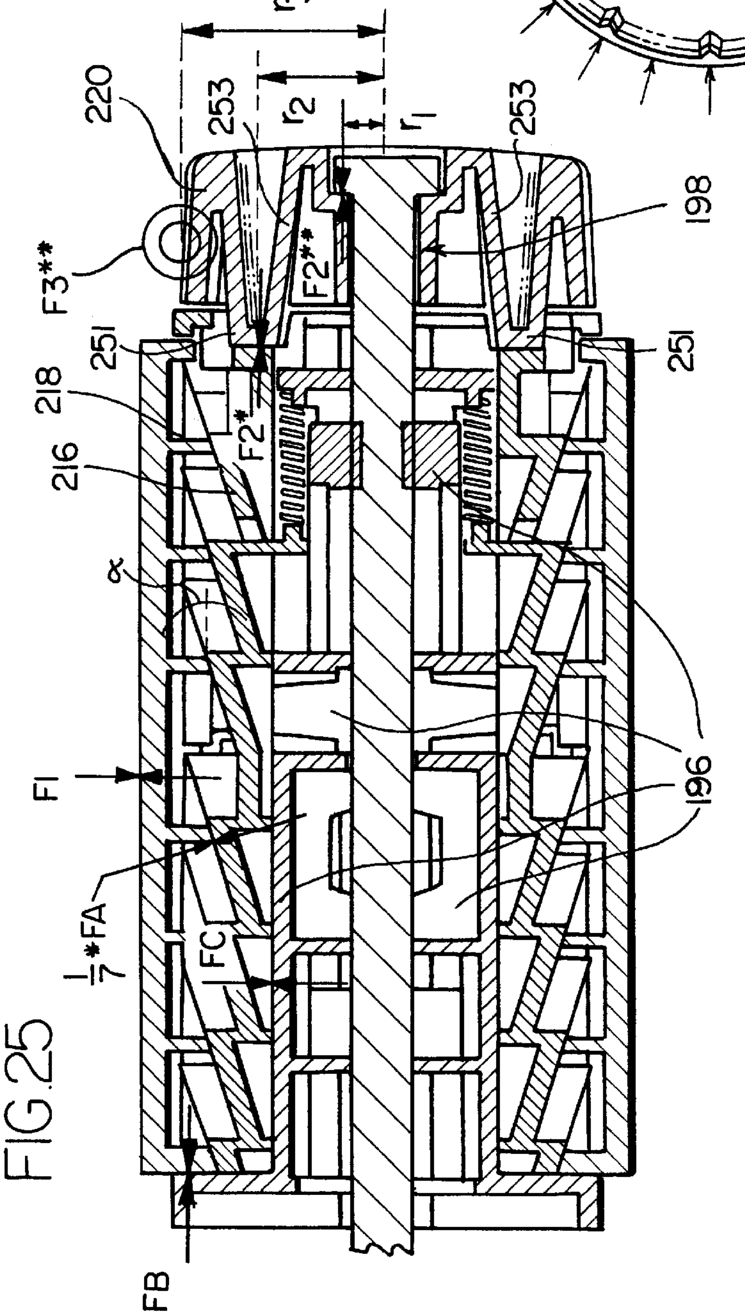
FIG. 25 is a cross-sectional view of the ribbon take-up spindle with the pair of blade members extended therefrom and showing the forces acting on the ribbon take-up spindle.

Because of the lock angle $\beta$, this is not the case in FIGS. 24–26 and thus in these FIGURES:

($F_2$*): the forces acting between the wedge member 216 and the knob 220;

$F_2$: the forces acting between the knob 220 and the housing 196**; and $\beta$: the lock angle beta.

Additional nomenclature for FIG. 25 is explained later.

Figure 27:
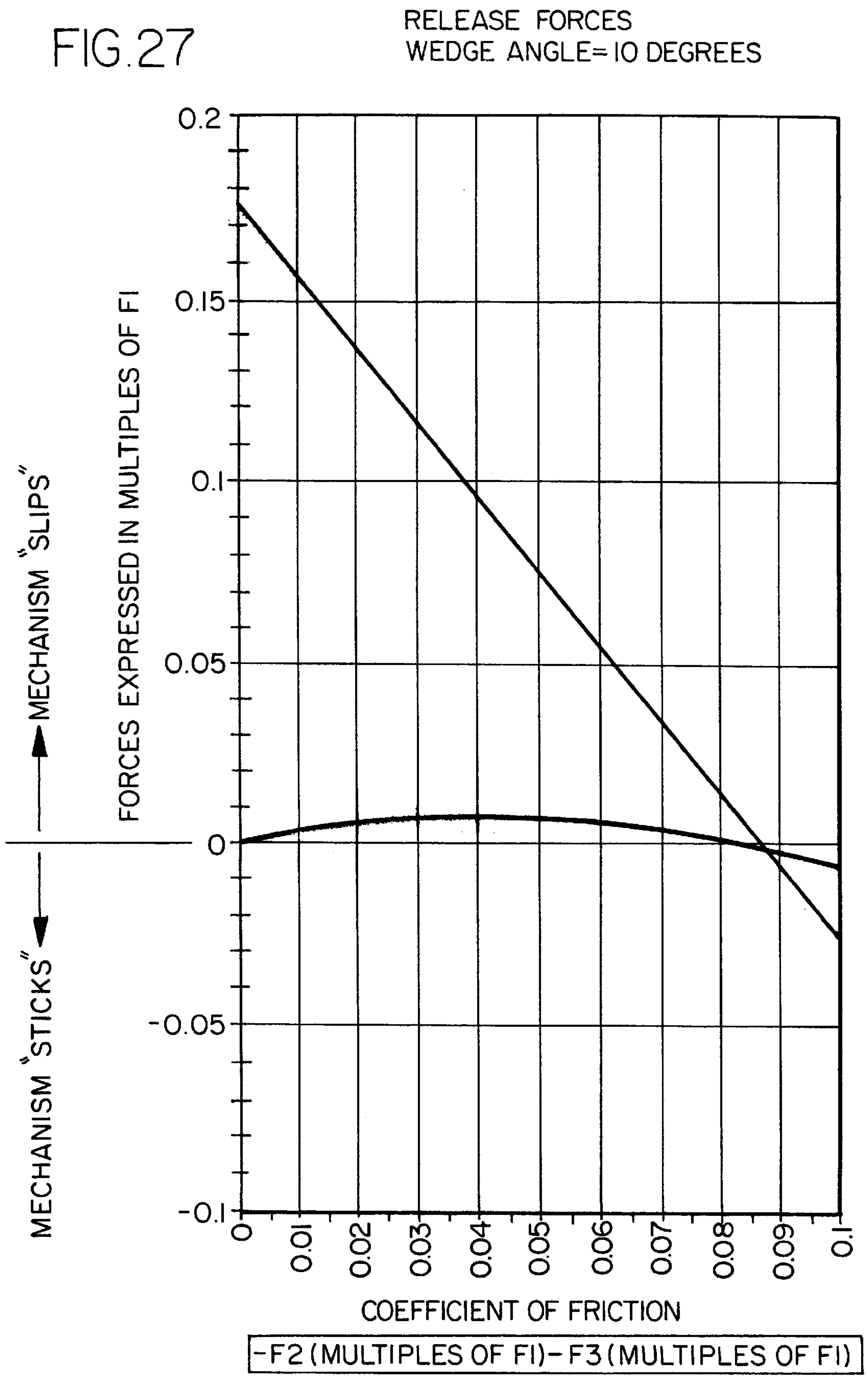
FIGS. 27–29 are graphs which show the release forces on the ribbon take-up spindle for different angles of the components.
Figure 28:
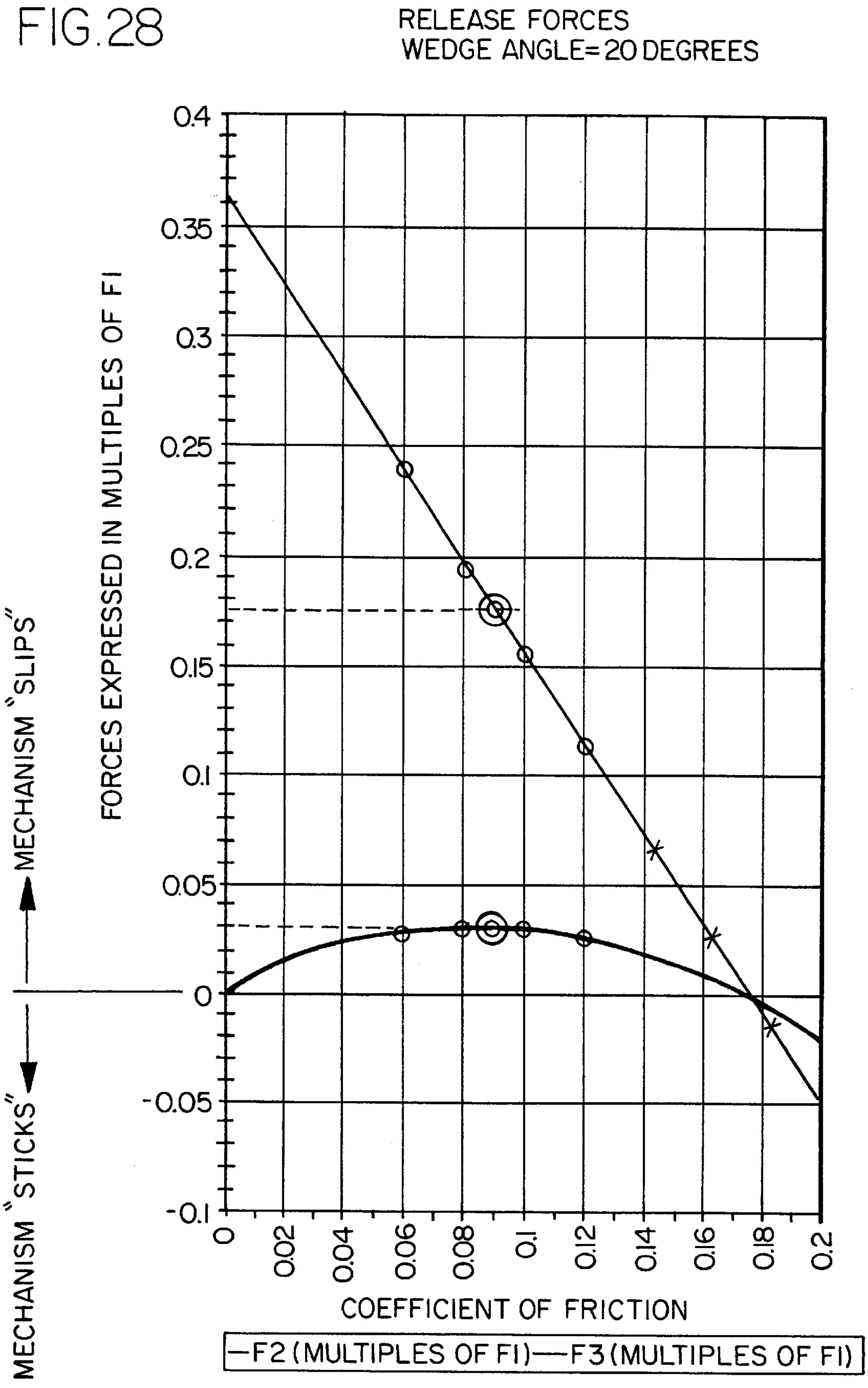
Figure 29:
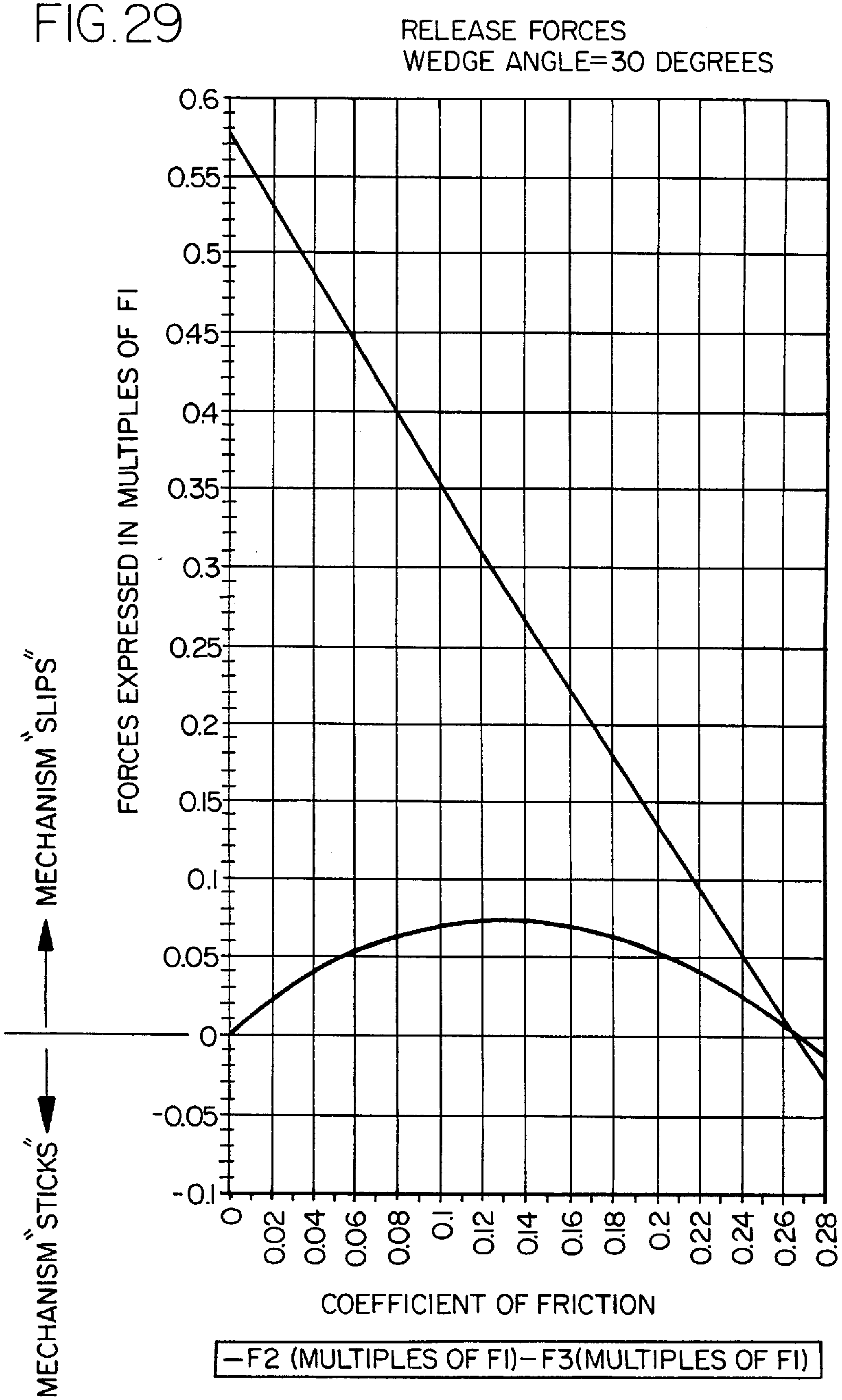

As shown in the graphs in FIGS. 27–29, it was assumed that the occurring coefficients of friction are exactly the same at every relevant boundary. Of course, by varying the angles of the wedges 224 and the blades 238, different coefficients of friction can be accommodated.

The following is an example of the application of the present invention. A load $F_1$ of 200 lb. is applied. The wedge 224 angle $\alpha$ is 20°. The nominal value of the coefficient of friction is 0.09. The graph in FIG. 28 shows that the force $F_2$ with which the wedge member 216 pushes to the right in the drawings is reduced to approximately 17.5% of $F_1$. In this example, that would be 35 lb. The remaining forces are lost in friction between the blade member 218 and the wedge member 216, by friction between the blade member 218 and the housing 196 (although this loss is negligible), as well as by friction between the wedge member 216 and the housing 196. The actuation force $F_3$, however, is further reduced by friction between the wedge member 216 and the knob 220, as well as by friction between the knob 220 and the housing 196. As the graph shows, the resulting $F_3$ is only 3% of $F_1$. In this example, that is 6 lbs.

The novel ribbon release system provided on the ribbon take-up spindle 194 of the present invention is self-compensating for changes or variations in the coefficient of friction up to a point. This makes for a robust design as opposed to prior art ribbon release systems.

The multiple wedges 224 and blades 238 can be altered to work at a certain coefficient of friction with a certain wedge angle. The problem with this is that relative small deviations of the desired coefficient of friction causes relative large variations in $F_2$. Variations of the coefficient of friction occur for many reasons. Slight variations in the wedge angle also add up to even more variations in the coefficient of friction.

As indicated by the graphs in FIGS. 27–29, the ribbon release system provided on the ribbon take-up spindle 194 functions so long as the coefficient of friction is such that system always slips. That means the system is operable anywhere from a coefficient of friction of 0.00 to the point where it will not slip. To go back to the prior example (wedge angle=20°) (see FIGS. 22–24), the useable range of coefficient of friction is anywhere from 0.00 to about 0.175. The nominal design value was chosen to be 0.09 because it is about at the high-point of the $F_2$-curve, so any variation in coefficient of friction would actually reduce the required actuation force without rendering the system inoperable. That is true until the coefficient of friction exceeds 0.175, at which point the system sticks and does not operate. The margin of safety is much larger and makes this system very robust.

As discussed herein, the system of the present invention self-compensates for variations of the coefficient of friction. To simplify this discussion, it is assumed that the coefficient of friction is the same at all points in the system. As shown in FIGS. 22 and 23, $F_2$ is a function of $F_1$, the wedge-angle, the coefficient of friction and the frictional losses at all surface contacts with relative motion, mostly however where $F_A$ and $F_B$ act. $F_3$ can be looked at as a function of $F_2$, the coefficient of friction and the friction losses where $F_2$ acts. At a given $F_1$, as $F_2$ lowers, the higher the coefficient of friction is because the frictional losses are higher. For $F_3$, the frictional losses are higher as well with a higher coefficient of friction, at the same time however, the same higher coefficient of friction has caused the input force $F_2$ for $F_3$ to be lower. Thus, the resulting $F_3$ at a higher coefficient of friction will be somewhat near the resulting $F_3$ at a lower coefficient of friction—and vice versa. This is true up to the point where the coefficient of friction is large enough to "make" the system stick. In reality, of course, the coefficients of friction are never the same at all locations, but the designer has a great influence on that by properly choosing the materials. The tendency that the coefficient of friction will vary to the same side (lower or higher) at all locations is easily understandable. So, for example, some paper dust might raise the coefficient of friction at all locations, thus it will increase the frictional losses up to $F_2$ and thus, lower $F_2$. It will, however, also increase the frictional losses up to $F_3$, thus, theoretically raising $F_3$ except that the $F_2$ which is the input force for $F_3$ was lowered, so the actually resulting $F_3$ will not be raised as much or even be lowered. It is easily recognizable that this tendency in general will be true even if the coefficient of friction is different at different locations to start out with.

The graphs in FIGS. 27–29 show this for three different wedge angles α. The graphs are based on a mechanism as shown in FIGS. 22 and 23, on the simplifying assumption that the coefficient of friction is the same at all locations and on the simplification that the frictional losses where $F_B$ acts are negligible. The two formulas used to generate the graphs are:

$$F_2=F_1*(\mathrm{TAN}(\delta-\alpha)+\mathrm{TAN}(\delta))$$

$$F_3=F_2*2*\mathrm{TAN}(\delta)$$

with α being inputted in radians and δ being the "friction angle" (in radians): δ=ARCTAN(μ) with μ being the coefficient of friction a "constant" obtained from experimental data or from published data based on experimental data.

Looking at the graphs in FIGS. 27–29, it is recognized that a higher wedge-angle α makes for a more robust design accommodating a larger range of coefficient of friction at the tradeoff of having a higher maximum actuation force $F_3$. Whereas, a lower wedge angle α makes for a less robust design with the maximum occurring force $F_3$ being lower so. Thus, the designer can determine, by choosing the wedge-angle, the correct characteristics for his or her scenario. Should the printer 20, for example, work in an environment where contamination and thus alteration of the coefficient of friction is likely or should material combinations be chosen which have a higher coefficient of friction to start out with, a higher wedge angle α will be chosen. If, at the same time, a very high input load $F_1$ might occur, it might be necessary to reduce the actuation force $F_3$ further by giving it a further mechanical advantage.

One such possible improvement is to introduce a lock angle β as shown in FIG. 24. It is easily recognizable that this lock angle β will reduce the force $F_3$ required to move the knob 220 into the marked direction of $F_3$. The functional requirement for the coefficient of friction here is that the knob 220 may not slip. In other words, lock angle β has to be small enough that the knob 220 will not slip without any actuation force being applied. Not only does this reduce the actuation force, but it also has the following effect. When the knob 220 is moved, the wedge member 216 can gradually move to the right in the drawings by the amount the ramped wall 253 of the intermediate walls 252*a*, 252*b* allows it to move. With the wedge member 216 gradually moving to the right in the drawings, the blade member 218 can gradually move radially inwardly. If $F_1$ is caused by gravity, for example, lock angle β will reduce the actuation force $F_3$, but will have no effect on what happens in "our application": the force $F_1$ introduced by the ribbon 115 on the blade member 218 is reduced if the blade member 218 moves radially inwardly because the blade member 2318 moving radially inwardly reduces the stress and "stretch" in the elastic ribbon 115. Thus, the force $F_1$ gets gradually reduced. This has the positive side effect that when the knob 220 has been moved far enough so that it almost gives the wedge member 216 clearance to move all the way to the right in the drawings, the forces $F_1$, and thus $F_2$, can be reduced far enough to not cause any too high stress concentrations as a result of the reduced contact areas. Radiing (putting a radius on) the ends 230, 251 edges of both the wedge member 216 and the intermediate walls 252*a*, 252*b* which contact each other will further improve the situation. Of course, more advanced cam-shapes can be applied as well.

The lock angle β can be increased such that the knob 220 will always slip to reduce actuation force. In this situation, because the knob 220 will always slip, another member is added to block the movement of the knob 220. The inward force acts onto the member and is reduced by a whole order of magnitude and the independence from the coefficient of friction is increased.

FIG. 25 shows the actual assembly with forces and angles marked on it to correlate it to FIG. 24. In addition, it shows how the knob 220 adds a mechanical advantage to further reduce the actuation force. The forces $F_2$* between the wedge members 216 and the knob 220 act with the friction radius $r_2$. The forces $F_2$ between the knob 220 and the shaft 198, which in assembly is one with the housing 196**, act with the friction radius $r_1$. The actuation force, however, is applied with the lever length—or the radius $r_3$. $r_3$ is a much larger "lever" than both $r_2$ and $r_1$. Thus, it is easily visible how a further reduction in actuation force is achieved.

The novel ribbon release system provided on the ribbon take-up spindle 194 uses two mechanical advantage systems. The respective wedge members 216 and blade members 218 form one mechanical system while the rotating knob 220 forms the second mechanical system. Having two mechanical systems is an advantage because a low force release of a large load is allowed without having an excessively high mechanical advantage on either load of the systems. A high mechanical advantage system is difficult to control. Also, because the wedge members 216 are multi-faced to support and release the compressive force of the wound spent ribbon 115, the large surface area provides less stress on the wound ribbon roll. Using more than one mechanical advantage system decreases the sensitivity of the releasing load to friction changes. This allows the mechanical advantage of each system to be sufficiently low to where the release loads do not vary greatly with a potential wide range of friction in the materials used.

In the present invention, the ribbon release system provided on the ribbon take-up spindle 194 is self-resetting because of the coiled springs 234 which push the respective wedge members 216 to the left in the drawings, which causes the blade members 218 to be pushed radially outwardly, and thereby allows the torsion spring 258 to return the knob 220 to its original, clockwise and locked position. In the present invention, the intermediate walls 252*a*, 252*b* of the knob 220 can be designed so as to never completely disengage from contact with the respective ends 230 of the wedge members 216. This results in the advantage that only one return spring is needed for the knob 220 which will then push the wedge members 216, and thus the blade members 218, back to their original positions. A disadvantage is that the amount of movement for the knob 220 needed to provide the same amount of movement for the blade members 218, everything else being the same, is vastly larger.

It is to be understood that the knob 220 could be replaced with cam, screws and the like so long as the mechanical advantage is still provided by the structure.

The ribbon release system provided on the ribbon take-up spindle 194 provides a low cost means to remove the wound, spent ribbon 115 easily, fast and reliably even under worst case conditions. The ribbon release system provided on the ribbon take-up spindle 194 is, within limits, self-compensating for changes in coefficient of friction as a result of environmental influences or contamination as well as material and surface properties variations. Thus, the ribbon release system keeps the required actuation force reliably within very reasonable limits. In addition, the ribbon release system is self-resetting and there are no loose parts which might be forgotten to be put back on prior to starting a new roll of ribbon.

It is to be noted that this novel ribbon release system provided on the ribbon take-up spindle 194 has application to any structure in which the releasing of loads of any kind of media, such as paper, plastic, twine, wire, rope, etc., wound onto on a carrier, e.g. a roll, spindle or other body, is desirable in order to remove the media from the carrier. The present system can be used on any structure in which loads or forces need to be released in a sudden way, or in a controlled way.

The multi-faced wedge members 216 increase the contact surface areas and provides for evenly distributed and well-balanced support under the whole length of the blade members 218 with any desirable wedge angle (the steeper the angle, the higher the wedge-face-count possible). Design freedom with the wedge angle, while still providing good support, also allows a designer to match the best angle to the occurring coefficient of friction (depending on materials chosen). Also contributing to the lower actuation forces is that in the stationary (supporting) position, the blade members 218 are not resting on horizontal surfaces leading into the wedge faces, but directly on the angled wedge faces 228 themselves. The wedge angle is chosen such that under load, the blade members 218 and the wedge members 216 do not move, but the angle significantly reduces the actuation forces required. The dramatically increased contact surface reduces the surface pressure per surface unit, and thus reduces stress, and therefore allows the use of materials which otherwise would be stressed too high.

In FIGS. 18 and 20, it is visible how the total contact area increases with the number of wedge faces 228 employed. In FIG. 20 which shows the blade members 218 in the retracted position, the contact area is increased, plus the ribbon 115 is relaxed, so no loads are present. Therefore, with this design, when the blade members 218 are fully extended as shown in FIG. 18, this is the worst case position for surface contact pressure per contact surface area. FIGS. 27–29 show how the actuation force changes with the coefficient of friction for three different wedge angles $\alpha$.

Figure 10:
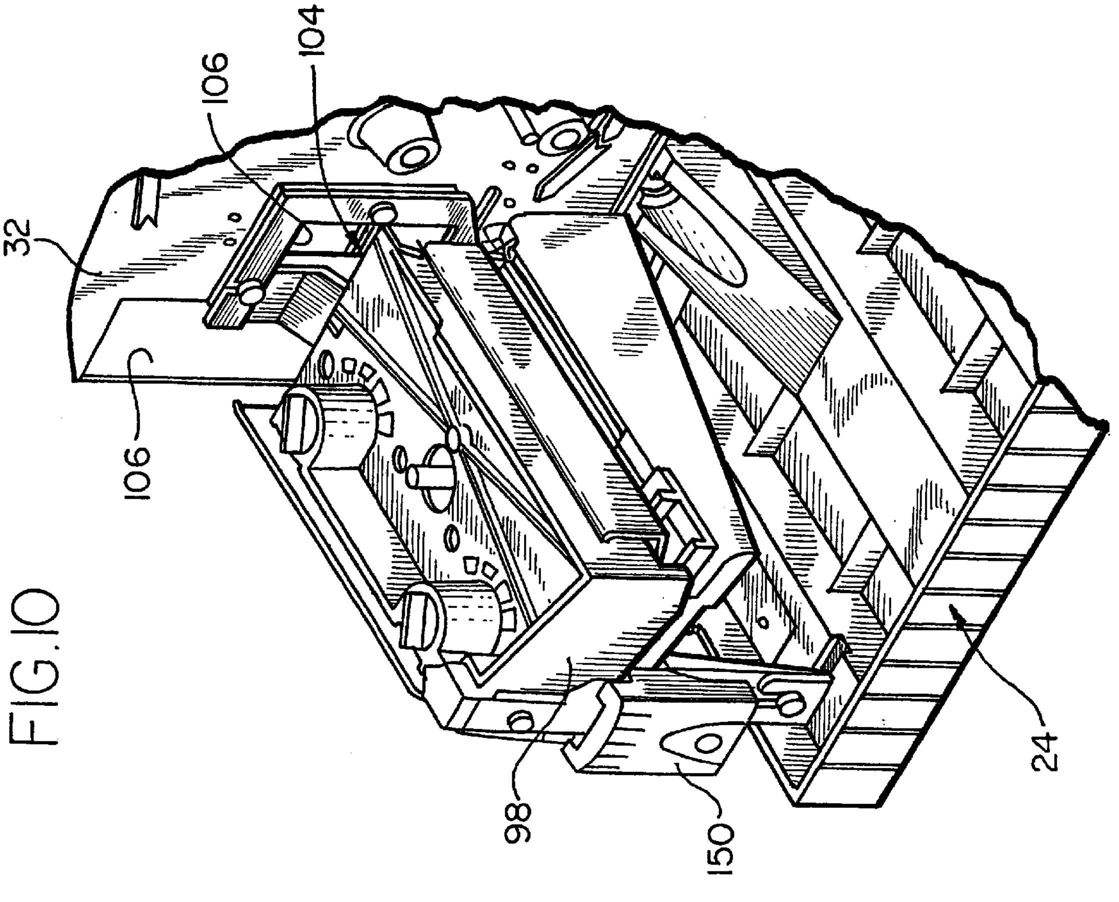
FIG. 10 is a perspective view of the printhead assembly of FIG. 9 mounted on a central support wall of the printer, with the printhead assembly in a closed position for printing on a media.

As described herein and as shown in FIGS. 10 and 11, the printhead support 96, and thus the printhead means 100 which is mounted thereon, can be pivoted relative to the platen roller 118 and the central support wall 32. This allows for user access to provide for the easy loading/threading of the media 113 and the ribbon 115 into the printer 20 and also allows for the easy cleaning or replacement of the printhead means 100 or the platen roller 118 by the user. The present invention does not require that the media 113 and/or ribbon 115 be moved with the printhead support 98 when it is pivoted. This results in a simplified construction of the printer 20.

In a printing position, the printhead support 98 and printhead means 100 is positioned such that the central axis of the printhead support 98 is aligned with the central axis of the platen roller 118. The coiled spring 146 biases the latch cover 150 and latch 148 into a generally vertical position such that the latch member 152 on the platen support structure 124 engages the catch member 102 on the printhead support 98. When the catch member 102 and latch member 152 are engaged, the force of the coiled spring 112, which acts to bias the printhead support 98 upwardly, is overcome.

To move the printhead support 98 and printhead means 100 to a pivoted position so that the media 113 and the ribbon 115 can be easily loaded, a user presses inwardly toward the platen roller 118 on the bottom end of the latch cover 150 to overcome the biasing force of the coiled spring 146 such that the upper end of the latch 138 is pivoted outwardly from the platen roller 118 via hinge 136 to release the engagement of the latch member 152 with the catch member 102. The coiled spring 112 between the printhead support 98 and the platen support structure 124 biases the printhead support 98 upwardly such that the outer end of the printhead support 98 pivots upwardly from the platen roller 118 around the opposite end of the printhead support 98. Thus, the printhead supports 98 pivots upwardly in the same vertical plane defined by the platen roller central axis. The hinge 104 has an axis of rotation which is parallel to the direction of the media 113 and ribbon 115 travel at the point where the media 113 and ribbon 115 pass between the printhead means 100 and the platen roller 118. This creates an opening at the outer, accessible end of between the printhead support 98 and the platen roller 118 for easily side-loading/threading the media 113 and the ribbon 115 into the printer 20 without pivoting of the ribbon 115.

Previous designs of the side opening-type caused the ribbon to pivot upwardly with the printhead support. In a thermal transfer printer, this ribbon is driven by mechanical means, and the elements that caused this driving were required to pivot up with the printhead means in prior art designs. In the printer 20 of the present invention, only the printhead support 98 and the pressure delivery means provided within the printhead support 98 pivot upwardly from the platen roller 118 to create the side opening. Driven components do not need to be disengaged and engaged from the drive motor.

As shown by the arrows in FIG. 8, the media 113 is mounted on the media hangar 114 and the media 113 is threaded from the top of the roll 99 such that it unrolls in a counter-clockwise motion, under the dancer assembly 116, over the rail portion 128 of the platen support structure 124, over the platen roller 118 and out of the front of the printer 20. This defines the media stream. Alternatively, the media 113 can be feed through the rear slot 64, under the dancer assembly 116, over the rail portion 128 of the platen support structure 124, over the platen roller 118 and out of the front of the printer 20 through slot 70. Again, as shown by the arrows in FIG. 8, a roll 117 of ribbon 115 is mounted on the ribbon supply spindle 192 such that it unrolls in a clockwise motion, over the rail portion 128 of the platen support structure 124 and over the media 113, under the printhead means 110, up over the printhead support structure 98 and is wound up on the ribbon take-up spindle 194 in a clockwise manner. This defines the ribbon stream. Of course, to form the slots 64 and 70, the hinged cover portion 36 is pivoted downwardly. The hinged cover portion 36 is pivoted downwardly during operation of the printer 20.

Thereafter, the printhead support 98 is pushed downwardly so as to pivot in the vertical plane defined by the platen roller central axis until the catch member 102 on the printhead support 98 engages with the latch member 152 provided on the platen support structure 124. The media 113 and the ribbon 115 are then positioned between the printhead means 100 and the platen roller 118 with the underside of the media 113 contacting the platen roller 118 and upperside of the media 113 being in contact with the underside of the ribbon 115. The upperside of the ribbon 115 is in contact with the thermal elements on the printhead means 100.

During operation, the media 113 on which indicia is to be printed is fed into the media stream under the influence of the positively driven platen roller 118. The ribbon 115 is fed from the ribbon supply spindle into the ribbon stream under the influence of friction between the ribbon 115 and the media stream and secondarily, the influence of the ribbon take-up spindle 194 as it is driven by the driving system 122 described herein.

After the media 113 is printed on, the printed-on media 113 can pass over a cutter 268, which is known in the art, or passes through a novel passive peel system 270, **270*a*, 270*b* provided on the printer 20 which is used to separate or peel the labels 162 easily from the backing 164 with zero or low tension on the backing 164. This simplifies peeling, makes label printing registration easier to control, reduces the tension required on the backing 164, if tension is used, which makes rewinding of the backing 164 easier, and reduces cost. The cutter 268 is shown in FIGS. 4 and 8**.

Figure 30:
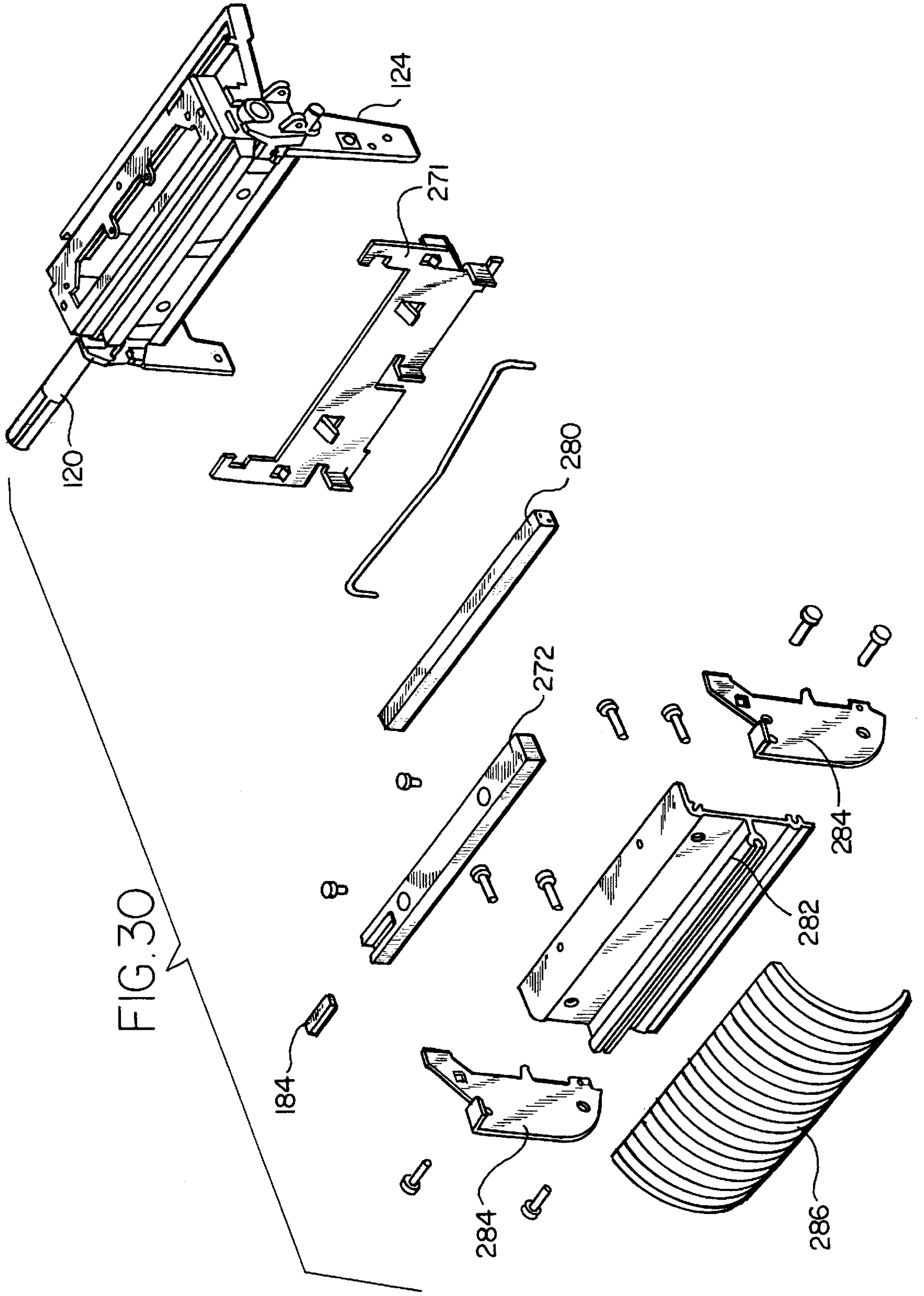
FIG. 30 is an exploded perspective of a passive peel system which can be attached to the printer for peeling labels off of a backing.
Figure 31:
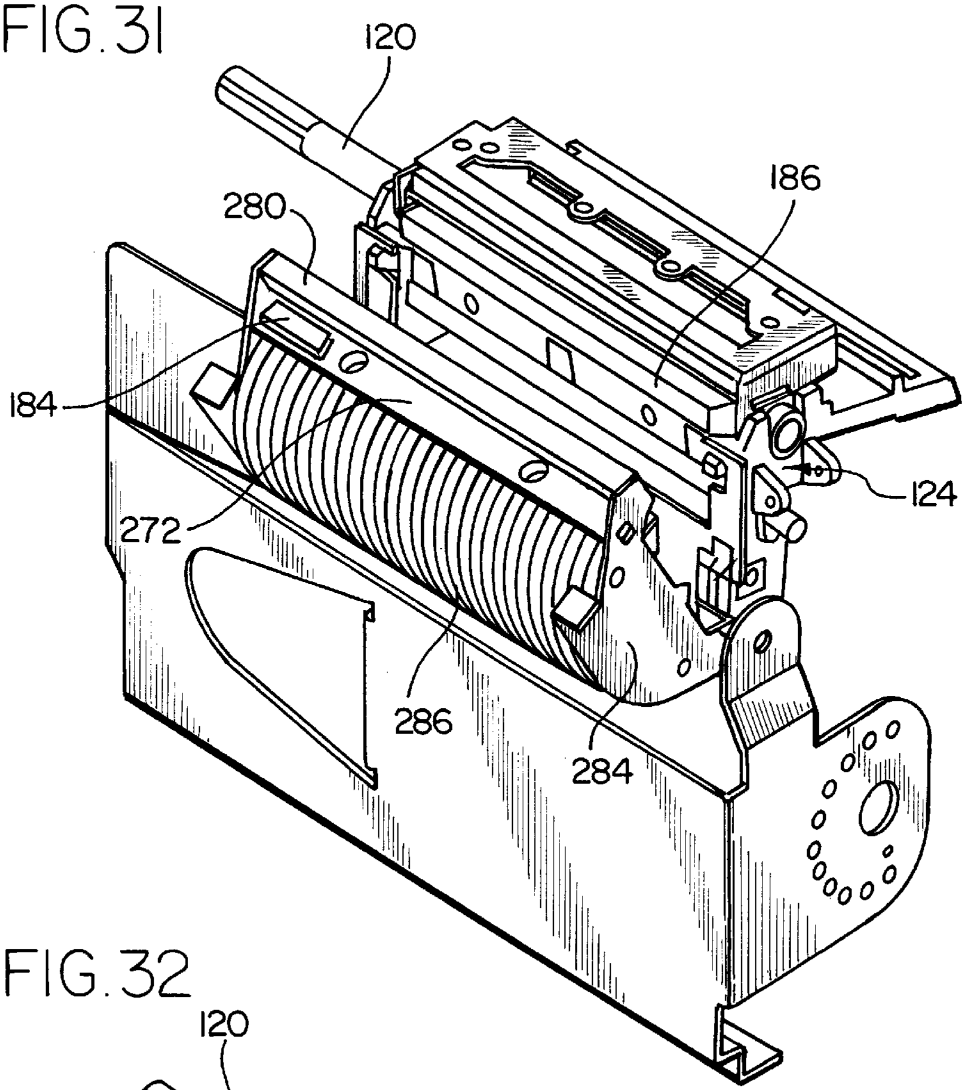
FIG. 31 is a perspective view of the passive peel system of FIG. 30 attached to the printhead assembly and in an open, pivoted position.
Figure 32:
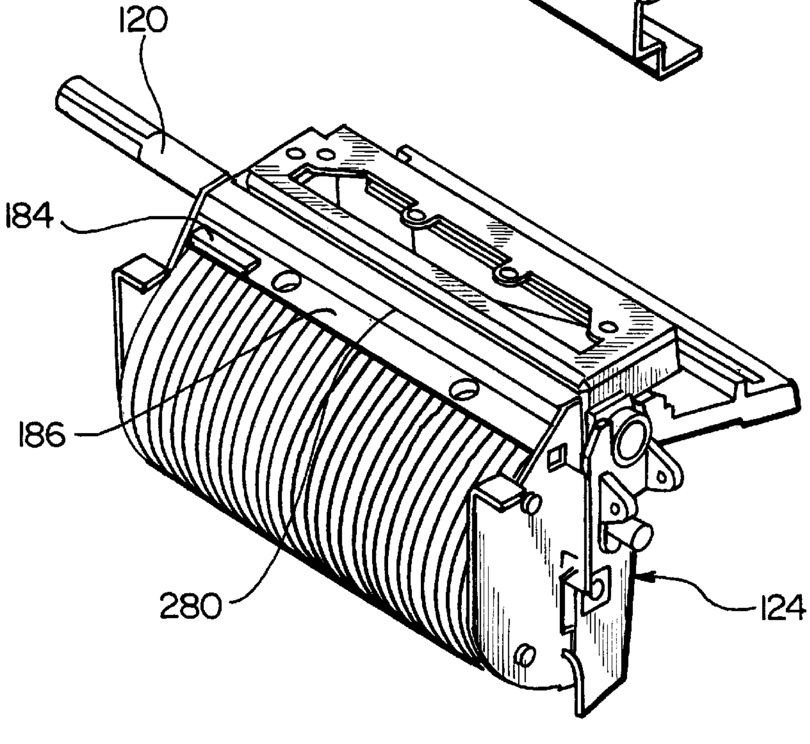
FIG. 32 is a perspective view of the passive peel system of FIG. 30 attached to the printhead assembly and in an closed position.
Figure 33:
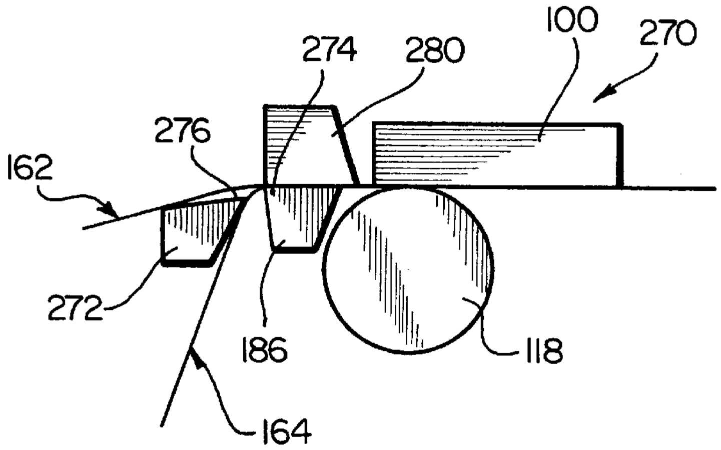
FIGS. 33–38 are schematic views of various embodiments of the passive peel system.
Figure 34:
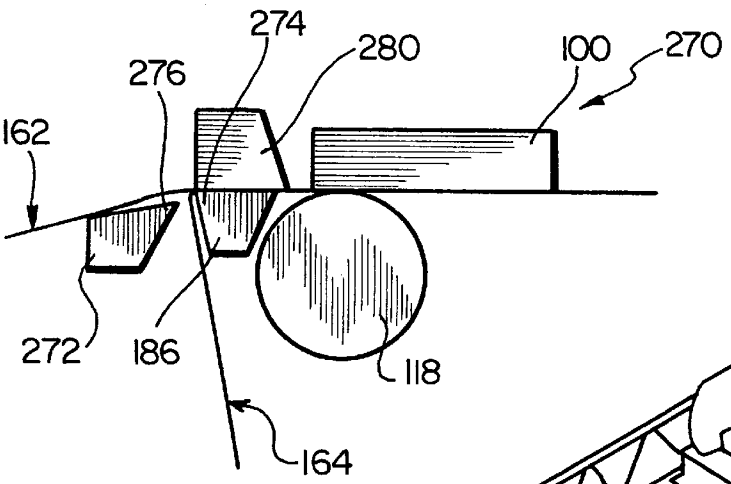
Figure 35:
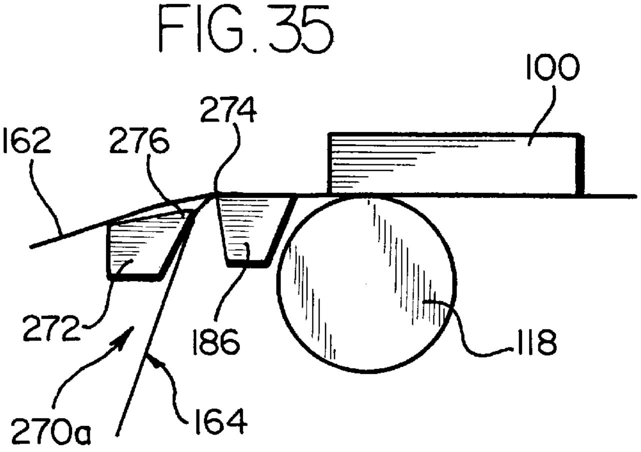
Figure 36:
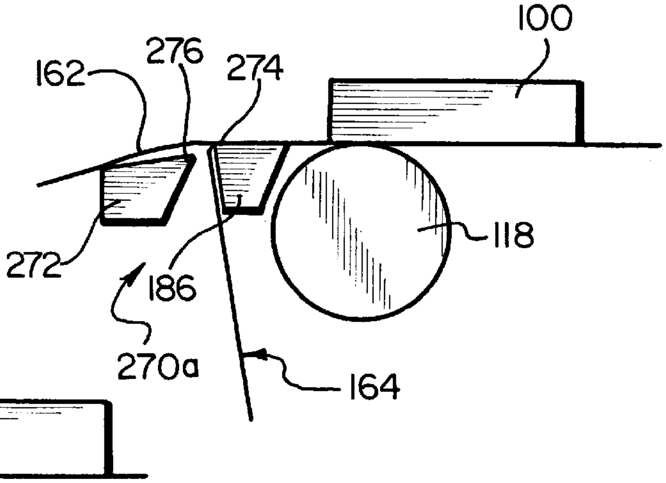
Figure 37:
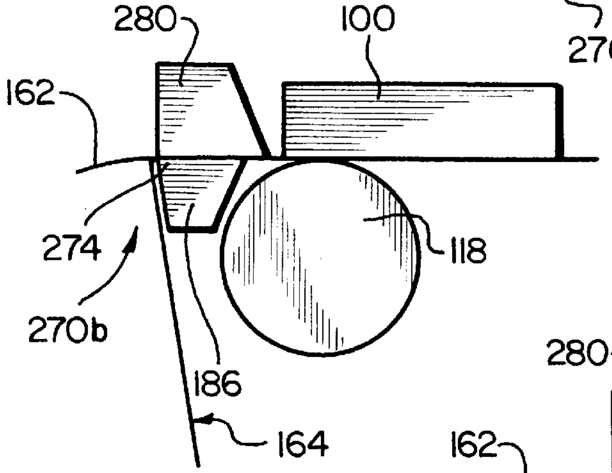
Figure 38:
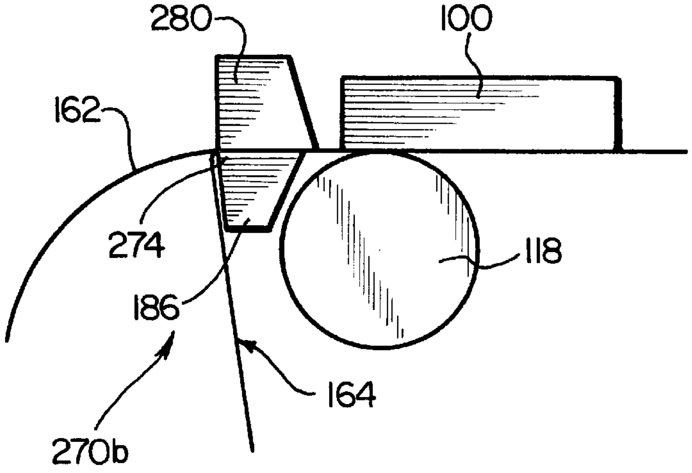

The novel passive peel system of the present invention is shown in FIGS. 30–32 and shown schematically in FIGS. 33–38. A first embodiment of the passive peel system 270 is shown in FIGS. 33 and 34; a second embodiment of the passive peel system **270*a* is shown in FIGS. 35 and 36; and a third embodiment of the passive peel system 270*b* is shown in FIGS. 37 and 38**.

Attention is now directed to FIGS. 30–34 which show the label being peeled using the first embodiment of the passive peel system 270. The first embodiment of the passive peel system **270*b* includes the peel tear bar 186, an anti-buckle bar 280 and a separator bar 272. When this first embodiment is used, the labels 162 can be peeled from the backing 164 with low tension or with zero tension on the backing 164**.

The peel tear bar 186 is mounted proximate to the platen roller 118 on support 271 which is attached to the platen support structure 124 by suitable means. The peel tear bar 186 is mounted such that it is spaced from the platen roller 118. The peel tear bar 186 is shaped so as to provide a sharp corner 274 around which the backing 164 bends as described herein.

A member 282 which has mounting flanges 284 attached at the opposite ends thereof is provided for mounting the separator bar 272 and the anti-buckle bar 280. The separator bar 272 is mounted on the top of the member 282 by suitable fastener means and extends between the mounting flanges 284, and the ends of the anti-buckle bar 280 are attached to the top ends of the mounting flanges 284 by suitable fastener means such that the anti-buckle bar 280 is above and in front of the separator bar 272. A ribbed, curved cover 286 is mounted to the member 282. The mounting flanges 284 are hingedly attached to the platen support structure 124 by suitable hinge means at the bottom thereof so that the member 282, the mounting flanges 284, the cover 286, the separator bar 272 and the anti-buckle bar 280 can be pivoted away from, see FIG. 31, and toward, see FIG. 32, the platen roller 118 and the peel tear bar 186. Suitable means are provided for locking the pivotable portion of the passive peel system 270 into place against the platen roller 118 as shown in FIG. 32. When locked into place against the platen support structure 124, the separator bar 272 is mounted proximate to the peel tear bar 186 and is spaced therefrom and the anti-buckle bar 280 is mounted above the peel tear bar 186. The separator bar 272 is shaped so as to provide a corner 276 which protrudes towards the peel tear bar 186.

With some difficult to peel media 113 being separated with zero tension on the backing 164, the anti-buckle bar 280 tends to improve the performance by containing the media 113 in a straight line after exiting the printhead means 100. The media 113 is pushed solely by the platen roller 118. As shown in FIG. 33, after the media 113 passes between the printhead means 100 and the platen roller 118 and is printed on, the printed-on media 113 passes between the peel tear bar 186 and the anti-buckle bar 280. The upper surface of the peel tear bar 186 contacts the lower surface of the printed-on media 113 and the lower surface of the anti-buckle bar 280 contacts the upper surface of the printed-on media 113. The backing 164 is placed under the separator bar 272 and the labels pass over the separator bar 272. The corner 276 on the separator bar 272 separates the labels 162 from the backing 164 with zero tension. The media 113 is pushed by the platen roller 118 and because of the somewhat sharp bend of the backing 164 by the separator bar 272, the labels 162 separate from the backing 164. This bend is what initiates the peel of the individual labels 162 from the backing 164 when the media 113 is pushed forward by the platen roller 118 with zero tension on the backing 164. With zero tension on the backing 164, the anti-buckle bar 280 confines the media 113 to a straight line path and makes holding the printing registration easy. Keeping the media 113 controlled so the media 113 cannot lift up makes the bend radius of the backing 164 smaller at the critical peel position. As the labels 162 lift from the backing 164, the separator bar 272 prevents the labels 162 from following and reattaching to the backing 164.

Figure 39:
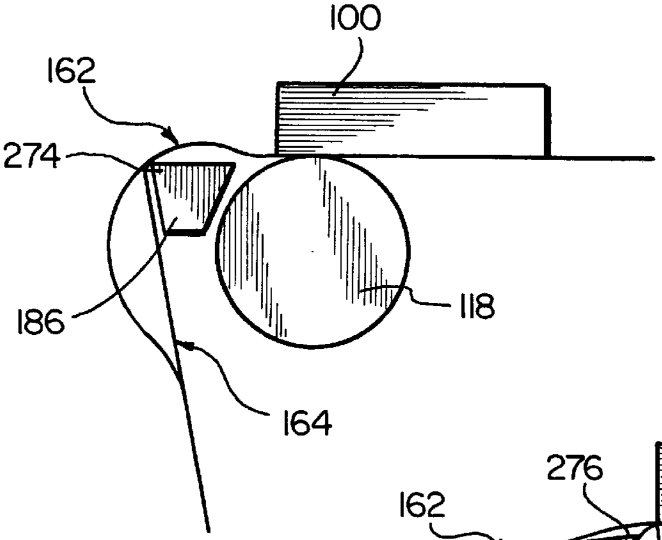
FIG. 39 is a schematic view showing a problem in peel systems.

As shown in FIG. 39, if the anti-buckle bar 280 is not in place, friction of the backing 164 on the separator bar 272 and the bending of the backing 164 can cause the media 113 to buckle. This makes the bend of the backing 164 less severe, i.e. the bend radius gets larger, and the label 162 can catch on the separator bar 272 instead of separating from the backing 164. When the media 113 lifts up, due to friction and bending of the backing 164, the potential for the label 162 not peeling from the backing 164 or getting caught on the separator bar 272 is much higher. As the media 113 is fed forward, because the label 162 is caught on the separator bar 272 it loops forward and results in a failed peel.

The addition of the anti-buckle bar 280 when peeling labels 162 with low tension, see FIG. 34, tends to improve the performance by again containing the media 113 in a straight line after exiting the printhead means 100, like that with zero tension. After the media 113 passes between the printhead means 100 and the platen roller 118 and is printed on, the printed-on media 113 passes between the peel tear bar 186 and the anti-buckle bar 280. The upper surface of the peel tear bar 186 contacts the lower surface of the printed-on media 113 and the lower surface of the anti-buckle bar 280 contacts the upper surface of the printed-on media 113. The low tension on the backing 164 by the rewind mechanism 278 pulls the media 113 generally perpendicularly to the upper surface of the peel tear bar 186 and causes a sharp bend around the corner 274 of the peel tear bar 186 which results in the labels 162 being peeled free from the backing 164. The backing 164 is placed under the separator bar 272, and thus between the separator bar 272 and the peel tear bar 186, and the labels 162 pass over the separator bar 272. With low tension on the backing 164, the bend of the backing 164 is much sharper than with zero tension and the release of the labels 162 from the backing 164 happens sooner than with zero tension. The separator bar 272 improves the function of peeling with low tension on the backing 164 by catching the labels 162 immediately after the peel is started and thereby preventing the labels 162 from following or reattaching to the backing 164. This can be critical for very flexible labels.

With some difficult to peel media 113, the anti-buckle bar 280 tends to improve the performance by containing the media 113 in a straight line after exiting the printhead means 100. A straight line of media 113 causes the bend of the backing 164 around the corner 274 of the peel tear bar 186 to be at a smaller radius because the media 113 cannot lift up off of the peel tear bar 186.

Low tension on the backing 164 system for peeling labels 162 makes print registration easier than with high tension. This low tension system of peeling labels 162 tends to be lower in cost than high tension systems because the motor can be smaller when it has less work to do. The low tension also makes backing 164 rewinding much easier to control than with high tension systems. Poor rewinding of backing 164 can affect print registration by pulling the media 113 to the side. This happens frequently in high tension systems unless everything is in near perfect alignment. The low tension system also allows optimization of the pressure across the peel tear bar 186 to obtain the best peel condition for peeling labels with very little regard for system alignments because the handling of the backing 164 is much easier to control.

The second embodiment of the passive peel system **270*a*, shown in FIGS. 35 and 36, includes the peel tear bar 186 and the separator bar 272 (and thus the anti-buckle bar 280 has been eliminated). When this second embodiment of the passive peel system 270*a* is used, the labels 162 can be peeled from the backing 164 with zero tension on the backing 164, as shown in FIG. 35, or with low tension on the backing 164, as shown in FIG. 36**.

The peel tear bar 186 is mounted in an identical manner to that shown in the first embodiment. The peel tear bar 186 is proximate to the platen roller 118 on support 271 which is attached to the platen support structure 124 by suitable means. The peel tear bar 186 is mounted such that it is spaced from the platen roller 118. The peel tear bar 186 is shaped so as to provide a sharp corner 274 around which the backing 164 bends as described herein.

The separator bar 272 is mounted in an identical manner to that shown in the first embodiment. The separator bar 272 is attached to the top of the member 282 by suitable fastener means. Again, the mounting flanges 284 are hingedly attached to the platen support structure 124 by suitable hinge means at the bottom thereof so that the member 282, the mounting flanges 284, the cover 286 and the separator bar 272 can be pivoted away from, and toward, the platen roller 118 and the peel tear bar 186. Suitable means are provided for locking the pivotable portion of the passive peel system **270*a* into place against the platen roller 118. When locked into place against the platen support structure 124, the separator bar 272 is mounted proximate to the peel tear bar 186 and is spaced therefrom. The separator bar 272 is shaped so as to provide a corner 276 which protrudes towards the peel tear bar 186**.

With zero tension on the backing 164, the media 113 is pushed solely by the platen roller 118. The media 113 is passed over the peel tear bar 186, the backing 164 is placed under the separator bar 272, and the labels 162 pass over the separator bar 272. The corner 272 on the separator bar 272 separates the labels 162 from the backing 164. The media 113 is pushed by the platen roller 118 and because of the somewhat sharp bend of the backing 164 by the separator bar 272, the labels 162 separate from the backing 164, see FIG. 35. This bend is what initiates the peel of the individual labels 162 from the backing 164 when the media 113 is pushed forward by the platen roller 118. As each label 162 lifts from the backing 164, the separator bar 272 prevents the label 162 from following and reattaching to the backing 164.

Zero tension is important for maintaining label 162 registration in a constant position. Zero tension is also lower in cost than peeling with tension because a rewind mechanism is eliminated.

Figure 40:
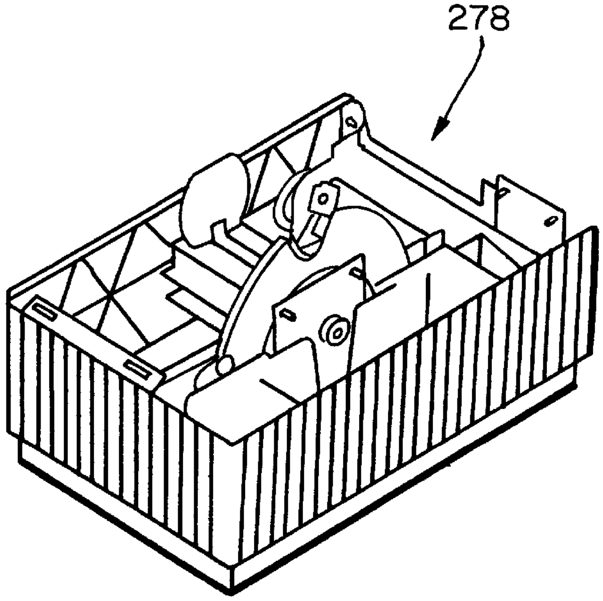
FIG. 40 is a perspective view of a rewind mechanism for applying tension to the backing of the media.

As shown in FIG. 36, with low tension on the backing 164, the media 113 is pushed by the platen roller 118 and low tension is applied to the backing 164 by a rewind mechanism 278, such as that shown in FIG. 40. After the media 113 passes between the printhead means 100 and the platen roller 118 and is printed on, the printed-on media 113 is passed over the peel tear bar 186, the backing 164 is placed under the separator bar 272, and the labels 162 pass over the separator bar 272. The corner 276 on the separator bar 272 separates the labels 162 from the backing 164. The media 113 is pushed by the platen roller 118 and the backing 164 is pulled with low tension by the rewind mechanism 278. The backing 164 bends sharply around the corner 274 of the peel tear bar 186, which causes the labels 162 to separate from the backing 164. This bend is what initiates the peel of the label from the backing 164 when the media is pushed forward by the platen roller 118 and the backing 174 is pulled by the rewind mechanism 278. As the individual labels 162 lift from the backing 164, the separator bar 272 prevents the labels 162 from following and reattaching to the backing 164.

The third embodiment of the passive peel system **270*b*, shown in FIGS. 37 and 38, is provided by the peel tear bar 186 and the anti-buckle bar 280. When this second embodiment is used, the labels 162 can be peeled from the media 113 with low tension on the backing 164. The anti-buckle bar 280 significantly improves passive peel reliability by helping prevent the media 113 from buckling, i.e. folding over, and not peeling the labels 162 from the backing 164. The anti-buckle bar 280 is mounted above the peel tear bar 186 and spaced only slightly thereabove. Low tension on the backing 164 which may be provided by the rewind mechanism 278, such as that shown in FIG. 40. The media 113 is pushed by the platen roller 118 and the backing 164 is pulled by the rewind mechanism 278**.

The peel tear bar 186 is mounted in an identical manner to that shown in the first embodiment. The peel tear bar 186 is proximate to the platen roller 118 on support 271 which is attached to the platen support structure 124 by suitable means. The peel tear bar 186 is mounted such that it is spaced from the platen roller 118. The peel tear bar 186 is shaped so as to provide a sharp corner 274 around which the backing 164 bends as described herein.

The anti-buckle bar 280 is mounted in an identical manner to that shown in the first embodiment. The anti-buckle bar 280 is attached to the top of the mounting flanges 284 by suitable fastener means. Again, the mounting flanges 284 are hingedly attached to the platen support structure 124 by suitable hinge means at the bottom thereof so that the member 282, the mounting flanges 284, the cover 286 and the anti-buckle bar 280 can be pivoted away from, and toward, the platen roller 118 and the peel tear bar 186. Suitable means are provided for locking the pivotable portion of the passive peel system **270*b* into place against the platen roller 118. When locked into place against the platen support structure 124, the anti-buckle bar 280 is mounted above the peel tear bar 186** and is spaced therefrom.

After the media 113 passes between the printhead means 100 and the platen roller 118 and is printed on, the printed-on media 113 passes between the peel tear bar 186 and the anti-buckle bar 280. The upper surface of the peel tear bar 186 contacts the lower surface of the printed-on media 113 and the lower surface of the anti-buckle bar 280 contacts the upper surface of the printed-on media 113. The low tension on the backing 164 pulls the backing 164 generally perpendicularly to the upper surface of the peel tear bar 186 and causes a sharp bend around the corner 274 of the peel tear bar 186 which results in the labels 162 being peeled free from the backing 164, see FIG. 37. FIG. 38 is a continuation of the peeling process. The trajectory of each peeled label 162 is substantially separated from the backing 164 which keeps the label 162 from reattaching itself to the backing 164. This can be critical for very flexible labels.

Again, with some difficult to peel media 113, the anti-buckle bar 280 tends to improve the performance by containing the media 113 in a straight line after exiting the printhead means 100. A straight line of media 113 causes the bend of the backing 164 around the corner 274 of the peel tear bar 186 to be at a smaller radius because the media 113 cannot lift up off of the peel tear bar 186.

If the anti-buckle bar 280 of the present invention is removed, the force of bending the backing 164 over the peel tear bar 186 tends to cause the label 162 to buckle, see FIG. 39, that is the media 113 tends to lift up off of the peel tear bar 186, as a result of the bending of the backing 164, and the bend radius gets larger and the potential for the labels 162 not peeling or getting caught is much higher. This may result in the labels 162 not peeling from the backing 164 and even when the labels 162 peel from the backing 164, the trajectory of the labels 162 is often close to the backing 164. Peeling labels can generate the build up of a substantial static electrical charge which can cause the labels 162 to reattach to the backing 164. On medium to long lengths of labels 162, the labels 162 can also reattach to the backing 164 just by coming back to the backing 164 as a result of the poor trajectory path.

Thus, the anti-buckle bar 280 provided in this third embodiment precisely controls the vertical position of the media 113 at the critical time for peeling. The anti-buckle bar 280 makes low tension on the backing 164 perform like peeling labels 162 from the backing 164 with high tension on the backing 164. In addition, low tension on the backing 164 makes rewinding of the backing 164 much easier and makes holding label registration much easier to control than with high tension on the backing 164. Further, low tension is lower in cost than high tension due to the lower performance requirements for the rewind motor in the rewind mechanism 278.

As shown in FIGS. 30 and 31, the passive peel system 270 is a modular component that can be added to an existing printer. The other embodiments of the passive peel system **270*a*, 270*b*** are provided as similar modular components.

Figure 41:
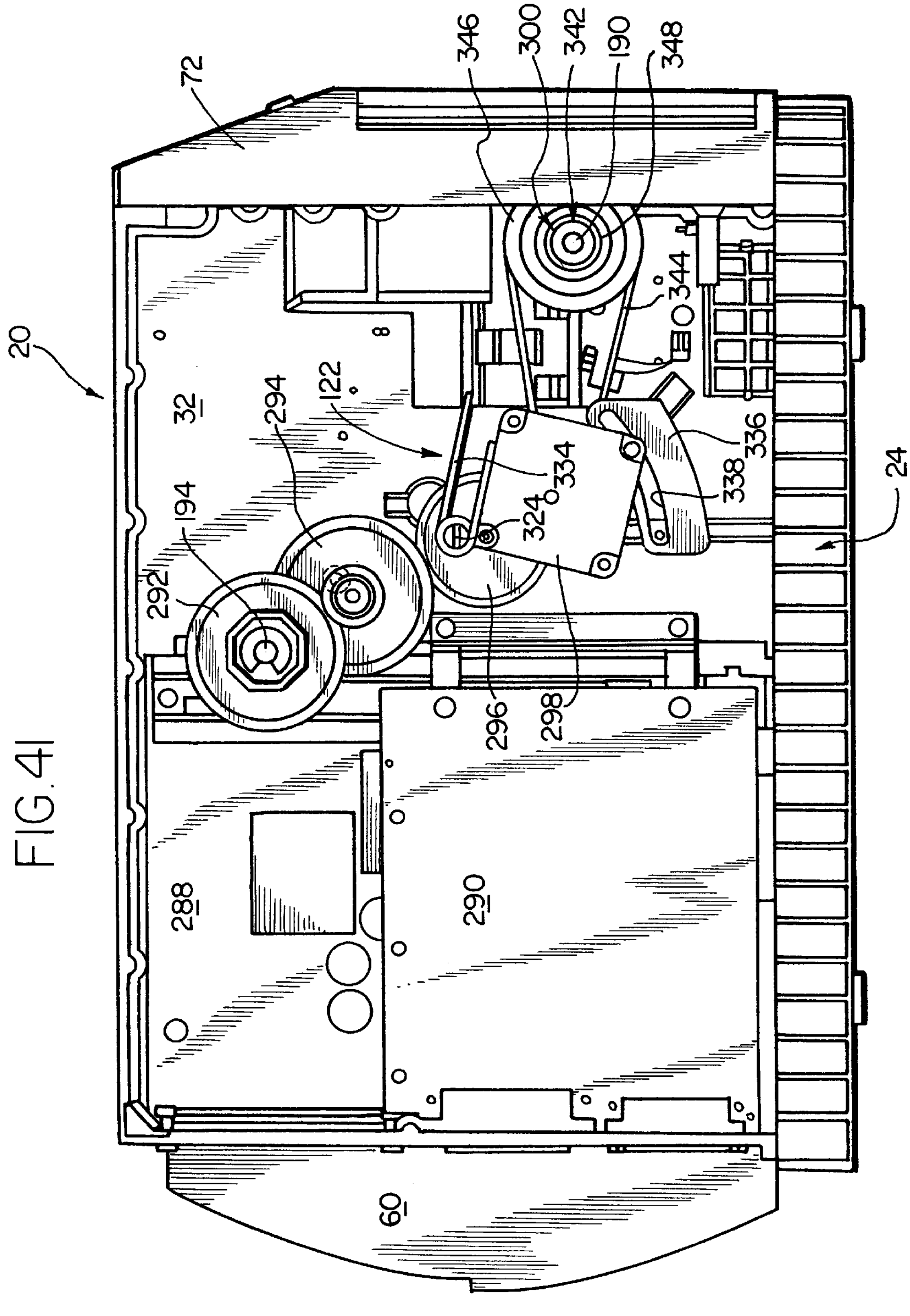
FIG. 41 is a side elevational view of the printer with a side cover removed to show the internal components of the printer.

Attention is now directed to FIG. 41 which illustrates the components on the opposite side of the central support wall 32 of the printer 20.

A first printed circuit board 288, having electrical components thereon, is mounted on the central support wall 32 of the printer 20 by suitable means. Suitable wiring (not shown) is provided for connecting the first printed circuit board 288 with the printhead means 100. A second printed circuit board 290, having electrical components thereon, is mounted on the upstanding wall 58 of the rear of the printer 20 and is in communication with the first printed circuit board 288 by suitable wiring (not shown). The second printed circuit board 290 has a port thereon (not shown) to which the cable 88 that connects the control panel printed circuit board 86 is attached. Suitable wiring (not shown) is connected to the second printed circuit board 290 and to the printhead means 100.

Attention is now directed to FIGS. 3 and 41–43 which illustrate the components of the driving system 122 for effecting printhead density change. The driving system 122 includes a rewind gear 292, a compound gear 294, an intermediate gear 296, a stepper motor 298 and a platen pulley assembly 300 connected to the stepper motor 298. The compound gear 294 is part of the means 199 provided for mounting the shaft 198 to the central support wall 32 and connects ribbon take-up spindle 194 to the remainder of the driving system 122. The driving system 122 provides a novel structure and method for easily changing the drive ratio so that the printhead means 100 can provide 200 dpi or 300 dpi (dot per inch) resolution, each of which requires a distinct drive ratio depending on various factors such as the platen 118 diameter, ribbon take-up spindle 194 diameter, print speed, print resolution (200 dpi or 300 dpi), and the like.

The rewind gear 292 is mounted on the ribbon take-up shaft 198 which extends through the central support wall 32. The rewind gear 292 is formed from a circular disk having a predetermined diameter and having a plurality of teeth 302, see FIGS. 42 and 43, on its circumference (teeth are not shown in FIGS. 3 and 41 for clarity in the drawings). Preferably, seventy-five teeth 302 are provided on its circumference. An aperture is provided through the center of the disc through which the shaft 198 of the ribbon take-up spindle 194 extends. Rotation of the rewind gear 292 cause rotation of the ribbon take-up spindle 194. The spring 200 which biases the ribbon take-up spindle 194 in a clockwise motion is mounted on the take-up ribbon shaft 198 and has an end which abuts against the rewind gear 292 and an opposite end that abuts against a disc 304 fixedly mounted to the end of the ribbon take-up shaft 198. When the ribbon take-up spindle 194 is rotated in a counter-clockwise direction, the spring 200 expands and when the counter-clockwise motion is stopped, the spring 200 coils to cause the ribbon take-up spindle 194 to move clockwise.

First and second spaced apart threaded sockets 306, 308 are provided in the central support wall 32 for mounting the compound gear 294 thereto. As described herein, which socket 306, 308 the compound gear 294 is mounted to depends on the desired drive ratio. A screw 310 rotatably mounts the compound gear 294 to the correct socket 306, 308 on the central support wall 32.

Figure 43:
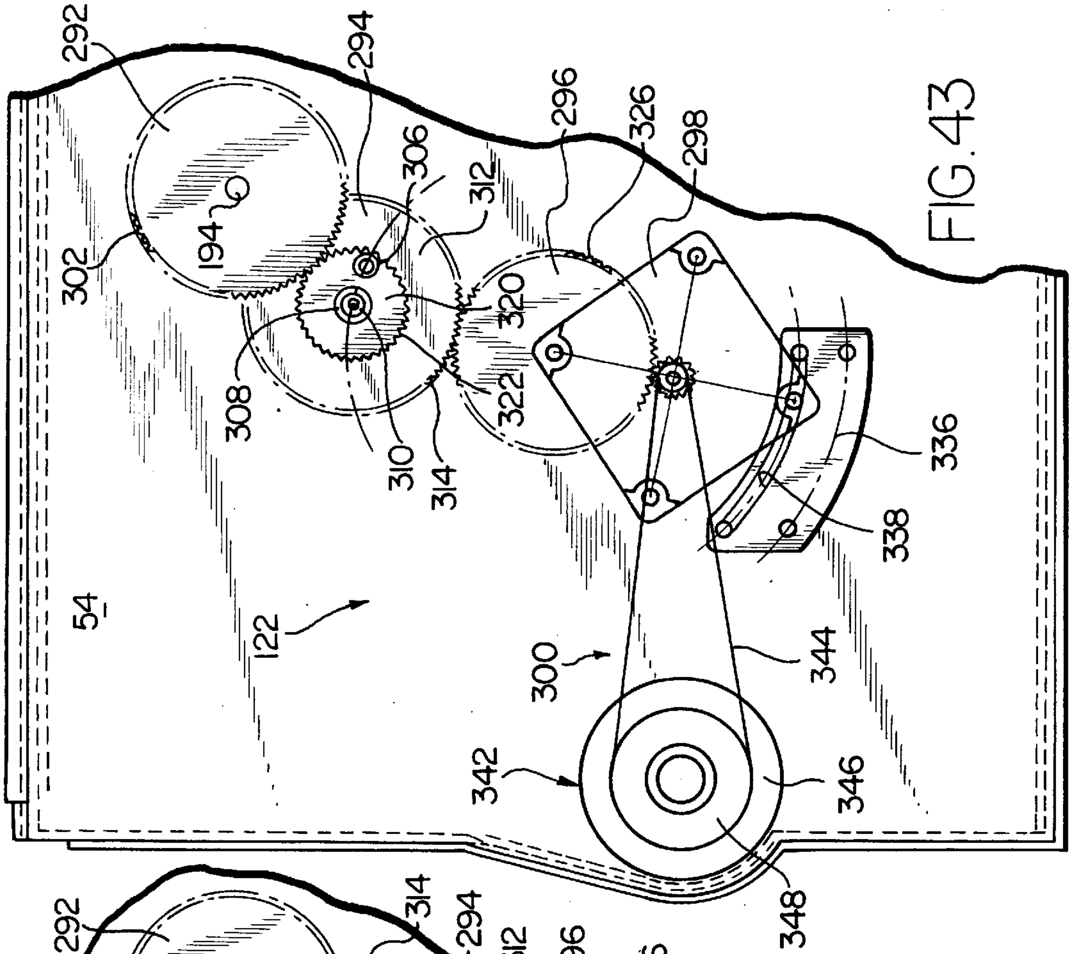
FIGS. 42 and 43 are partial fragmentary, elevational views of the driving system of the printer.
Figure 42:
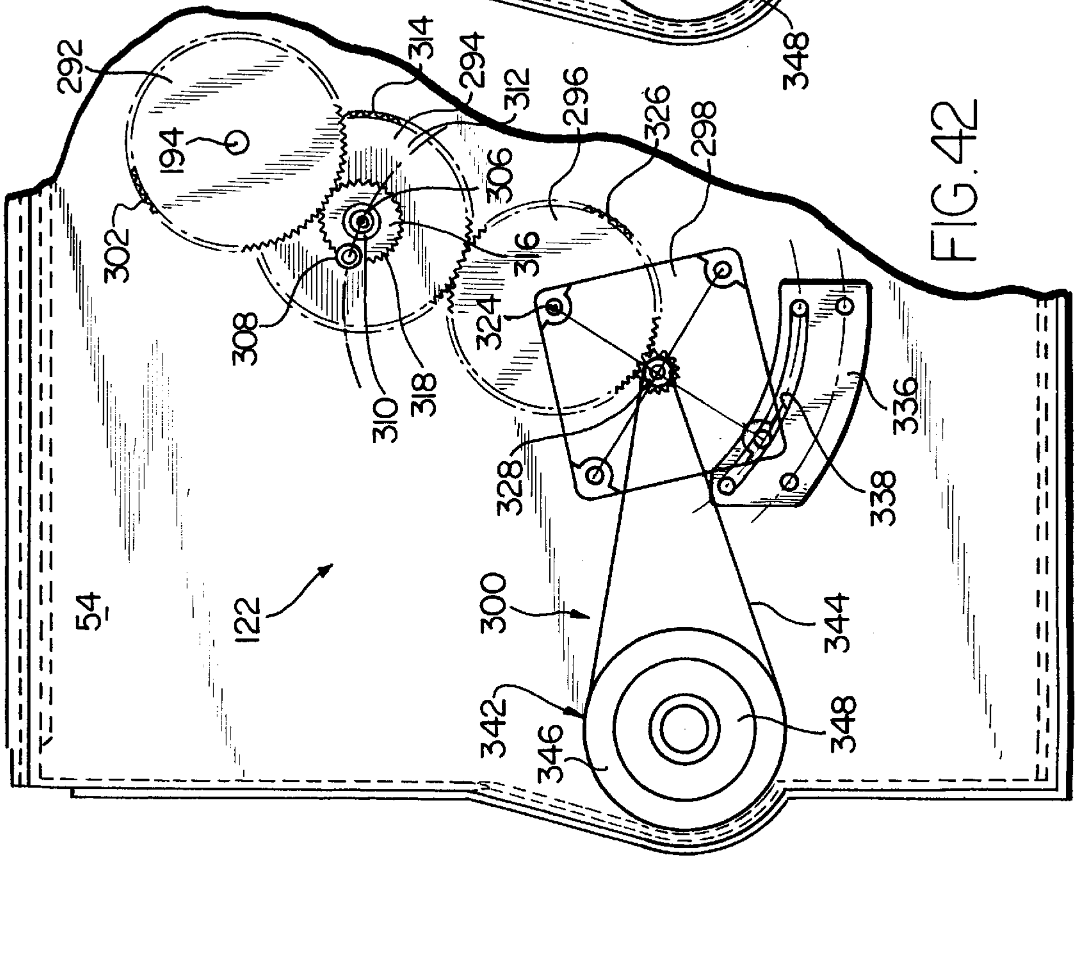

The compound gear 294 is formed from a circular disc 312 having a predetermined diameter that is the same as the rewind gear 292 and a plurality of teeth 314, see FIGS. 42 and 43, on its circumference. Like the rewind gear 292, preferably, seventy-five teeth 314 are provided on its circumference. A circular flange 316, which provides a first, smaller gear, is integrally formed with and extends from one side of the disc 312. The smaller gear 316 has a diameter which is less than the diameter of the disc 312 and has a center which is aligned with the center of the disc 312. A plurality of teeth 318, see FIG. 42, are provided on the circumference of the smaller gear 316. Preferably, the smaller gear 316 has twenty-six teeth 318 thereon. A second circular flange 320, which provides a second, larger gear, is integrally formed with and extends from the opposite side of the disc 312. The larger gear 320 has a diameter which is less than the diameter of the disc 312 and larger than the diameter of the smaller gear 316. The center of the larger gear 320 is aligned with the centers of the disc 312 and the smaller gear 316. A plurality of teeth 322, see FIG. 43, are provided on the circumference of the larger gear 320, and preferably, thirty-five teeth 322 are provided thereon. The screw 310 on which the compound gear 294 is rotatably mounted extends through the center of the disc 312.

The intermediate gear 296 is rotatably mounted on a shaft 324 which extends from the central support wall 32. The intermediate gear 296 is formed from a circular disc having a predetermined diameter that is smaller than the diameters of the rewind gear 292 and the intermediate gear 296. A plurality of teeth 326, see FIGS. 42 and 43, are provided on its circumference, preferably, sixty-seven teeth 326. The shaft 324 extends through the center of the disc 296.

The stepper motor 298 is conventional and has a toothed output shaft 328 that extends therefrom. An upper end of the stepper motor 298 is rotatably mounted on the shaft 324 which extends through the intermediate gear 296. An aperture is provided in the frame of the stepper motor 298 through which the shaft 324 extends. A nut is provided for rotatably mounting the stepper motor 298 on the shaft 324. An L-shaped bracket 332 extends from the upper end of the stepper motor 298. A pre-load spring 334 is mounted on the L-shaped bracket 332 and has an end which biases the stepper motor 298 into position as described herein (such pre-load spring 334 not being shown in FIGS. 42 and 43 for clarity). A lower, opposite end of the stepper motor 298 is connected to a track member 336. The track member 336 has an elongated, curved slot 338 therein in which the lower end of the stepper motor 298 can travel as described herein. A nut 340 is provided for selectively fixing the lower end of the stepper motor 298 into place relative to the curved slot 338.

The platen pulley assembly 300 is formed from a compound wheel 342 and an endless synchronous belt 344 that is connected to and between the wheel 342 and the toothed output shaft 328 of the stepper motor 298. The inner surface of the synchronous belt 344 has a plurality of grooves therein for meshing with the teeth on the stepper motor output shaft 328. The compound wheel 342 has a first circular disc portion 346 that has a predetermined diameter and a second circular disc portion 348 integrally formed therewith that has a predetermined diameter which is smaller than the diameter of the first circular disc portion 346. The compound wheel 342 is reversible. Each of the circular disc portions 346, 348 have a plurality of grooves therein along their circumferences for engagement with the grooves in the synchronous belt 344. The centers of the first and second circular disc portions 346, 348 are aligned and the shaft 191 of the platen roller 118 is fixedly mounted therethrough. As described herein, the synchronous belt 344 can be engaged with the first circular disc portion 346 or the second circular disc portion 348, depending on what drive ratio is to be provided.

When the driving system 122 of the present invention is used, the printing of the printhead means 100 can be changed from 200 dpi to 300 dpi without extra parts or without changing parts. The driving system 122 is simple and thus, reduces parts and cost while improving reliability and allows an unskilled user to simply make the drive ratio change. This drive ratio change is accomplished by changing the orientation and position of the compound gear 294, changing the position of the stepper motor 298, changing the orientation of the compound wheel 342 and changing the position of the synchronous belt 344 on the compound wheel 342.

The gear ratio of the rewind of the ribbon take-up spindle 194 is defined by the ratio of the number of teeth 302 on the rewind gear 292 to the number of teeth 318 on the smaller gear 316 on the compound gear 294 multiplied by the ratio of the number of teeth 322 on the larger gear 320 on the compound gear 294 to the number of teeth on the stepper motor output shaft 328. The intermediate gear 296 is used to provide the desired rotational direction of the rewind gear 292 as well as a transmission member to the compound gear 294 from the stepper motor 298. The drive ratio of the platen roller 118 is defined by the ratio of the number of grooves on the portion 346 or 348 of the compound wheel 342 to which the belt 344 is connected to the number of teeth on the stepper motor output shaft 328.

As shown in FIG. 42, to provide 200 dpi printing by the printhead means 100, the compound gear 294 is mounted in the first socket 306, and the teeth 302 on the rewind gear 292 are intermeshed with the teeth 318 on the smaller gear 316. The teeth 314 on the compound gear 294 are intermeshed with the teeth 326 on the intermediate gear 296. The teeth 326 on the intermediate gear 296 are also intermeshed with the teeth on the stepper motor output shaft 328. The synchronous belt 344 is connected to and between the output shaft 328 and the larger diameter circular portion 346 of the compound wheel 342. The stepper motor 298 is fixed by nut 340 relative to the track portion 338 in a first position.

As the output shaft 328 of the stepper motor 298 is rotated, the synchronous belt 344 rotates the compound wheel 342 to drive the platen shaft 191 and thus, the platen roller 118 at a predefined speed to produce 200 dpi by moving the media 113 past the printhead means 100 at a predetermined speed (the media 113 is driven by the positively driven platen roller 118). Rotation of the output shaft 328 causes the intermediate gear 296 to rotate which, in turn, causes the compound gear 294 to rotate which, in turn, causes the rewind gear 292 to rotate, thereby rotating the ribbon take-up spindle 194. Of course, if the ribbon take-up function is eliminated, gears 292, 294 and 296 would be eliminated as well.

To change the drive ratio so as to allow the printhead means 100 to print at 300 dpi instead of 200 dpi, the screw 310 which forms the compound gear 294 shaft is removed and the compound gear 294 is turned over. As shown in FIG. 43, the compound gear 294 is positioned over the second threaded socket 308 and the screw 310 is inserted into the second threaded socket 308 so as to move the position of the compound gear 294. The sockets 306, 308 are placed on an arc defined by the gears. The compound wheel 342 is turned over and the belt 344 is moved to the smaller portion 348 of the compound wheel 342, thus providing a different number of grooves for the drive ratio. This is accomplished by loosening the nut 340 which fixes the stepper motor 298 in position in the track 336 and moving the belt 344 to the smaller portion 346 of the wheel 342. The lower end of the stepper motor 298 slides along the elongated curved slot 338 in the track 336 to allow the belt 344 to be moved. Once the belt 344 is moved, the spring 334 on the stepper motor 298 biases the lower end of the stepper motor 298 away from the compound wheel 342 by causing the lower end to slide along the curved slot 338 to automatically and correctly tension the belt 344. Thereafter, the stepper motor 298 is re-secured by tightening the nut 340.

This procedure changes the drive ratio so that the printer 20 can now print at 300 dpi. For 300 dpi printing by the printhead means 100, the teeth 322 on the larger gear 320 of the compound gear 294, which is now mounted in the second socket 308, and the teeth 302 on the rewind gear 292 are intermeshed. The teeth 314 on the compound gear disc are intermeshed with the teeth 326 on the intermediate gear 296. The teeth 326 on the intermediate gear 296 are also intermeshed with the teeth on the stepper motor output shaft 328. The synchronous belt 344 is connected to and between the output shaft 328 and the smaller diameter circular portion 348 of the wheel 342. The stepper motor 298 is now fixed by nut 340 relative to track portion 336 in a second position.

As the output shaft 328 of the stepper motor 298 is rotated, the synchronous belt 344 rotates the wheel 342 to drive the platen shaft 191 and thus, the platen roller 118 at a predefined speed to produce 300 dpi by moving the media 113 past the printhead means 100 at a predetermined speed (the media 113 is driven by the positively driven platen roller 118). Rotation of the output shaft 328 causes the intermediate gear 296 to rotate which, in turn, causes the compound gear 294 to rotate which, in turn, causes the rewind gear 292 to rotate, thereby rotating the ribbon take-up spindle 194. Of course, if the ribbon take-up function is eliminated, gears 292, 294 and 296 would be eliminated as well.

The procedure can be effected to change from 300 dpi to 200 dpi in the same manner.

Figure 44:
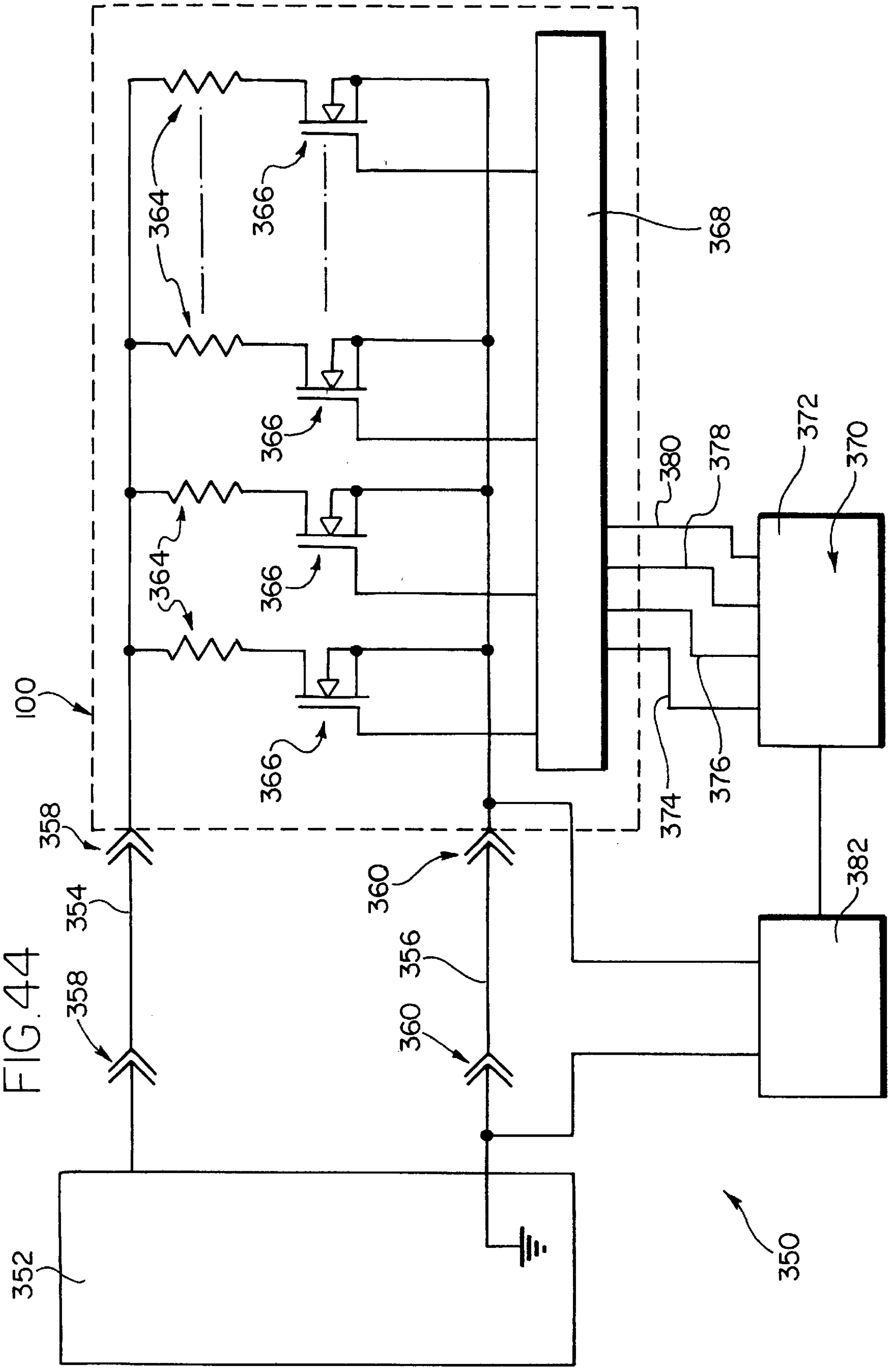
FIG. 44 is a schematic diagram of a circuit including a power supply and a printhead means, and showing a voltage measurer associated with a return conductor between the power supply and printhead for measuring a voltage thereacross.

Shown in FIG. 44 is a circuit 350 in the printer 20. The circuit 350 includes a power supply 352 connected to the printhead means 100 via a supply conductor 354 and a return conductor 356. The supply conductor 354 is connected to each of the power supply 352 and printhead means 100 via connectors 358. Likewise, the return conductor 356 is connected to each of the power supply 352 and printhead means 100 via connectors 360. The return conductor 356 is ground referenced as indicated by ground connection 362. The supply conductor 354 and the return conductor 356 provide that the power supply 354 can supply power to the printhead means 100. The printhead means 100 is a thermal printhead, and includes a plurality of heating elements 364 each of which is connected to a corresponding control switch 366. Each of the heating elements 364 and control switches 366 are connected to the supply conductor 354 and the return conductor 356 and are therefore connected to the power supply 352. This connection provides that the power supply 352 can power the heating elements 364 through the control switches 366. Energizing selected heating elements 364 produces a single line of a printed image by heating the thermally sensitive paper, ribbon, or some other media. Complete images are printed by repeatedly energizing varying patterns of the heating elements 364 while moving the media past the printhead means 100.

Each of the control switches 366 is also connected to printhead means internal electronics 368. The printhead means internal electronics 368 may include one or more shift registers, latches and other appropriate elements and structures (not shown). The printhead means internal electronics 368 are connected to a controller 370, such as a microprocessor 372, controlled by software. The microprocessor 372 provides signals to the printhead means internal electronics 268 along a data line 374, a latch line 376, a clock line 378, and a strobe line 380. Of course, other connection configurations are possible between the microprocessor 372 and the printhead means internal electronics 368. The connection between the microprocessor 372 and printhead means internal electronics 368 provides that the microprocessor 372 can dictate the control of the heating elements 364 through the printhead means internal electronics 368 and control switches 366.

In accordance with the present invention, a voltage measurer 382 is connected to, or otherwise associated with, a portion of the circuit 350 such as the return conductor 356 between the power supply 352 and the printhead means 100. The return conductor 356 which is monitored by the voltage measurer 382 may comprise interconnecting wiring between the power supply 352 and the printhead means 100 including the connectors 360 and circuit traces in the printhead means 100. The voltage measurer 382 is also connected to the microprocessor 372. The voltage measurer 382 measures the voltage across the return conductor 356 interconnecting the power supply 352 to the printhead means 100 as the power supply 352 supplies power to the printhead means 100 along the supply conductor 354 and return conductor 356. When heating elements 364 are energized, current flows through the return conductor 356. Because the return conductor 356 has a finite resistance, a voltage differential will occur therealong and can be measured by the voltage measurer 382.

The voltage across the return conductor 356 as the power supply 352 supplies power to the printhead means 100 is inversely proportional to the power loss experienced as the power is supplied to the heating elements 364. This is because the greater the power loss, the less current that will travel along the return conductor 356, and the less voltage along the return conductor 356. The magnitude of the power loss is dependent on the number of heating elements 364 being energized within the printhead means 100. Therefore, measuring the voltage along the return conductor 356 when power is supplied to the printhead means 100 provides an indication of the power loss experienced as a result of powering the printhead means 100. Specifically, for example, measuring the voltage along the return conductor 356 when power is supplied to the printhead means 100 when no heating elements 364 of the printhead means 100 are energized, and then measuring the voltage again along the return conductor 356 when a specific number of heating elements 364 are energized and comparing the two voltage readings will provide an indication of the power loss associated with energizing that specific number of heating elements 364.

The connection between the voltage measurer 382 and the microprocessor 372 provides that the voltage measurer 382 can communicate the voltage read across the return conductor 356 when power is supplied to the printhead means 100 while energizing a specific number of heating elements 364. The microprocessor 372 can then calculate, based on the voltage read, the appropriate period of time to energize that particular number of heating elements 364 to obtain a specific, desired print darkness. To this end, the microprocessor 372 can be programmed to apply one or more mathematical formulas to calculate the appropriate length of time to energize given numbers of heating elements 364 depending on the voltage measured by the voltage measurer 382. Alternatively, a "look up table" or a list of lengths of times to energize given numbers of heating elements 364 can be programmed into the microprocessor 372, and the microprocessor 372 can subsequently use the table to "look up" the given number of heating elements and determine the corresponding period of time to keep the heating elements energized.

After the microprocessor 372 calculates or otherwise determines the specific length of time to energize that specific number of heating elements 364 to achieve a desired print darkness, the microprocessor 372 communicates this information to the printhead means internal electronics 368 in order to de-energize the corresponding heating elements 364 through the corresponding control switches 366 after the appropriate length of time.

Preferably, a calibration cycle is performed before printing in order to compensate for variations in, for example, the wiring resistance of the return conductor 356 as well as variations in printhead means 100 power losses. Initially, the printhead means 100 can be energized by the power supply 352 such that all of the heating elements 364 are energized, and a voltage reading along the return conductor 356 can be taken by the voltage measurer 382 and communicated to the microprocessor 372. This is the "maximum" reading. Then, the process can be repeated by loading the printhead means 100 with data to energize none of the heating elements 364 while taking a voltage reading along the return conductor 356 and communicating same to the microprocessor 372. This is the "minimum" reading. The "maximum" and "minimum" readings would, in effect, set the limits of the voltage readings that will be communicated to the microprocessor 372 by the voltage measurer 382 during actual printing where specific numbers of heating elements 364 will be selectively energized. Of course, additional voltage readings can be taken during the calibration cycle (i.e. different numbers of heating elements 364 can be energized); however, it has been found that the required "on" times of the heating elements 364 (to obtain a certain print darkness) vary linearly with the power losses within the circuit 350. Therefore, performing a quick two-point calibration cycle (i.e. a "maximum" reading and a "minimum" reading) is all that is typically needed to obtain enough information about the power losses to counter-act same during actual printing and achieve a uniform print darkness by adjusting the "on" times of the heating elements 364.

After the calibration cycle, during actual printing, the specific, desired number of heating elements 364 can be energized while the voltage measurer 382 takes a voltage reading along the return conductor 356. Upon receiving the voltage reading from the voltage measurer 382, the microprocessor 372 can calculate or otherwise determine the specific length of time that particular number of heating elements should be energized in order to achieve a specified, desired print darkness. The microprocessor 372 can utilize the "maximum" and "minimum" readings obtained during the calibration cycle to calculate the specific length of time to keep that specific number of heating elements 364 energized in order to achieve a specified print darkness. Upon the expiration of the determined specific length of time, the microprocessor 372 directs the printhead means internal electronics 368 to control the control switches 366 to de-energize the heating elements 364. Subsequently, a new number of heating elements 364 can be energized, and the process repeated to print an entire image having a uniform print darkness throughout.

Figure 45:
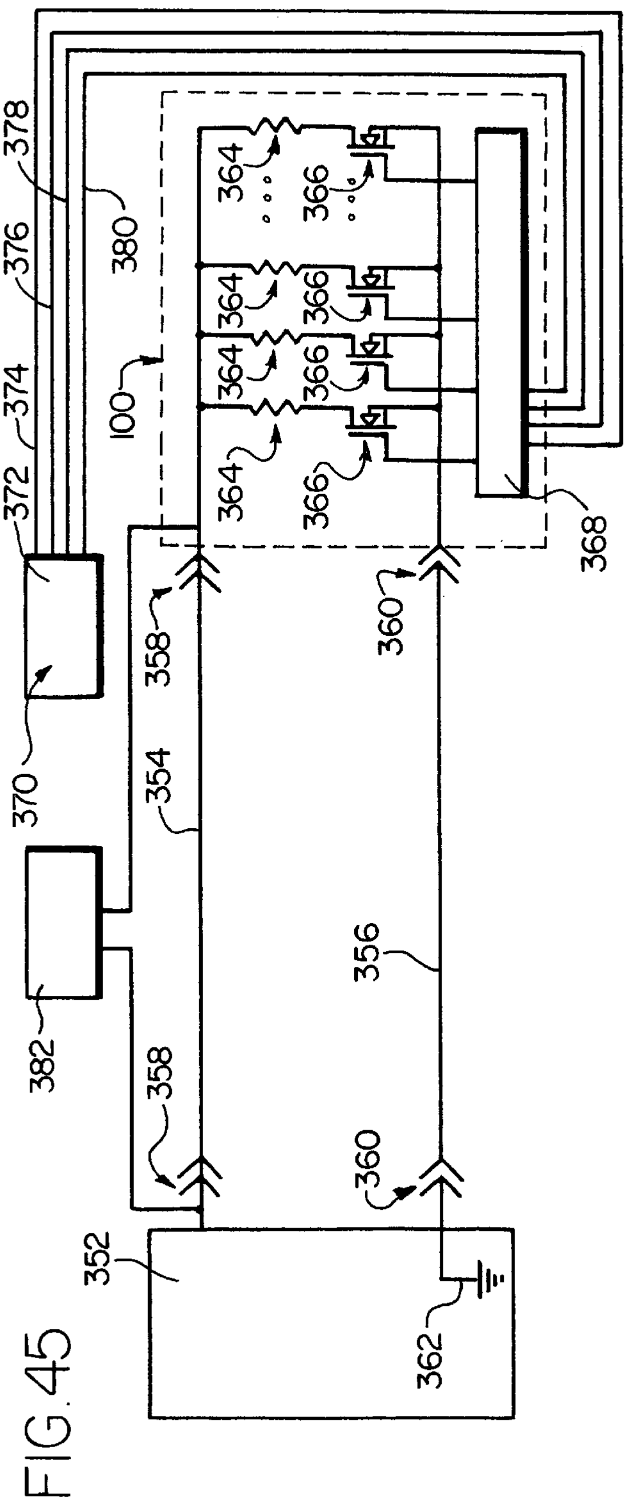
FIG. 45 is a schematic diagram similar to FIG. 44 of a circuit including a power supply and a printhead means, and showing a voltage measurer associated with a supply conductor between the power supply and printhead for measuring a voltage thereacross.

As shown in FIG. 45, the voltage measurer 382 may instead be connected to, or otherwise associated with, the supply conductor 354 between the power supply 352 and the printhead means 100. In fact, the voltage measurer 382 can be associated with any portion of the circuit 350 in order to obtain a voltage reading therealong (dependent on the power loss experienced) and control the heating elements 364 in response thereto. However, should the voltage measurer 382 be provided as connected to, or otherwise associated with, the supply conductor 354 as shown in FIG. 45, the voltage measurer 382 would need to handle considerable common mode voltage. Should a differential amplifier be utilized as the voltage measurer 382, the magnitude of the voltage differential between the amplifier inputs would be quite small compared to the supply voltage (when referenced to ground). The printhead means supply voltage is often several times that of the logic voltage used by the controlling circuits in the thermal printer 20. Having to accommodate higher voltage increases the cost and complexity of the voltage measurer 382.

It is preferred that the voltage measurer 382 be associated with the return conductor 356 as depicted in FIG. 44 and as discussed above. This is because the return conductor 356 is close to ground potential and this reduces the voltage seen across the return conductor 356. In fact, the voltage across the return conductor 356 may be as low as one-half volt. This is in contrast to the power supply voltage which may be as high as twenty-one to twenty-six volts. The fact that the return conductor 356 is close to ground potential provides that a voltage measurer 382 having a simple structure can be utilized.

Figure 46:
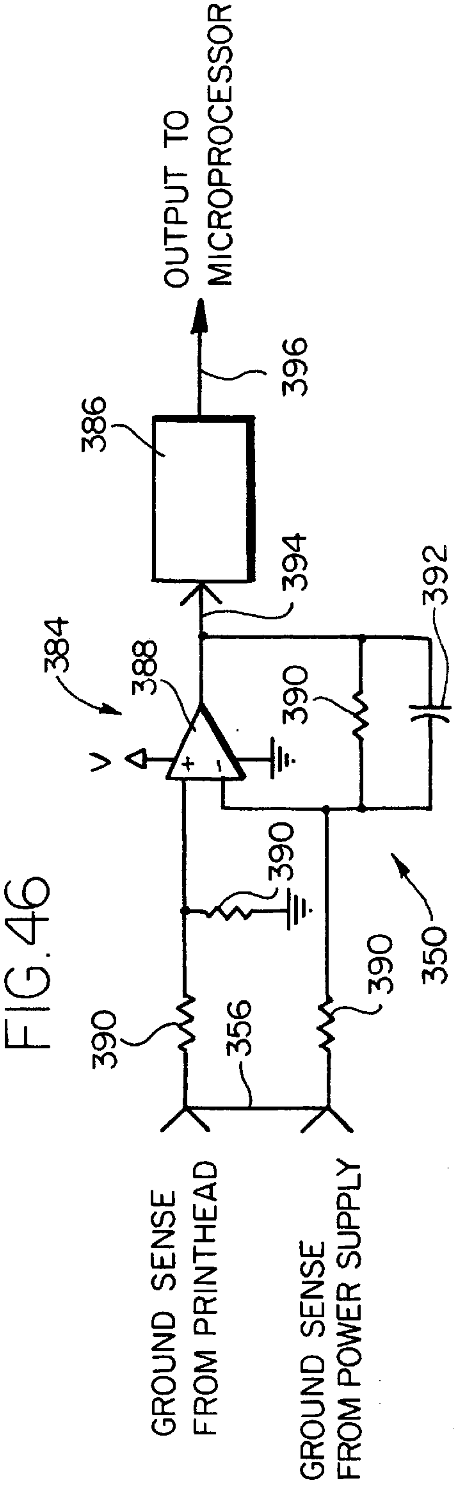
FIG. 46 is a schematic diagram of the voltage measurer depicted in FIG. 44.

The voltage measurer 382 used in the configuration depicted in FIG. 44, where the voltage measurer 382 is associated with the return conductor 356, may be structured as shown in FIG. 46. As shown, the voltage measurer 382 may comprise a differential amplifier 384 in connective communication with an analog-to-digital convertor 386. The fact that the return conductor 356 is close to ground potential provides that a single operational amplifier 388 can be used. The voltage measurer 382 also includes, as shown, a plurality of resistors 390 and a capacitor 392. The values of the resistors 390 selected depends on the gain sought. One having ordinary skill in the art would recognize what values of resistors to utilize to obtain a desired result where the desired result will depend on the particular circuit in which the differential amplifier 384 is incorporated. The capacitor 392 is included so as to filter out unwanted high frequency noise, and such use thereof is generally known in the art.

The differential amplifier 384 amplifies the difference in the voltage level detected along the return conductor 356 and produces a ground referenced output 394 that is communicated to the analog-to-digital convertor 386. The analog-to-digital convertor 386 can then communicate a corresponding digital signal 396 to the microprocessor 372. The microprocessor 372 can then use this digital signal 296 to calculate or otherwise determine the specific length of time that a particular number of heating elements 364 should be energized to obtain a desired print darkness as already described. Because some microprocessors 372 have a built-in analog-to-digital convertor, it may not be imperative to physically include the analog-to-digital convertor 386 between the differential amplifier 384 and the microprocessor 372.

Providing that a given number of energized heating elements 364 are kept energized for a specific length of time depending on a voltage reading taken when the heating elements 364 are first energized provides that the length of time the heating elements 364 are kept energized is more directly dependent on the power loss resulting from energizing the heating elements 364. This is because, as explained, the voltage reading is a direct function of the power loss. Controlling the heating elements 364 of the printhead means 100 in response to the voltage reading provides that a more uniform print darkness can be achieved during printing, and that this can be accomplished without extremely complex calculations and/or circuitry.

Additionally, by controlling the heating elements 364 of the printhead means 100 in response to the voltage reading provides that variations in the power loss resulting from energizing a certain number of heating elements 364 can be accounted.

While preferred embodiments of the present invention are shown and described, it is envisioned that those skilled in the art may devise various modifications of the present invention without departing from the spirit and scope of the appended claims.

The invention claimed is:

1. A printer for use in peeling a label from a backing, the label when on the backing forming a media, said printer comprising: a housing; a printhead associated with said housing; a platen roller associated with said housing; peel means proximate to said platen roller for bending the backing therearound; and separator means proximate to said peel means for separating the backing from the labels, wherein the media passes over said peel means, the backing passes between said peel means and said separator means and the labels pass over said separator means, and the media is pushed through the printer solely by said platen roller such that zero tension is applied to the backing.

2. A printer as defined in claim 1, wherein said separator means includes a corner which separates the label from the backing.

3. A printer as defined in claim 1, further including anti-buckle means proximate to said peel means for preventing buckling of the media as said media passes over said peel means, wherein the media passes between said peel means and said anti-buckle means.

4. A printer as defined in claim 3, wherein said anti-buckle means is a bar.

5. A printer as defined in claim 1, wherein said separator means is a bar.

6. A printer as defined in claim 1, wherein said peel means is a bar.

7. A printer for use in peeling a label from a backing, the label when on the backing forming a media, said printer comprising: a housing; a printhead associated with said housing; a platen roller associated with said housing; peel means proximate to said platen roller for bending the backing therearound; separator means proximate to said peel means for separating the backing from the labels; tension applying means for applying tension to the backing and wherein the media is pushed through the printer by said platen roller and the backing is pulled by said tension applying means such that tension is applied to the backing, wherein the media passes over said peel means, the backing passes between said peel means and said separator means and the labels pass over said separator means, and said peel means includes a corner around which the backing is bent to separate the label from the backing.

8. A printer as defined in claim 7, further including anti-buckle means proximate to said peel means for preventing buckling of the media as said media passes over said peel means, wherein the media passes between said peel means and said anti-buckle means.

9. A printer as defined in claim 8, wherein said anti-buckle means is a bar.

10. A printer as defined in claim 7, wherein said peel means is a bar.

11. A printer as defined in claim 7, wherein said separator means is a bar.

12. A method of dispensing a label from a printer comprising the steps of:

providing a media, said media comprising a backing having at least one label releasably secured thereto;

providing a printer comprising a housing, a printhead associated with said housing, a platen roller associated with said housing, peel means proximate to said platen roller for bending the backing therearound, said peel means including a corner around which the backing is bent to separate the label from the backing, and separator means proximate to said peel means for separating the backing from the labels;

passing said media over said peel means;

passing said backing between said peel means and said separator means;

passing said label over said separator means; and applying tension to the backing and wherein the media is pushed through the printer by said platen roller and said backing is pulled under tension.

13. A method as defined in claim 12, further including the step of providing anti-buckle means proximate to said peel means for preventing buckling of the media as said media passes over said peel means, and passing said media between said peel means and said anti-buckle means.

14. A method of dispensing a label from a printer comprising the steps of:

providing a media, said media comprising a backing having at least one label releasably secured thereto;

providing a printer comprising a housing, a printhead associated with said housing, a platen roller associated with said housing, peel means proximate to said platen roller for bending the backing therearound, and separator means proximate to said peel means for separating the backing from the labels after;

passing said media over said peel means;

passing said backing between said peel means and said separator means; and passing said label over said separator means, wherein the media is pushed through the printer solely by said platen roller such that zero tension is applied to the backing and such that said separator means causes said label to separate from said backing.

15. A method as defined in claim 14, further including the step of providing anti-buckle means proximate to said peel means for preventing buckling of the media as said media passes over said peel means, and passing said media between said peel means and said anti-buckle means.

16. A printer for use in peeling a label from a backing, the label when on the backing forming a media, said printer comprising: a housing; a printhead associated with said housing; a platen roller associated with said housing; peel means proximate to said platen roller for bending the backing therearound after the media to separate the label from the backing, said peel means including a corner which separates the label from the backing; anti-buckle means proximate to said peel means for preventing buckling of the media as the media passes over said peel means, wherein the media passes between said peel means and said anti-buckle means; and tension applying means for applying tension to the backing and wherein the media is pushed through the printer by said platen roller and the backing is pulled by said tension applying means such that tension is applied to the backing.

17. A printer as defined in claim 16, wherein said peel means is a bar.

18. A printer as defined in claim 16, wherein said anti-buckle means is a bar.

19. A method of dispensing a label from a printer comprising the steps of:

providing a media, said media comprising a backing having at least one label thereon;

providing a printer comprising a housing, a printhead associated with said housing, a platen roller associated with said housing, peel means proximate to said platen roller for bending the backing therearound, said peel means including a corner around which the backing is bent to separate the label from the backing, and anti-buckle means proximate to said peel means for preventing said media from buckling as said media passes between said peel means and said anti-buckle means;

passing said media between said peel means and said anti-buckle means; and applying tension to said backing to cause said backing to bend around said peel means and to separate said label from said backing.

* * * * *

UNITED STATES PATENT AND TRADEMARK OFFICE

CERTIFICATE OF CORRECTION

PATENT NO. : 6,231,253 B1
DATED : May 15, 2001
INVENTOR(S) : David L. Henderson, Ronald Russell Liedtke It is certified that error appears in the above-identified patent and that said Letters Patent is hereby corrected as shown below:

Title page,
Item [56] References Cited, under U.S. PATENT DOCUMENTS :
"3,586,878 6/1971 Dickerson ................156/361" should be
-- 3,586,578 6/1971 Dickerson ................ 156/541 --.

Signed and Sealed this

Twenty-sixth Day of March, 2002

*Attest:*

JAMES E. ROGAN
*Director of the United States Patent and Trademark Office*

*Attesting Officer*